(12) United States Patent
Stier et al.

(10) Patent No.: US 6,591,258 B1
(45) Date of Patent: Jul. 8, 2003

(54) METHOD OF INCORPORATING KNOWLEDGE INTO A KNOWLEDGE BASE SYSTEM

(75) Inventors: Sharon Stier, Wrentham, MA (US); Debra Ann Haughton, Attleboro, MA (US)

(73) Assignee: Stream International, Inc., Canton, MA (US)

( * ) Notice: Subject to any disclaimer, the term of this patent is extended or adjusted under 35 U.S.C. 154(b) by 0 days.

(21) Appl. No.: 09/379,692

(22) Filed: Aug. 24, 1999

(51) Int. Cl.[7] .................................................. G06N 5/02
(52) U.S. Cl. ............................ 706/50; 707/4; 707/101; 707/154; 707/202; 707/204
(58) Field of Search ...................... 706/50, 55; 707/101, 707/4, 202, 204; 704/9; 711/154

(56) References Cited

U.S. PATENT DOCUMENTS

| | | | |
|---|---|---|---|
| 5,355,445 A | * | 10/1994 | Shibao et al. ................. 706/50 |
| 5,659,724 A | * | 8/1997 | Borgida et al. ................ 707/3 |
| 5,717,835 A | * | 2/1998 | Hellerstein ................... 706/46 |
| 6,012,152 A | * | 1/2000 | Douik et al. .................. 714/26 |

* cited by examiner

*Primary Examiner*—John A. Follansbee
*Assistant Examiner*—Joseph P. Hirl
(74) *Attorney, Agent, or Firm*—Maura K. Moran

(57) ABSTRACT

A method of managing knowledge in a knowledge base involves representing instantiations of knowledge in knowledge objects, each of which has elements of information, managing knowledge objects to minimize the number of knowledge objects while ensuring that all known instantiations are represented in the knowledge base, generalizing instantiations to develop generalized instantiations, testing generalized instantiations against all known instantiations to identify redundancies among knowledge objects and to identify additional knowledge, and modifying the knowledge base to minimize redundancies and to add to the knowledge base only to facilitate retrieval of knowledge or to add additional knowledge. Managing knowledge objects comprises managing their elements to ensure that each knowledge object represents a unique instantiation of knowledge, with each knowledge object having at least one unique element used in only one knowledge object, or a unique combination of multiple use elements used in more than one knowledge object.

28 Claims, 41 Drawing Sheets

Fig. 8

| RECORD ID: 521 | | CREATOR: 522 |
|---|---|---|
| CREATION DATE: 523 | | LAST MODIFIED BY: 524 |
| LAST MODIFIED DATE: 525 | | RECORD TYPE: 526 |
| | | KNOWLEDGE STATE: 527 |

RECORDS:

RECORDS: 528

RECORD NAME:

529

8

| SEARCH 9 | RESET 11 | CANCEL 12 |

| KNOWLEDGE OBJECT ID: | 541 | CREATOR: | 542 |
|---|---|---|---|
| | | LAST MODIFIED BY: | 544 |
| CREATION DATE: | 543 | | |
| LAST MODIFIED DATE: | 545 | RECORD TYPE: | 546 |
| DATE ACTIVATED: | 509 | KNOWLEDGE OBJECT STATE: | 547 |

RECORDS: —18

RECORD: 548    AND ☐ ←701    OR ☐ ←702

HARDWARE L
SOFTWARE E
ENVIRONMENT L
ISSUE E
CAUSE L
RESOLUTION
HOWDOI? L
507 ↗         L

RECORD NAME: 549
↙ 703

[ SEARCH 19 ] [ RESET 21 ] [ CANCEL 17 ]

PENDING KNOWLEDGE OBJECTS BALANCE SHEET BY WEEK REPORT _461_

| Period Week Ending | Pending Start _462_ | Pending Added _463_ | Promoted to Active _465_ | Discarded to Obsolete _466_ | Pending Left _464_ | % Activated _456_ | Avg. Days to Active _467_ |
|---|---|---|---|---|---|---|---|
| 478 | 408' | 435 | 479* | 478' | 436 | 437' |

Fig. 20

KNOWLEDGE OBJECTS CREATED BY WEEK REPORT _491_

KNOWLEDGE OBJECT ID:　　　AUTHOR:　　　CREATION DATE:
REUSE (FOR WEEK): 365*R　　　　　　WEIGHT: 365R

| RECORD TYPE | RECORD NAME 361R |
|---|---|
| Hardware | 361e-r |
| Software | 361f-r |
| Environment | 361g-r |
| Issue | 361a-r |
| Cause | 361b-r |
| Resolution | 361c-r |

Total Knowledge Objects (Knowledge Delivery Volume): _438"_

Fig. 22

KNOWLEDGE RE-USE BY SUGGESTION ORIGINATOR FOR THE WEEK REPORT

| SUGGESTION ORIGINATOR <br> 131 | KNOWLEDGE OBJECTS AUTHORED <br> 132 | CREATE DATE <br> 133 | KNOWLEDGE OBJECT REUSE <br> 135 |
|---|---|---|---|
| 13W | ID 360A <br> ID 360F <br> ID 360U | DATE A <br> DATE F <br> DATE U | 365*A <br> 365*F <br> 365*U |
| AGENT TOTALS: <br> 134W | | | |
| 13Q | ID 360B <br> ID 360G | DATE B <br> DATE G | 365*B <br> 365*G |
| AGENT TOTALS: <br> 134Q | | | |
| TOTALS : <br> 134' | | | |

130

METHOD OF INCORPORATING KNOWLEDGE INTO A KNOWLEDGE BASE SYSTEM

RELATED APPLICATIONS

This invention relates to the following applications, filed on the even date herewith, and herein incorporated by reference:

U.S. Ser. No. 09/382,057, entitled Method and System for Development of a Knowledge Base System, by Sharon Stier and Debra Ann Haughton (Applicant Reference No. S1/P01);

U.S. Ser. No. 09/379,822, entitled Method of Selecting Desired Domains and for Developing a Seeding Methodology for a Knowledge Base System, by Sharon Stier and Debra Ann Haughton (Applicant Reference No. S1/P02);

U.S. Ser. No. 09/379.687, entitled Method and System for Monitoring Knowledge Use, by Sharon Stier and Debra Ann Haughton (Applicant Reference No. S1/P03);

U.S. Ser. No. 09/379,694, entitled Method and System for Use and Maintenance of a Knowledge Base System, by Sharon Stier, Debra Ann Haughton, and Joseph Melino (Applicant Reference No. S1/P04).

BACKGROUND OF THE INVENTION

This invention relates generally to knowledge management systems, and particularly to the development, use and maintenance of knowledge base systems.

One environment in which knowledge management systems are particularly useful is the computer product support industry. The computer systems on today's desktops are complicated. They involve many products (hardware and software) from many vendors. The products may or may not operate as expected when configured into a system. In addition, the user guides and references for the products are often incomplete and not always accurate. When end users have problems with their computer systems, they often need help diagnosing and then solving the problem. The computer product support industry has developed in response to that need. When a caller into a technical support organization reports a problem with a product in a certain environment, a technical support representative, sometimes known as an agent, diagnoses and attempts to solve the problem.

However, a mountain of knowledge is necessary in order to provide support for computer products. End users' answers might be found in a public document, or in a customer's or vendor's confidential information, or in a company's bank of general or confidential knowledge. In addition, through support interactions, a company generates a vast array of knowledge, particularly in areas such as product interoperability. Knowledge is always being generated because the resolution to an end user's problem may even need to pieced together from many sources of information, public and private combined.

A computer product support provider's challenge is to handle the increasing technical complexity of support delivery while keeping service quality and customer satisfaction high and costs low. Companies must establish a support infrastructure that enable them to capture, refine, and publish customer service and support information with greater efficiency through a variety of support channels. Adopting a knowledge management approach is an effective means to meet urgent customer demands.

One part of the knowledge management approach is the development and maintenance of knowledge bases as a part of a company's knowledge management system. With the proliferation of information that is needed to run businesses today, many companies are turning to knowledge base systems to store and provide access to its information. Knowledge bases provide a framework for collecting, organizing and refining the full range of information that is both collected and generated daily by a company. Knowledge bases process the new information, transforming it into actionable knowledge, present it in a consistent format, and make it readily available. They make a company increasingly effective in gathering and leveraging "institutional memory." Thus, knowledge bases provide a company with the opportunity to reuse the knowledge that it collects and creates. Such reuse is beneficial because it allows companies to use its data to conduct is business more quickly and efficiently than previously possible.

While knowledge bases provide some real benefit to companies that invest in their creation, they are expensive in time, resources and money to develop and maintain. Once deployed, knowledge bases need careful maintenance to keep up to date. Knowledge, being dynamic, is always being created and collected. Typically only a fraction of the knowledge developed by an entity is captured and reused. The use of the knowledge base itself can result in the creation of new knowledge and therefore new content for the knowledge base. Therefore, it is essential to keep them updated. However, since it is complicated and expensive to update knowledge bases system, knowledge bases often go outdated almost immediately. The company's challenge is to handle the increasing technical complexity of the knowledge it develops and collects, while keeping costs low.

Typically, also, even when the knowledge is captured in a knowledge base, it is not incorporated into the knowledge base at an appropriate level of abstraction. Often, specific instantiations of the knowledge are added, resulting in a knowledge base that is cumbersome to search and hard to maintain. If the information is generalized too much, appropriate resolutions will not be presented in response to queries.

It is therefore an object to treat knowledge as an asset that provides a substantial competitive advantage, and to leverage knowledge to improve customer satisfaction. It is an object of this invention to develop knowledge management systems that allow a company to manage the knowledge it collects and creates, make it available for use it in conjunction with the other systems and processes used by the company, and monitor its use. It is a further object of this invention to develop and deploy a knowledge base so that it quickly contains a vast array of information. It is also an object to seamlessly integrate the knowledge base with the other systems and processes used by the knowledge base user, and develop operational processes for keeping the knowledge base updated. Finally, it is an object of this invention to provide systems for generalizing knowledge as much as possible and for modifying a knowledge base only as much as is needed to add new knowledge and ease technology reuse.

SUMMARY OF THE INVENTION

In accordance with the present invention, there is described a method of adding knowledge into a knowledge base in which knowledge is stored in a plurality of existing knowledge objects having existing elements of information. The method involves identifying new knowledge created by use of the knowledge base and objectifying the new knowledge by treating the new knowledge as a potential new knowledge object having at least one potential new element of information. The knowledge base is amended to store the new knowledge by doing one of the following: amending an existing knowledge object to store the new knowledge, or adding a new knowledge object to store the new knowledge.

Before storing the new knowledge, the knowledge base is reviewed to identify affected knowledge objects, which are knowledge objects in the knowledge base that have existing elements of information that would be affected by addition of the potential new knowledge object into the knowledge base. In the preferred embodiment, an affected knowledge object could be an existing knowledge object into which the potential new knowledge object could be incorporated, or it could be an existing knowledge object that could be incorporated into the potential new knowledge object. Further, it could be an existing knowledge object having existing knowledge from which additional new knowledge could be developed when the existing knowledge is combined with the new knowledge.

The knowledge base could be reviewed by submitting queries to the knowledge base and reviewing reports of knowledge objects in the knowledge base, with the knowledge objects sorted by associated domains. The review involves generalizing each of the potential new elements, and comparing each of the generalized new elements to the existing elements to identify affected existing elements that would be affected by addition of the generalized new elements into the knowledge base. Any additional new knowledge is developed that can be developed when the generalized new elements are combined with the affected existing elements.

The knowledge base is amended by incorporating new knowledge and any additional new knowledge into the knowledge base. The affected knowledge objects are updated to include the new knowledge and any of the additional new knowledge. When the review identifies no affected knowledge objects, a new knowledge object is added to store the new knowledge.

In the preferred embodiment, the elements of information are records and associations between records represented by links. Therefore, existing elements are existing records or existing links, and potential new elements of information are potential records and potential links. Affected records are existing records that would be affected by addition of the potential new records into the knowledge base. Affected links are existing links that would be affected by addition of the potential new knowledge object into the knowledge base.

In accordance with a further aspect of the invention, there is also described a method of incorporating knowledge about a first domain into a knowledge base in which knowledge about the first and second domain is stored in a plurality of knowledge objects and existing elements of information. The method involves identifying new knowledge, created by use of the knowledge base, in the first domain. The new knowledge is objectified by treating it as a potential new knowledge object having at least one potential new element of information. The knowledge base is amended to store the new knowledge.

Before the knowledge base is amended, the new knowledge is reviewed with the knowledge in the second domain, to identify affected knowledge objects. Each of the potential new elements is generalized and compared to the existing elements in the second domain to identify affected elements. Any additional new knowledge is developed that can be developed from the generalized new elements and the affected existing elements in the second domain. When the review identified no affected knowledge objects in the second domain, the new knowledge object is added to the first domain.

BRIEF DESCRIPTION OF THE DRAWINGS

The above-mentioned and other features of the invention will become more apparent by reference to the following description taken in connection with the accompanying drawings in which:

FIG. 1b is a block diagram of the knowledge base memory 35 show in FIG. 1a;

FIG. 1d is a block diagram of the records 361 shown in FIG. 1b, showing in general different record types;

FIG. 1e is a more detailed block diagram of the front end 20 of FIG. 1a.

FIG. 2 is block diagram view of a knowledge management system 50 for developing and maintaining the knowledge base system 10 shown in FIG. 1a;

FIG. 5 is a diagrammatic representation of another kind of knowledge object 360 shown in FIG. 1a;

FIG. 8 is a block diagram of the record editor search screen 520 for the record editor user interface 24 for the record editor 23 shown in FIGS. 1a and 1e;

FIG. 10a is a block diagram of the knowledge object editor search screen 540 for the knowledge object editor 25 shown in FIGS. 1a and 1e;

FIG. 13 is a block diagram view of the workflow system 470 shown in FIG. 1a;

FIG. 14 is a block diagram of the knowledge monitoring system 430 shown in FIG. 1a;

FIG. 19 is an example of the Pending Knowledge Objects Balance Sheet by Week report 461 shown in FIG. 21;

FIG. 20 is an example of the Knowledge Objects Created by Week report 491 shown in FIG. 21;

FIG. 21 is a block diagram of the knowledge maintenance reporting subsystem 46 shown in FIG. 1a;

FIG. 22 is an example of the Knowledge Re-use by Suggestion Originator for the Week report 130;

FIG. 38 is a block diagram of the knowledge base use process 410 shown in FIG. 1a;

DESCRIPTION OF THE PREFERRED EMBODIMENTS

General

The preferred embodiment for this invention is a knowledge base that has been developed for use in the technical support environment. Such systems provide knowledge about hardware, software, the environments in which they are used, and any customer-specific support requirements, such as specific workflow or scripts to follow. A knowledge management system can be used to collect and process that data, and present it in a consistent fashion in a knowledge base, which can assist the agent in identifying a likely cause of the problem and resolution.

Figure 1A:
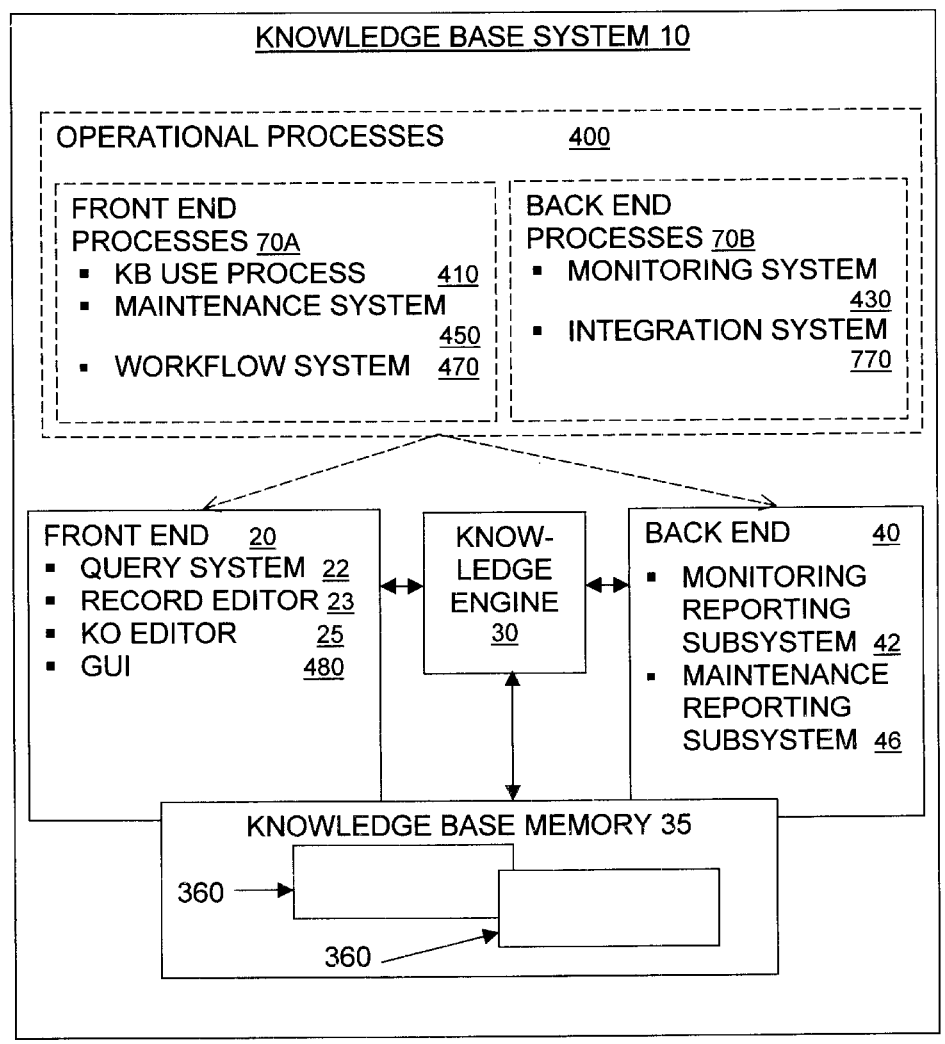
FIG. 1a is a block diagram view of a knowledge base system of the preferred embodiment.

FIG. 1a shows a knowledge base system 10 having a knowledge engine 30, a knowledge base memory 35, a front end 20 for accessing the engine 30 and memory 35, and a back end 40 consisting of metrics and reporting for testing and modifying the knowledge base system 10 and for providing customer feedback. Coupled to the knowledge engine 30 is a knowledge base memory 35. The front end 20 has a query system 22 for submitting queries to the knowledge engine 30, a record editor 23 for entering and editing records in the knowledge base memory 35, a knowledge object editor 25 for entering and editing records in the knowledge base memory 35, and a graphics users interface (GUI) 480 to allow access to the query system 22 and the editors 23, 25. The back end 40 has a knowledge monitoring reporting subsystem 42 and a knowledge maintenance reporting subsystem 46 to provide reports of knowledge base use activity.

In the preferred embodiment, the knowledge engine 30 is a cognitive processor such as the KnowledgeBridge™ processor available from ServiceWare, Inc. of Oakmont, Pa. The knowledge base system 10 is optimized for the KnowledgeBridge™ architecture, which implements a concept-association model of knowledge storage and retrieval using neural net, fuzzy logic, and advanced natural language technology. However, front and back ends 20, 40 are relatively independent of the knowledge engine 30, so that they could be used with virtually any knowledge providing system, such as, for example, a case-based reasoning system.

Figure 2:
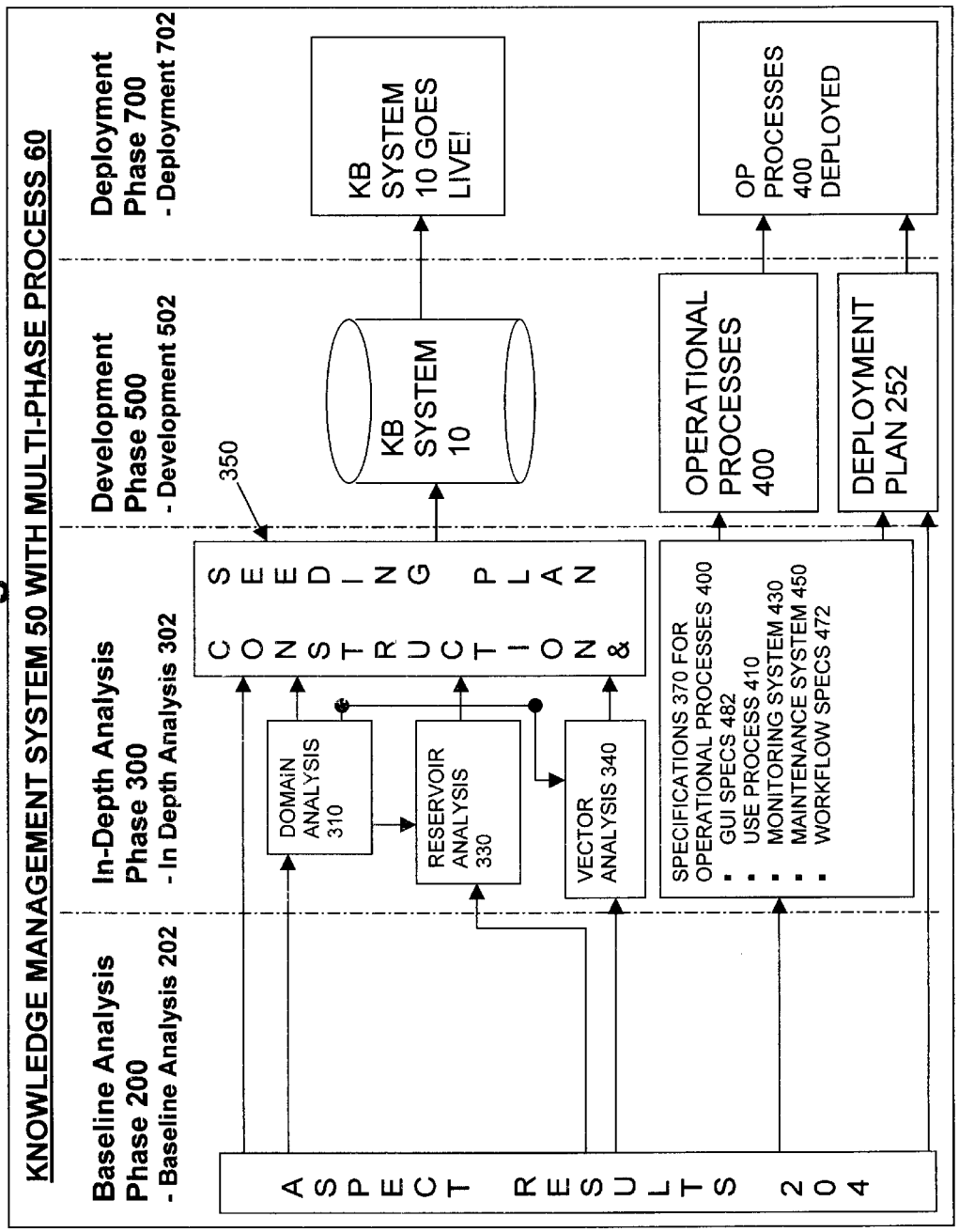
Figure 13:
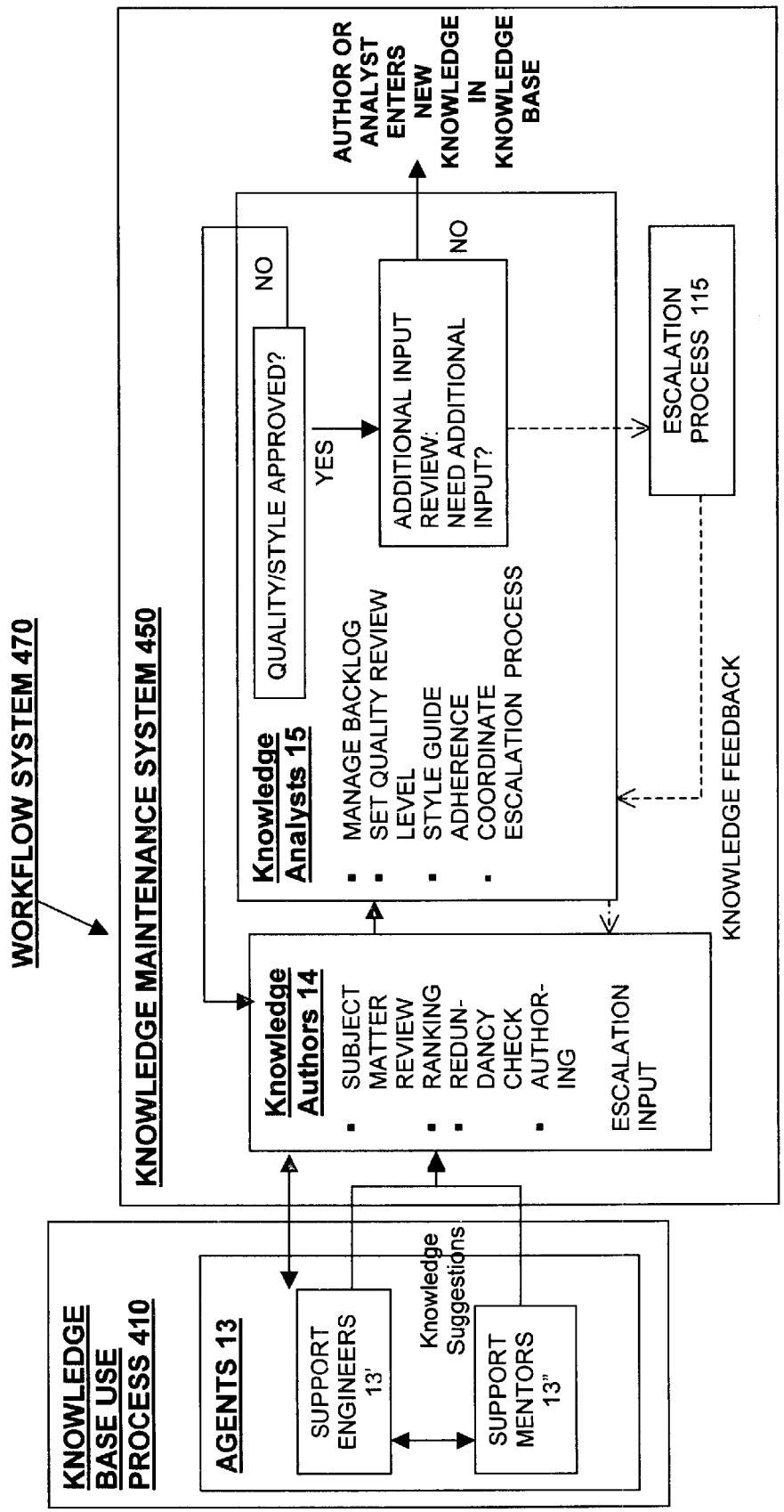

In the preferred embodiment, the knowledge base system 10 is developed and maintained through a knowledge management system 50 shown in FIG. 2. The knowledge management system 50 comprises a methodology to define and develop the knowledge base system 10 and to collect, organize, refine, publish and reuse information in the knowledge base system 10. The knowledge management system 50 also comprises supporting business processes and methodologies to keep the knowledge base updated, to integrate the knowledge base with the other systems and processes used by a user of the knowledge base, and to monitor use of the knowledge. As shown in FIG. 13, a knowledge analyst 15 has overall responsibility for the knowledge base and knowledge authors 14 populate the knowledge base and then keep it updated using an innovative authoring methodology involving objectifying the knowledge.

Multi-Phase Process 60

The knowledge management system 50 of the preferred embodiment provides for a targeted, easily used, monitorable, easily maintained knowledge base system 10. As shown in FIG. 2, its methodology to define and develop the knowledge base system 10 and to collect, organize, refine, publish and reuse information in the knowledge base system 10 involves a multi-phase process 60.

First, in a baseline analysis phase 200, a baseline analysis 202 is conducted to determine the scope of developing the knowledge base, define knowledge base development approach and plan, and define a knowledge engineering direction. Next, an in-depth analysis phase 300 involves conducting an in-depth analysis 302 with an input being the aspect results 204, also known as baseline analysis results 204 or survey results 204, from the surveying of aspects of the development during the base-line analysis 202.

The in-depth analysis 302 involves conducting a domain analysis 310 to identify a desired domain for the knowledge base, a reservoir analysis 330 to identify and analyze the quality of the sources of knowledge for the domain, and a vector analysis 340 to define a structure for the knowledge base. The in-depth analysis 302 has as outputs a construction and seeding plan 350 for the knowledge base and specifications 370 for operational processes for use of the knowledge base.

In the development phase 500, knowledge base development 502 involves constructing and seeding the knowledge base system 10 in accordance with the construction and seeding plan 350, preparing the knowledge base system 10 for deployment. The construction and seeding of the knowledge base system 10 involves adding content to the knowledge base memory 35. The operational processes are developed in accordance with the specifications 370 drawn up in the in-depth analysis phase 300. Also developed is the deployment plan 252 for deployment of the knowledge base.

In the deployment phase 700, deployment 702 of the knowledge base system 10 occurs in accordance with the deployment plan 252. The knowledge base system 10 is used to answer end-user queries. The processes that were developed during the development phase 500 are used to monitor operations and to provide for continuous improvement of the knowledge base system 10.

The multi-phase process 60 of the methodology to define and develop a targeted, easily used, monitorable, easily maintained the knowledge base system 10 is described in detail in the co-pending related patent application, U.S. Ser. No. 09/382,057, entitled Method and System for Development of a Knowledge Base System, by Sharon Stier and Debra Ann Haughton (Applicant Reference No. S1/P01). The method of identifying a desired domain for the knowledge base and of formulating a seeding methodology for the knowledge base system 10 is described in detail in the co-pending related patent application, U.S. Ser. No. 09/379, 822, entitled Method of Selecting Desired Domains and for Developing a Seeding Methodology for a Knowledge Base System, by Sharon Stier and Debra Ann Haughton (Applicant Reference No. S1/P02). Both were filed on the even date herewith and are herein incorporated by reference.

Objectifying Knowledge

General

Figure 3:
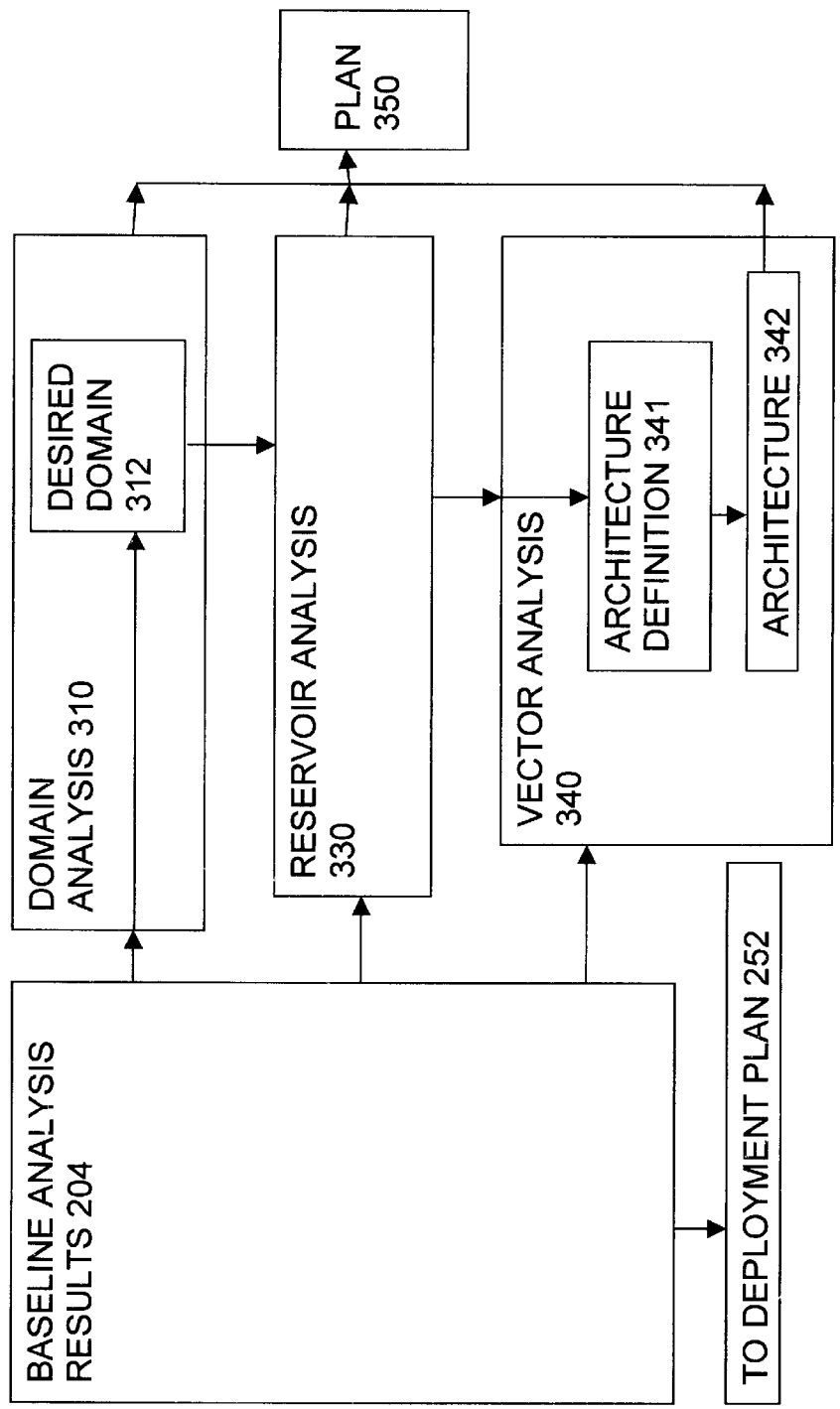
FIG. 3 is a block diagram of the baseline analysis results 204 and in-depth analysis 302 shown in FIG. 2.

Referring to FIG. 3, in the vector analysis 340, decisions are made about how to organize the information that is going to be stored in the knowledge base system 10. In so doing, the architecture 342 of the knowledge base is defined. During the architecture definition 341, authoring conventions and guides containing the architectural definitions are developed to provide knowledge base uniformity during authoring of the knowledge base.

Figure 1B:
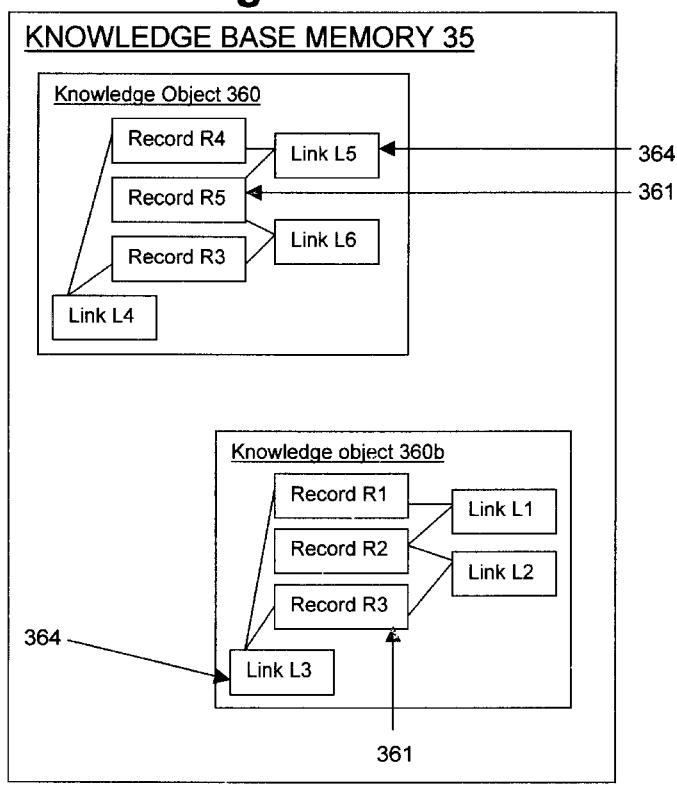

Returning to FIG. 1a, while referring to FIGS. 1b, 1c, 1d, 4 and 5, in the knowledge base system 10 of the present invention, the information in the knowledge base memory 35 is stored in knowledge objects 360 having a plurality of elements of information consisting of records 361 having associations, also known as links 364, between them. FIG. 1b shows knowledge objects 360a, 360b stored in the knowledge base memory 35. Knowledge object 360a has records R4 and R5. Records R4 and R5 are linked by link L5. Knowledge object 360b has records R1, R2, and R3. Records R1 and R2 are linked by link L1, records R1 and R3 are linked by link L3, and records R2 and R3 are linked by link L2.

Figure 1C:
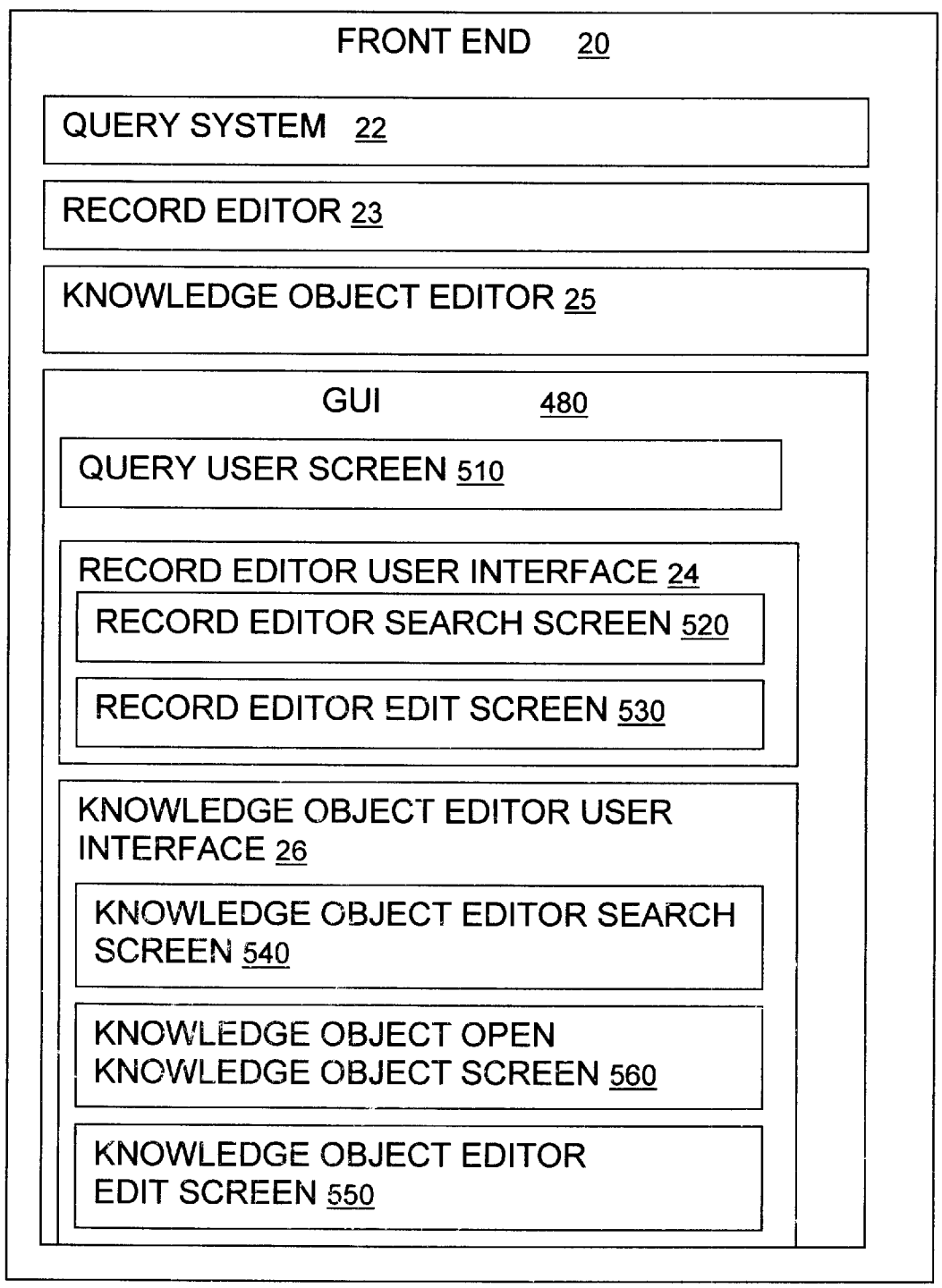
FIG. 1c is a block diagram of the knowledge objects 360 shown in FIG. 1a, showing in general different knowledge object types.

Referring to FIGS. 1c and 1d, knowledge objects 360 are defined by knowledge object types 363, and records 361 are defined by record types 362. As an example, FIG. 1c shows knowledge object types 363a, 363b, and 363c for knowledge objects 360, and FIG. 1d shows record types 362a, 362b, and 362c for records 361. The definitions of knowledge object types 363 and record types 362 depend on the domain of the particular knowledge base. Inputs into record type 362 definition include requirements of the intended beneficiaries of the knowledge base, particularly any customers sponsoring the development of the knowledge base. In the preferred embodiment, the knowledge object and record types 363, 362 and definitions also depend on the multi-customer goals and strategy of the developer of the knowledge base.

In the technical support environment of the preferred embodiment, knowledge objects 360 represent a full support interaction, and records 361 represent the factual elements of the interaction. Previous technical support systems modeled the support interaction as "Issue→Resolution." The architecture of the present invention models the interaction differently: "Issue/Symptom→Technical Reason for Problem→Resolution."

This model, which treats the knowledge embodied in the support interaction as an object, is based on an understanding that each call involves two kinds of problem: the problem as stated by the customer (which is the Issue/Symptom), and the other being the actual technical reason for the problem (the Cause). The model shift allows problems to be understood at a more abstract level. Records 361 can be developed that can be used in multiple knowledge objects 360, therefore providing for wider ranges of description of problems but fewer causes and resolutions. For example, referring to FIG. 1a, knowledge objects 360a, 360b share Record R3. Using records 361 in multiple knowledge objects 360 provides for a simpler knowledge base structure and improved technology reuse.

Figure 5:
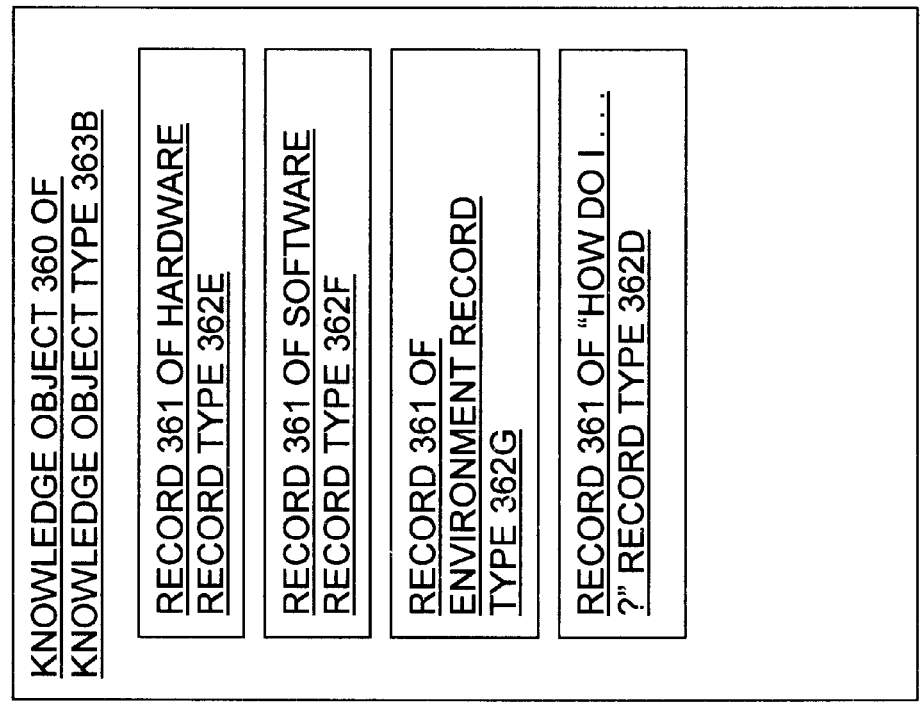
Figure 4:
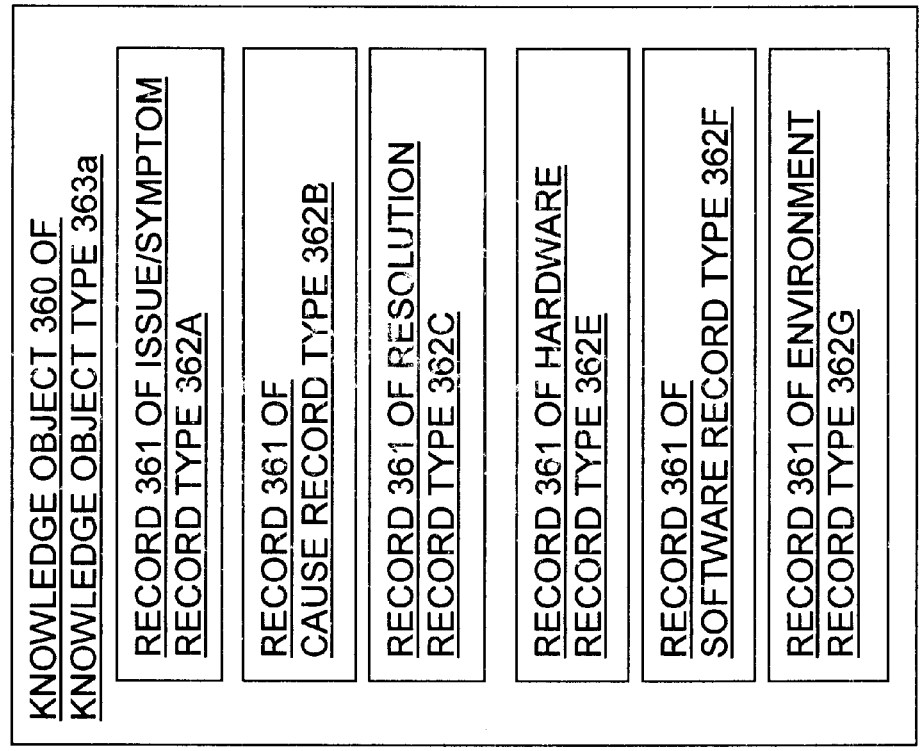
FIG. 4 is a diagrammatic representation of a knowledge object 360.

Referring to FIGS. 4 and 5, the architecture of the preferred embodiment supports resolution knowledge object type 363a and "How do I" knowledge object type 363b. The resolution knowledge object type 363a of the preferred embodiment identifies the factual circumstances of a support interaction and presents a resolution for the identified support interaction. It requires several record types 362 to define the support interaction. Resolution knowledge object type 363a has three support record types (Issue/Symptom record type 362a, Cause record type 362b, Resolution record type 362c), and three product-specific record types (Hardware record type 362e, Software record type 362f, Environment record type 362g). The "How do I" knowledge object type 363b provides step by step instructions for installing, operating, or maintaining products. It has the three product-specific record types (Hardware record type 362e, Software record type 362f, Environment record type 362g) and a "How do I . . . ?" record type 362d.

Each record type 362 in the resolution knowledge object types 363 except the "How do I . . . ?" record type 362d is defined to include synonyms to capture alternative statements of the knowledge. Synonyms are used by the knowledge engine in finding matches during searches. Numerous synonyms can strengthen the activation on a record. The knowledge base architecture 342 could be defined to store the most recognized synonym among the set of synonyms in the record 361 as the main descriptor of the knowledge, in other words as the record name. The other synonyms in the set could be stored as synonym descriptors of the knowledge.

Also included in the definition of records 361, and therefore in each record type 362 are elements known as concepts, hypertext and facets, not shown, which are components of the KnowledgeBridge™ product developed by ServiceWare, Inc. of Oakmont, Pa., with which the architecture 342 is implemented. Concepts are the phrases or short sentences that the knowledge engine 30 for a knowledge based system 10 based on object-oriented programming uses to make links and associations. Hypertext is documentation contained in the knowledge base, linked to and reachable from one or more concepts in the knowledge base. It is used to attach additional information to a concept. For, Issue/Symptom record types 362a, Cause record types 362b, Hardware record types 362e, and Software record types 362f, the information in hypertext is questions or tests to accept or negate the record. For Resolution record types 362c, it provides advice and instructions to the knowledge base end users. Hypertext has only a single font and can not contain graphics or special formatting. Hypertext may be implemented with multiple levels, with other hypertext levels, for example more detailed sets of instructions, accessible through hyperlinks.

Facets are documents that are used with multiple concepts, for information that is often procedural or definitional. Unlike hypertext, document facets are located external to the knowledge base and can contain different formats with graphics. In the preferred embodiment, facets are HTML documents to allow for more flexibility in formatting and graphics than the Hypertext within the knowledge base. In the preferred embodiment, facets contain the private information about the subject matter of the record. Such private information could be confidential information of the developer of the product being supported. It could be used to solve an end-user's problem, but not disclosed to the end user.

Authoring Conventions and Guides

While developing the architecture of the knowledge base, authoring conventions and guides are developed to add uniformity to authoring output. The conventions and guides have definitions and further have guidelines for format and development of the records. They detail the structure of the records and provide a standard format for all the different kinds of records supported by the architecture. The standard format will guarantee consistency when seeding and later maintaining the knowledge base. The standard format may include guidelines for capitalization, punctuation, abbreviation, and for phrasing (e.g. tense). The conventions and guides also contain guidelines for use of synonyms. In the preferred embodiment, synonyms could be alternate words (different words with essentially the same meaning), or they could be different grammatical form of a synonym (nouns, verbs, tenses, spellings), as well as alternate application categories If different versions of a word are included in a record, the probability increases of the record being retrieved in a search of the knowledge base. In addition, a record could have a knowledge object name that could be used as a synonym so that the name is repeated in the record, the repetition thus increasing the probability of the record being retrieved in a search of the knowledge base.

Finally, the conventions and guides provide guidelines for selecting the appropriate level of granularity of a record. The granularity selected for a record is very important. If chosen too high, the knowledge base operates more as a general reference than as a true knowledge delivery system. If selected too high, it operates more as a decision tree, which requires frequent, extensive maintenance of the knowledge base. Each record's level of granularity may differ, so that product records may have high granularity (to cover the number of products in the domain) while Issue/Symptom granularity may be low (to match the usually general manner in which end users describe their problems. The authoring guidelines provide guidelines for selecting the appropriate granularity, or specificity, of each record type that makes up a knowledge object.

Operational Processes 400

General

During the in-depth analysis phase 300, specifications for operational processes 400 for use of the knowledge base are developed. Returning to FIG. 1a, the operational processes 400 include front end processes 70a for the front end 20 and back end processes 70b for the back end 40.

The front end processes 70a include a knowledge base use process 410 for use of the knowledge base system 10 and a knowledge maintenance system 450 for maintaining and continuously improving the knowledge base system 10. The back end processes 70b include a knowledge monitoring system 430 for monitoring knowledge base operations.

Figure 14:
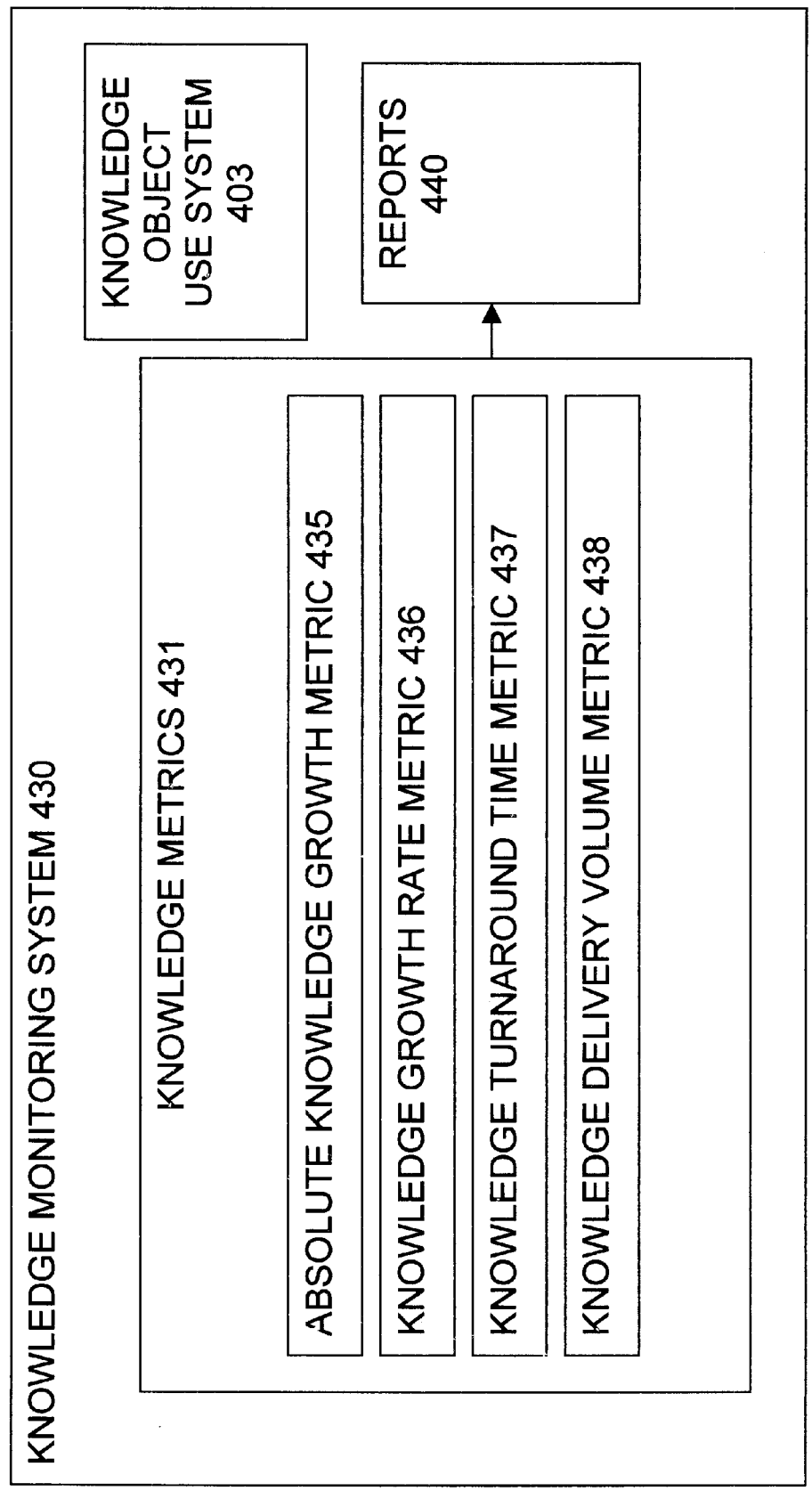

The knowledge monitoring system 430 involves measuring knowledge base use, as shown in FIG. 14, developing knowledge metrics 431 from the measurements of knowledge use, and providing knowledge monitoring reports 440 of the metrics 431. The uses to which the knowledge base is put are stored in the knowledge base memory 35, and a knowledge monitoring reporting subsystem 42 collects and counts the uses, uses the capabilities described below to compile knowledge metrics from counts of the uses, and generates reports. The knowledge monitoring system 430 is described in detail in the co-pending related patent application, U.S. Ser. No. 09/379,687, entitled Method and System for Monitoring Knowledge Use, by Sharon Stier and Debra Ann Haughton (Applicant Reference No. S1/PO3), which was filed on the even date herewith and is herein incorporated by reference.

The operational processes also include an integration system 770 for knowledge base integration with any systems or processes (both automated and manual) with which the front and back ends 20, 40 will interact or co-exist, and include call tracking and customer reporting systems.

The front end processes 70a include a workflow system 470 for agent users, knowledge authors 14 and knowledge analysts 15, shown in more detail in FIG. 13. Team resources are evaluated and workflow specifications 472 for user and knowledge administration work flow are developed. Workflow specifications 472 are contained in a work flow document, not shown, that describes users' expected interactions with the knowledge base, the call tracking and call routing systems once the knowledge base system 10 is operational. Production resources needed to support the ongoing knowledge base effort once deployed are detailed.

During the in-depth analysis phase 300, the knowledge base user interface 480 of the front end 20 is defined to support the knowledge base use process 410 and maintenance system 450. Also, the knowledge monitoring reporting subsystem 42 and knowledge maintenance reporting subsystem 46 of the back end 40 are developed to support, respectively, the knowledge monitoring system 430 and knowledge maintenance system 450.

Knowledge Base Use Process 410

After a desired domain 312 is selected and the knowledge base development and construction plan 350 is developed, the workflow system 470 for use of the planned knowledge base system 10 is developed. Decisions are made as to who will use the knowledge base and how they will use it. Decisions are also made as to who will maintain the knowledge base and how they will maintain it. In the preferred embodiment, the workflow system 470 involves the knowledge base process 410 for agent use of the knowledge base system 10 and the knowledge maintenance system 450 for maintenance for the system 10. Agents 13, who may be support engineers 13' or support mentors 13", follow the knowledge base use process 410 to use the knowledge base system 10 to answer support queries. They search the knowledge base memory 35 for active knowledge objects that represent solutions to the problems presented to the agents.

As the agents 13 use the knowledge base system 10, their description of the problem and the knowledge base's response will be saved. If the combined query and response is not unique, the agents 13 will have accessed an existing knowledge object, which is in the active state. The knowledge engine 30 will note the accessing of an active knowledge object and then use the interaction to strengthen the knowledge base. If the combined query and response is unique, not yet present in the knowledge base, or if the agent provides additional input documenting a problem with the knowledge base, the knowledge engine 30 will treat the interaction as a new knowledge object, putting it into a pending state and making it available for review by knowledge authors 14, who populated the knowledge base and then keep it updated, and by knowledge analysts 15, who have overall responsibility for keeping the knowledge base system 10 current, accurate and structured so that it is easily searchable.

The knowledge base use process 410 for agent use of the knowledge base system 10 is described in more detail below. It involves an agent 13 initiating a query by describing the symptoms of the problem as she knows them. She may narrow her search by entering additional facts about the problem such as product or environment type. She submits her query and receives a possible set of issues that could be the actual issue of the problem causing use the symptoms that she has described. The agent 13 selects the issue that she wants to test for its likelihood of being the actual issue, and performs any appropriate test to confirm or deny the issue. Once she has selected an issue, the agent 13 tests the returned causes, and selects one. She then tests the returned resolutions. When the agent selects a correct resolution, she may then guide the support requester through the indicated resolution steps. She may then save her query.

When the agent 13 recognizes that her query represents missing, incorrect, or incomplete knowledge in the knowledge base, before saving the interaction, she may create a memo outlining the problem with the knowledge base and suggesting the knowledge that should be added to the knowledge base. When she saves the query, the memo will be available for review by the authors 14 and analysts 15 responsible for maintaining the knowledge base system 10.

The Knowledge Maintenance System 450

Figure 37:
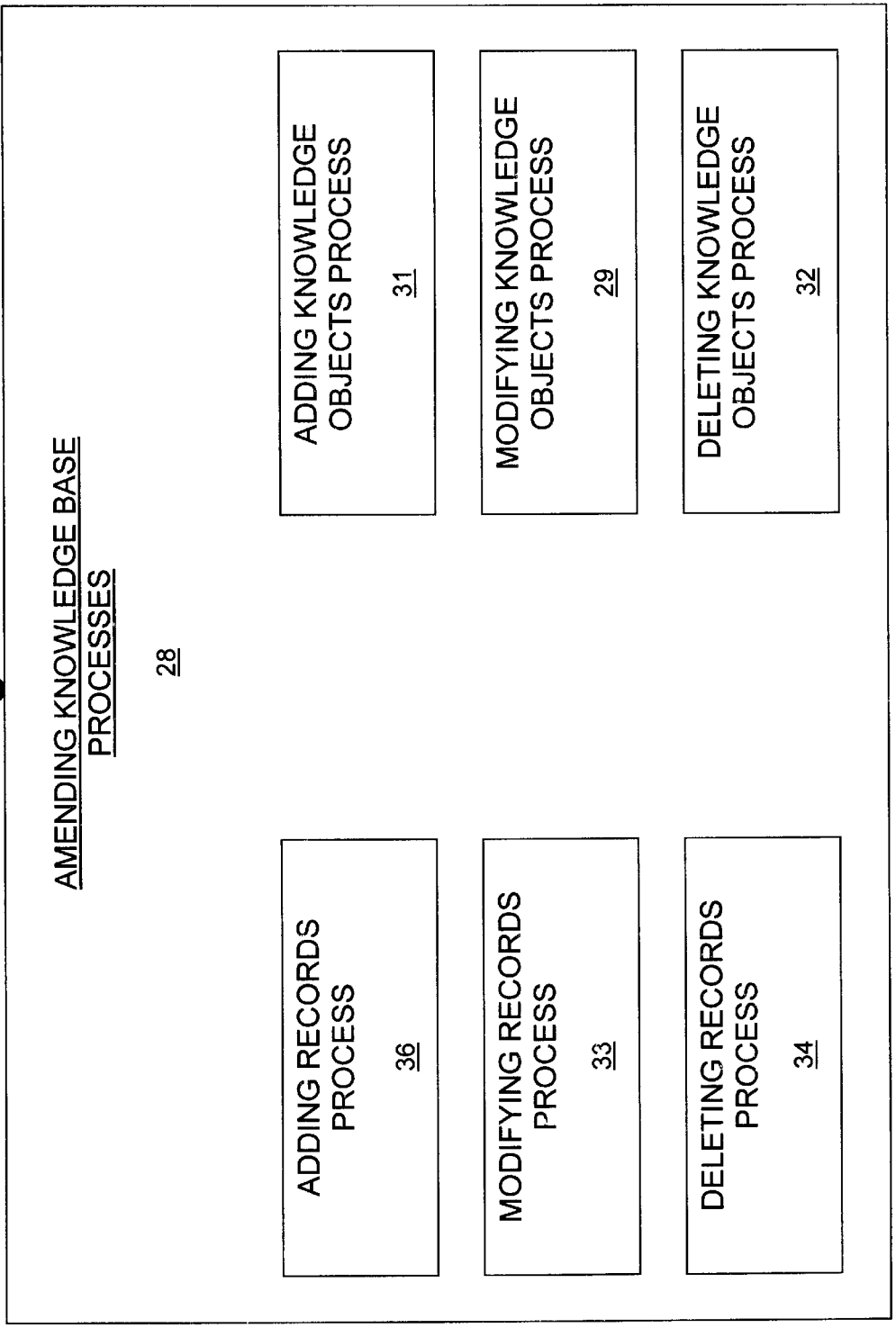
FIG. 37 is a block diagram of the amending knowledge base processes 28 of the knowledge maintenance system 450 shown in FIGS. 1a and 13.

The knowledge maintenance system 450, which is described in more detail below, provides for populating the knowledge base and for the review of agent queries and updating the knowledge base memory 35 if a need for new content is indicated by the query. It includes the amending knowledge base processes 28, which are the processes an author 14 or agent would use to add, modify, and delete the records and knowledge objects in the knowledge base memory 35. The processes 28 are shown in FIG. 37 and described in more detail below.

Agent input into the knowledge base is always in the pending state. The knowledge maintenance system 450 provides that only knowledge authors 14 and knowledge agents are able to activate knowledge objects by adding new knowledge objects to the knowledge base memory 35, or by removing the pending status of agent queries, which are stored in the memory 35 as pending knowledge objects 360. If the query knowledge engine 30 recognizes that the combination of records and links constitutes a knowledge object 360 that has already been entered into the knowledge base, the query is used to strengthen the knowledge base system 10. If the query represented a new knowledge object 360 or if new content is indicated the query summary, an author 14 will review the query and, if new content is indicated, incorporate the new content into new knowledge in the knowledge base.

The knowledge analyst 15 monitors the author's backlog and provides quality review of the authoring output. If the new knowledge requires additional input before it can be incorporated into the knowledge base, the knowledge analyst 15 arranges to obtain the additional input (from, for example, the customer whose product is the subject matter of the new knowledge). Once the additional input is obtained, the knowledge analyst 15 feeds it back to the author 14, who updates the new knowledge, and passes it back to the analyst 15 for another quality review.

Specifications are developed for reports, described below, to inform authors 14 of the need to maintain the knowledge base and to assist the knowledge analysts 15 in managing authoring output backlog.

User Interface 480

General

Specifications 482 for the knowledge base's graphic user interface (GUI) 480 are developed to accommodate the knowledge base architecture 342 and all of the specifications 412 for the knowledge base use process 410. A GUI document, not shown, is developed to detail screen flow and layout for a user interface 480 designed to make agent querying and interaction reporting and administrative maintenance and monitoring as painless as possible.

Returning to FIG. 1a, for the knowledge base of the preferred embodiment, the user interface 480 has the necessary elements to provide access to all of the back end tools such as the knowledge monitoring reporting sub-system 42 and knowledge maintenance reporting sub-systems 46. The user interface for the reporting subsystems 42, 46 are not described in detail here because any conventional report generating user interface may be used to implement the reporting subsystems described below. The user interface 480 also has the necessary elements to provide access to all of the front end tools that are used to support the knowledge base, for example, the query system 22, the record editor 23, and the knowledge object editor 25.

The user interface 480 of the preferred embodiment was adapted from the user interface available with the KnowledgeBridge™ processor from ServiceWare, Inc. of Oakmont, Pa. It has a knowledge base main screen, not shown, a query user screen 510 for the query system 22, a record editor user interface 24 for the record editor 23, and a knowledge object editor user interface 26 for the knowledge object editor 25.

Knowledge Base Main Screen

The knowledge base main screen has a user ID field, a password field, and a tool selection tab. The user ID field is a free text field for a knowledge base user to enter her knowledge base user identification. The password field is a free text field for the user's security password. When the identification number and password are entered, the tools selection tab is a pull down tab from which the user may select the query system 22, the record editor 23, or the knowledge object editor 25.

Query User Screen 510

Figure 6:
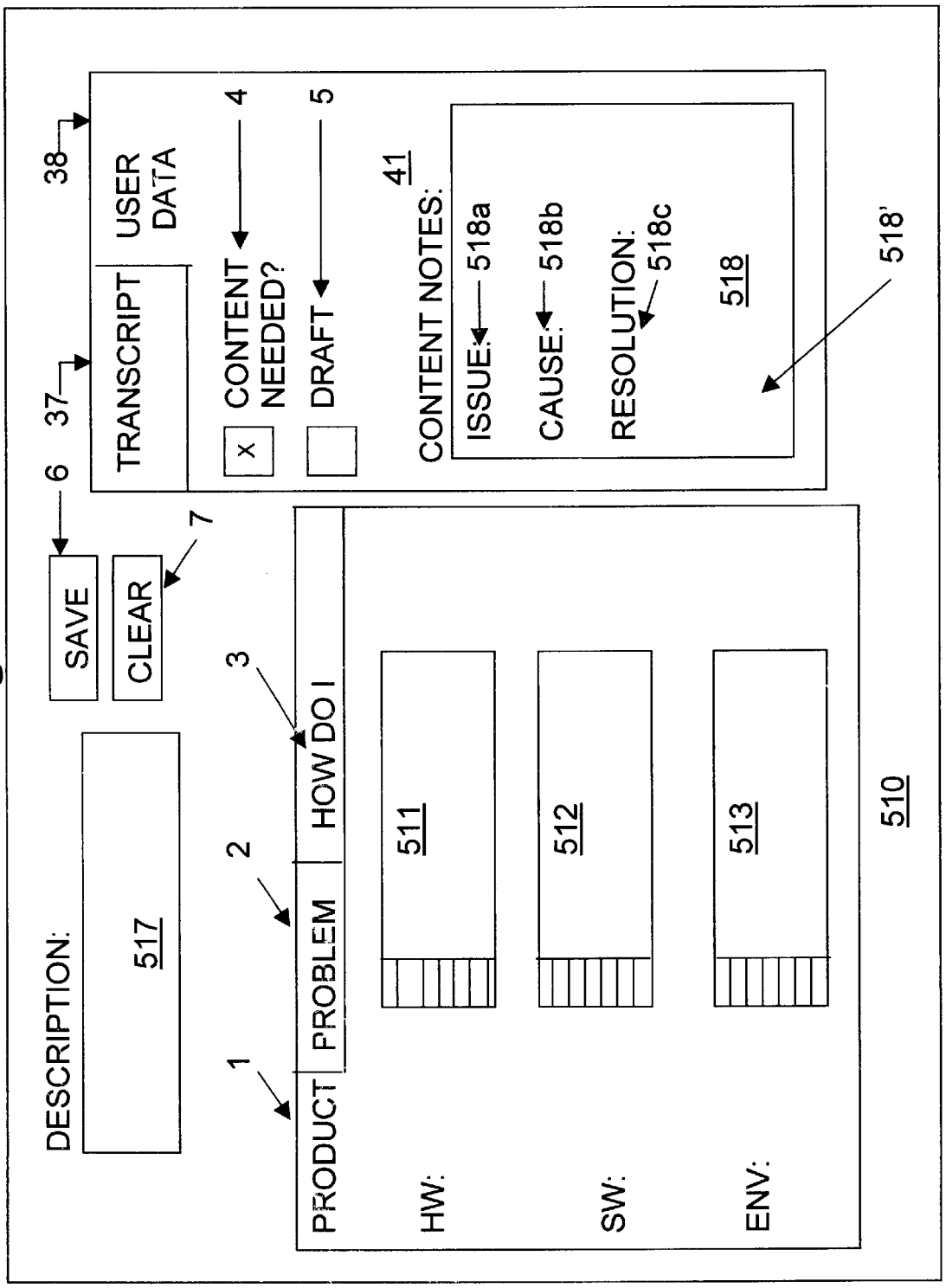
FIG. 6 is a block diagram of the query user screen 510 for the query system 22 when a Product tab and a User Data tab are selected.

As seen in FIG. 1e, the GUI 480 has a query user screen 510 for the query system 22. The query user screen 510, shown in FIGS. 6 and 7, has fields for the architecturally defined record types 362, consisting of a Hardware field 511 for record type 362e, a Software field 512 for record type 362f, an Environment field 513 for record type 362g, and for the general record types, an Issue/Symptom field 514 for record type 362a, a Cause field 515 for record type 362b, a Resolution field 516 for record type 362c, and a "How do I . . . ?" field, not shown, for record type 362d. The record fields all contain picklists from which selections may be made. Each line of the record's picklist has a picklist checkbox 711 with which the displayed record can be selected. The fields are listed categorically under three descriptive tabs, a Product tab 1 for accessing the Hardware field 511, Software field 512, and Environment field 513; a Problem tab 2 for accessing the Issue/Symptom field 514, Cause field 515, and Resolution field 516; and a "How do I . . . ?" tab 3 for accessing the "How do I . . . ?" field, not shown. The query user screen 510 when the Product tab 1 is selected is shown in FIG. 6. The query user screen 510 when the Problem tab 2 is selected is shown in FIG. 7.

In addition, the query screen 510 has a Description field 517, which is a free unlabeled text field used for entering a description of the problem the caller is experiencing. It can contain the symptoms that callers are seeing, the product they are using, the function they are trying to perform, or any related environmental considerations (networks, operating systems, etc.) The screen 510 also a read-only Hypertext field, not shown, and Facet field, not shown, to accommodate the Hypertext and Facet features described above.

Figure 7:
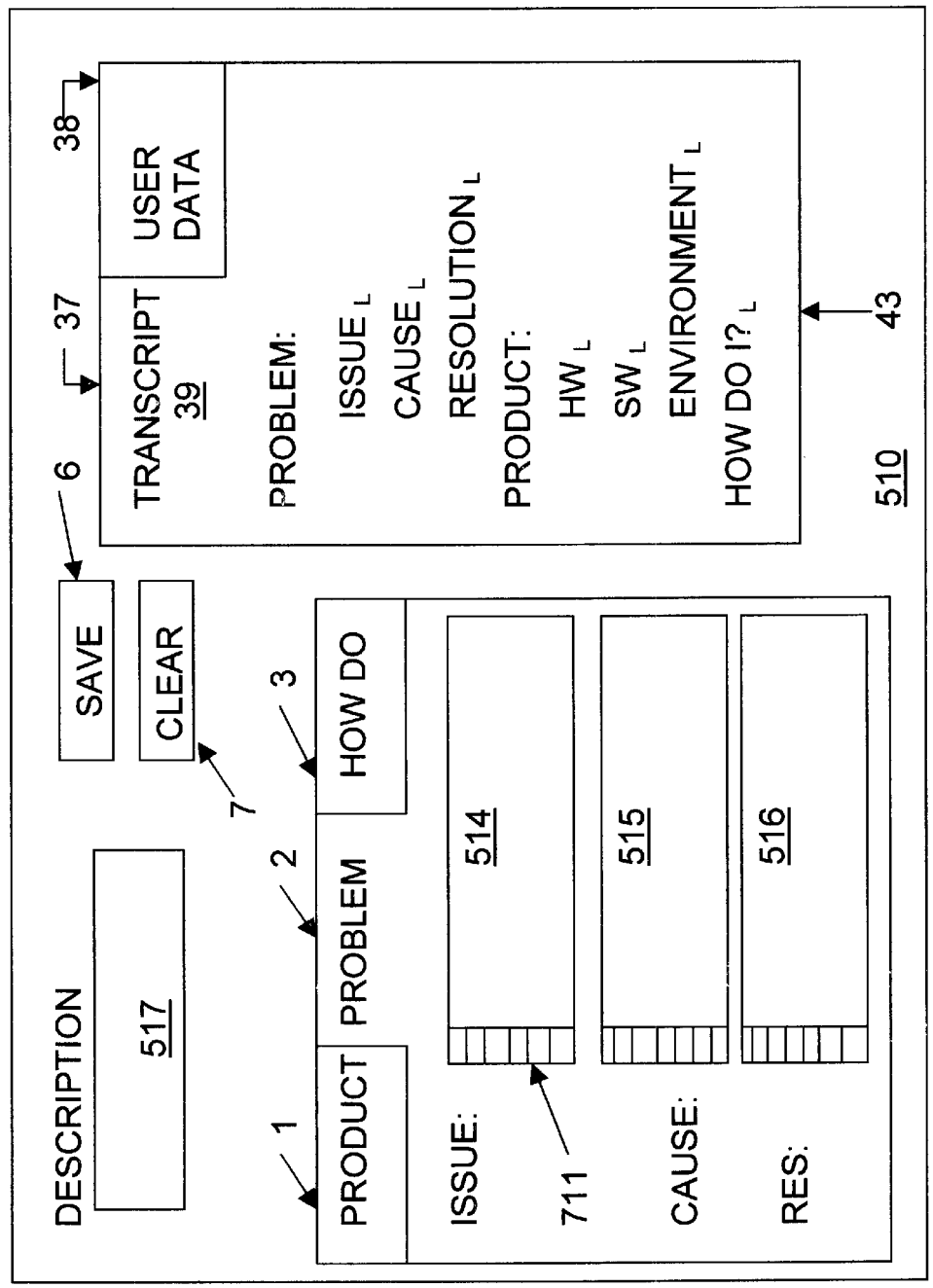
FIG. 7 is a block diagram of query user screen 510 when a Problem tab and a Transcript tab are selected.

The query screen 510 also has a Transcript tab 37 for accessing a transcript section 39, shown in FIG. 7, that displays a summary description of the use interaction, and a User Data tab 38 for accessing a contents notes section 41, shown in FIG. 6. The transcript session 39 has a Transcript field 43 that displays all of the record types 362 that make up the use interaction, with the records 361 selected with the picklist checkboxes 711 of the fields under the tabs 1, 2 displayed appended to and under the record type 362.

The user interface available with the KnowledgeBridge™ processor from ServiceWare, Inc. of Oakmont, Pa. was modified to contain a content notes section 41 with a "Content Needed?" check box 4, a "Draft" check box 5, and a Content Notes field 518. The "Content Needed?" check box 4 is checked when the agent discovers an ambiguity or when she develops or improves a resolution. She may capture the new information/knowledge by filling out the Content Notes field 518, which is a text field for entering notes about missing, incomplete, or inaccurate knowledge in the knowledge base. The field 518 is not visible on the screen 510 until the "Content Needed?" check box 4 is clicked. When it is checked, the Content Notes field 518 contains an Issue section 518a, a Cause section 518b, and a Resolution section 559c appear in the Contents Notes field 518 so that the user may fill in the sections 518a, 518b, 518c to report a problem concerning the knowledge base in a Content Notes memo 518'.

The "Draft" check box 5 allows the agent to save an incomplete interaction report memo. She may start drafting a use interaction memo, but delay its completion until a more convenient time, until more facts are obtained, or until a caller reports back on the success of the resolution.

The query user screen 510 has a Save button 6 and a Clear button 7. The Save button 6 will save an agent resolution for later review. The interaction will either be amended, activated as is to update the knowledge base, or deleted. The Clear button 7 will erase all previously inputted information on the screen. The screen also has a bar, not shown, across the top of the screen 510. The bar has a has a tool selection tab, which is a pull down tab from which the user may select "New Query" or "Open Draft Query".

Record Editor User Interface 24

As seen in FIG. 1e, the GUI 480 has a record editor user interface 24 for the record editor 23. The record editor user interface 24 has a record editor search screen 520 and a record editor edit screen 530. It also has a record editor bar, which is displayed above each of the screens 520, 530. The bar, not shown, has a tool selection tab, which is a pull down tab from which the user may select "Add New Record" or "Search Records." Selecting "Search Records" on the tool selection tab brings up the record editor search screen 520. Selecting "Add New Record" on the tool selection tab brings up a blank record editor edit screen 530.

The record editor search screen 520, shown in FIG. 8, has a Record ID field 521, Creator field 522, Creation Date field 523, "Last Modified by" field 524, Last Modified Date field 525, Record Type field 526, and Knowledge State field 527. It also has a Records section 8 having a Records field 528 and a Record Name field 529. The record ID field 521 is a free unlabeled text field for entering a record ID. The Creator field 522 and "Last Modified by" field 524 are free text fields that also contain a picklist of the persons authorized to add and modify records to the knowledge base memory 35. The Creation Date field 523 and Last Modified Date field 525 are date fields into which the dates of creation and last modification of the record can be entered or displayed.

The Record Type field 526 contains a picklist of the knowledge base record types 362, from which selections may be made. The Knowledge State field 527 contains a picklist of the knowledge state possible for the record, which in the preferred embodiment are "Active" and "Obsolete." The Records field 528 is a free unlabeled text field for entering a description of the target record. The Record Name field 529 contains a picklist, in which returned records are displayed and from which selections may be made when the knowledge engine 30 is searched for the contents of the Records field 528.

The record editor search screen 520 also has a Search button 9, a Reset button 11, and a Cancel button 12. The Search button 9 will submit the contents of the Records field 528 to the knowledge engine 30. The Reset button 11 will erase all previously inputted information on the screen. The Cancel button 12 will end the search.

Figure 9:
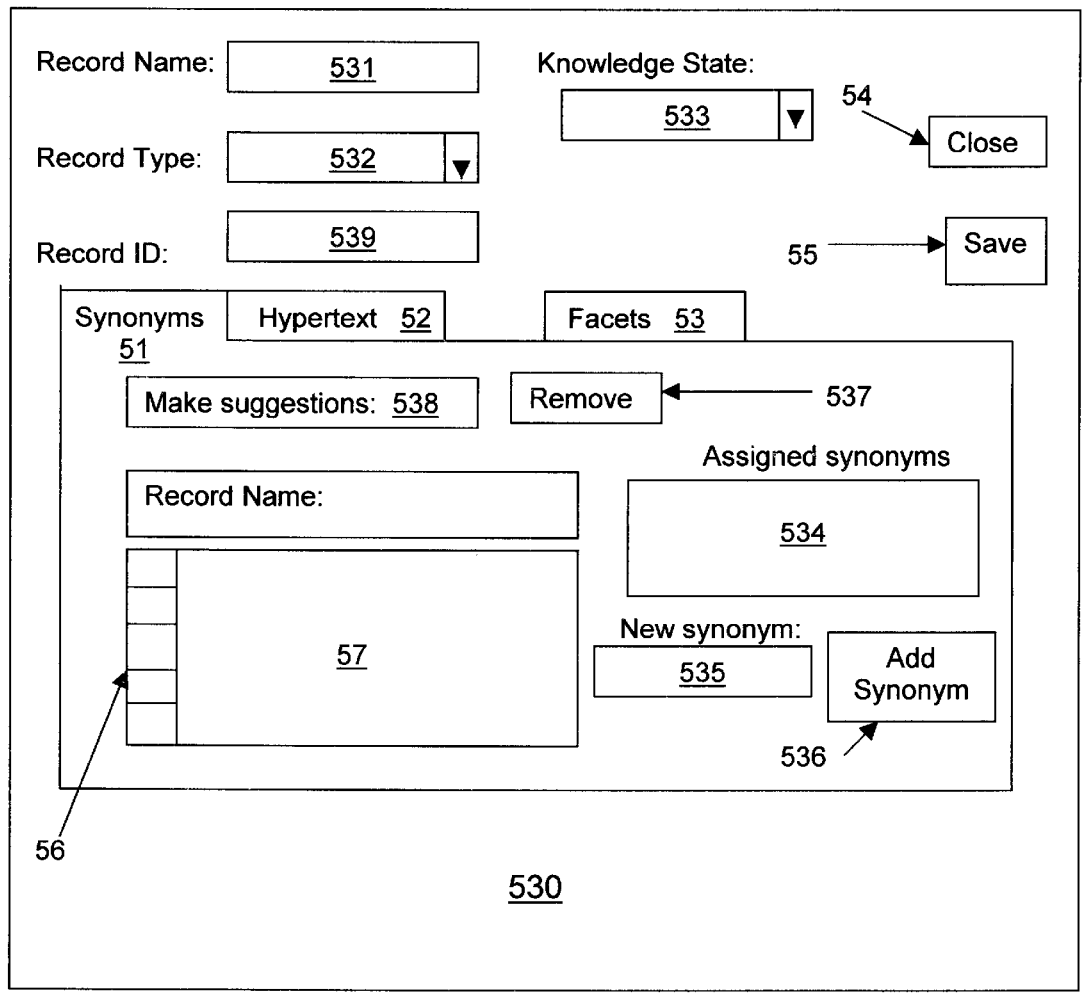
FIG. 9 is a block diagram of the record editor edit screen 530 for the record editor user interface 24 for the record editor 23 shown in FIGS. 1a and 1e.

The record editor edit screen 530, shown in FIG. 9, has a Record Name field 531, a Record Type field 532, a Knowledge State field 533, and a Record ID field 539. The Record name field 531 is a free text field. The Record Type field 532 contains a picklist of the knowledge base record types 362, from which selections may be made. The Knowledge State field 533 contains picklists of the types of knowledge state possible for the record, which in the preferred embodiment are "Active" and "Obsolete." The screen 530 also has a Close button 54 and a Save button 55. The Close button 54 will end the editing session. The Save button 55 will submit the edits to the knowledge engine for entry into the knowledge base memory 35.

The Record Editor Edit screen 530 has three descriptive tabs, a Synonym tab 51 for entering or modifying a record's synonyms, a Hypertext tab 52 for accessing the record's Hypertext entries, and a Facet tab 53 for accessing the record's facet entries. When the Synonym tab 51 is selected, the screen displays an Assigned Synonyms field 534, a New Synonym field 535, an Add Synonym button 536, a Remove button 537, a Make Suggestion button 538, and a Suggestions field 57. The Assigned Synonyms field 534 is a field that displays the synonyms currently assigned to the record. The New Synonym field 535 is a free text field for entering new synonyms to the Assigned Synonyms field 534. The Add Synonym button 536 will add the new synonym to the Assigned Synonyms field 534. The Remove button 537 will remove any highlighted synonym from the Assigned Synonyms field 534. The Make Suggestion button 538 will display suggested synonyms in the Suggestions field 57, which is a picklist field with a picklist checkbox 56 with which the displayed record can be selected.

Knowledge Object Editor User Interface 26

As seen in FIG. 1e, the GUI 480 has a knowledge object editor user interface 26 for the knowledge object editor 25. The knowledge object editor user interface 26 has a knowledge object editor record search screen 540, a knowledge object editor open knowledge object screen 560, and a knowledge object editor edit screen 550. The knowledge object editor user interface 26 also has a knowledge object editor bar, not shown, which is displayed above each of the screens 540, 550, 560. The bar has a tool selection tab, which is a pull down tab from which the user may select "Add Knowledge Object", "List Knowledge Objects", or "Search Knowledge Objects." Selecting "Search Knowledge objects" on the tool selection tab brings up the knowledge object editor search screen 540. Selecting "Add Knowledge Object" on the tool selection tab brings up a blank knowledge object editor edit screen 550. Selecting "List Knowledge Objects" on the tool selection tab brings up a knowledge object editor open knowledge object screen 560.

Figure 10B:
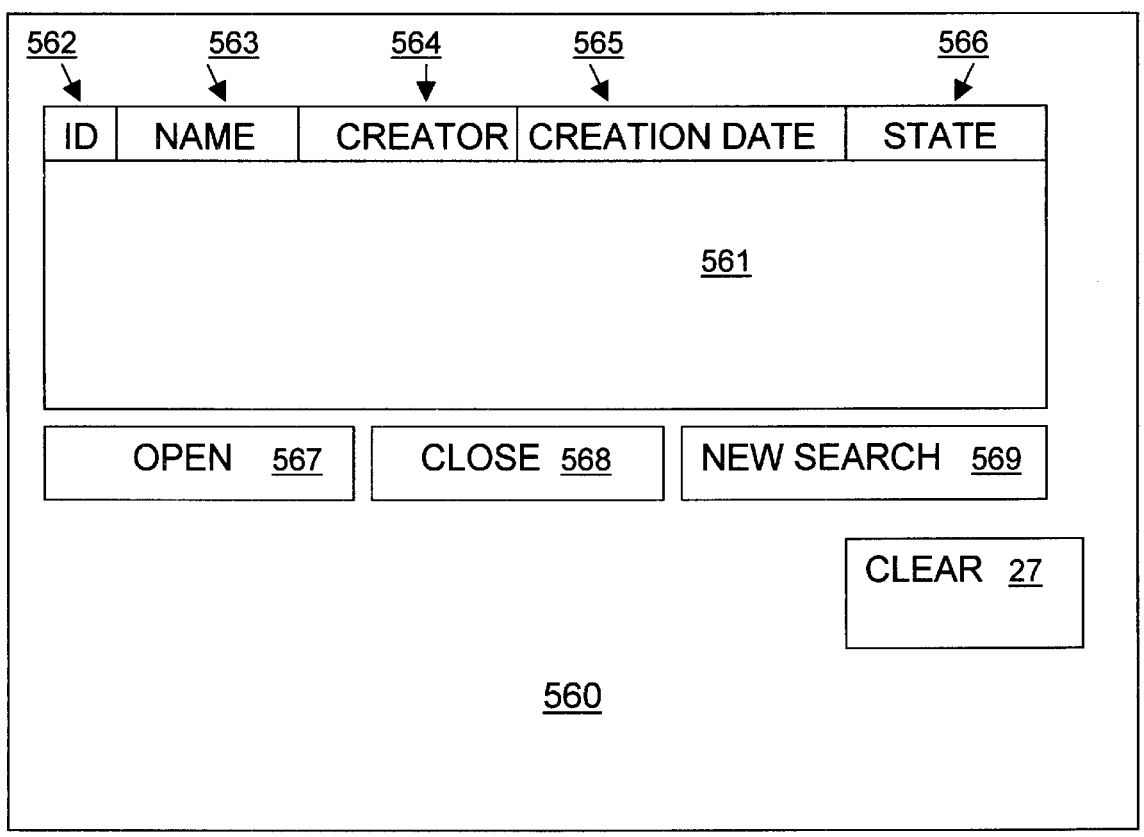
FIG. 10b is a block diagram of the knowledge object open knowledge object screen 560 for the knowledge object editor 25 shown in FIGS. 1a and 1e.

The knowledge object editor record search screen 540, shown in FIG. 10a, has a Knowledge Object ID field 541, a Creator field 542, a Creation Date field 543, a "Last Modified by" field 544, a Last Modified Date field 545, a Knowledge Object Type field 546, and Knowledge State field 547. The Knowledge State field 547 contains picklists of the types of knowledge object states, such as draft, pending, active or obsolete, from which selections may be made.

The knowledge object editor record search screen 540 also has a Records section 18 having a Record field 548, a Record Name field 549, and a Knowledge Object Contents field 507. The Record field 548 is a free unlabeled text field for entering a description of the target record. The Record Name field 549 contains a picklist, from which selections may be made when the knowledge base memory 35 is searched for the contents of the Record field 548. Each line of the picklist has a picklist checkbox 703 with which the displayed record can be selected. The Knowledge Object Contents field 507 displays all of the record types 362 that make up the knowledge object 360, any records 361 selected from the picklist of field 549 are displayed appended to and under the record type 362.

The knowledge object editor record search screen 540 also has an AND checkbox 701, an OR checkbox 702, a Search button 19, a Reset button 21, and a Cancel button 17. The AND checkbox 701 allows conjunctive searches to be conducted on the records displayed in the Knowledge Object Contents field 507. The OR checkbox 702 allows disjunctive searches to be conducted on the records displayed in the Knowledge Object Contents field 507. The Search button 19 will submit the contents of the Record field 548 to the knowledge engine 30. The Reset button 21 will erase all previously inputted information on the screen. The Cancel button 12 will end the search.

The knowledge object editor open knowledge object screen 560 shown in FIG. 10a has a Knowledge Object List field 561 that contains a picklist of knowledge objects returned through a search using the knowledge object editor record search screen 540. The Knowledge Object List field 561 is organized into columns to display particulars of the returned objects. The columns include the ID column 562 to display the ID number of the knowledge object, the Name column 563 to display the name of the agent 13 who first defined the support interaction embodied in knowledge object, the Creator column 564 to display the name of the author 14 or analyst 15 who activated the knowledge object, the creation date column 565, and the knowledge state column 566 to display the knowledge state of the knowledge object.

The knowledge object editor open knowledge object screen 560 also has an Open button 567, a Close button 568, a New Search button 569, and a Clear button 27. The Open button 567 opens a knowledge object that is highlighted in the Knowledge Object List field 561. The Close button 568 closes the screen 560 and returns the display to the knowledge base main screen. The New Search button 569 clears the data displayed on the screen 560 and return to the knowledge object editor record search screen 540.

Figure 11:
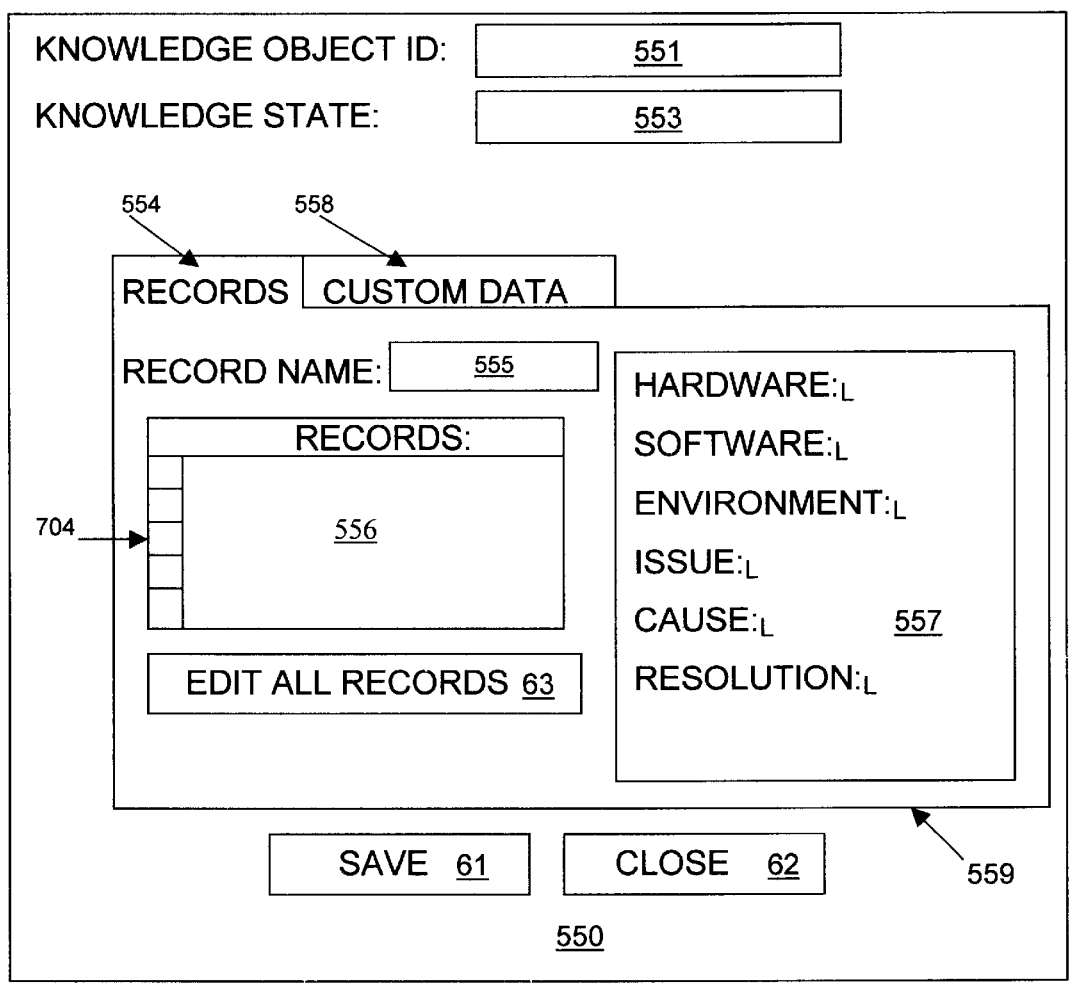
FIG. 11 is a block diagram of the knowledge object editor edit screen 550 for the knowledge object editor 25 shown in FIGS. 1a and 1e, when the Records tab is selected.
Figure 12:
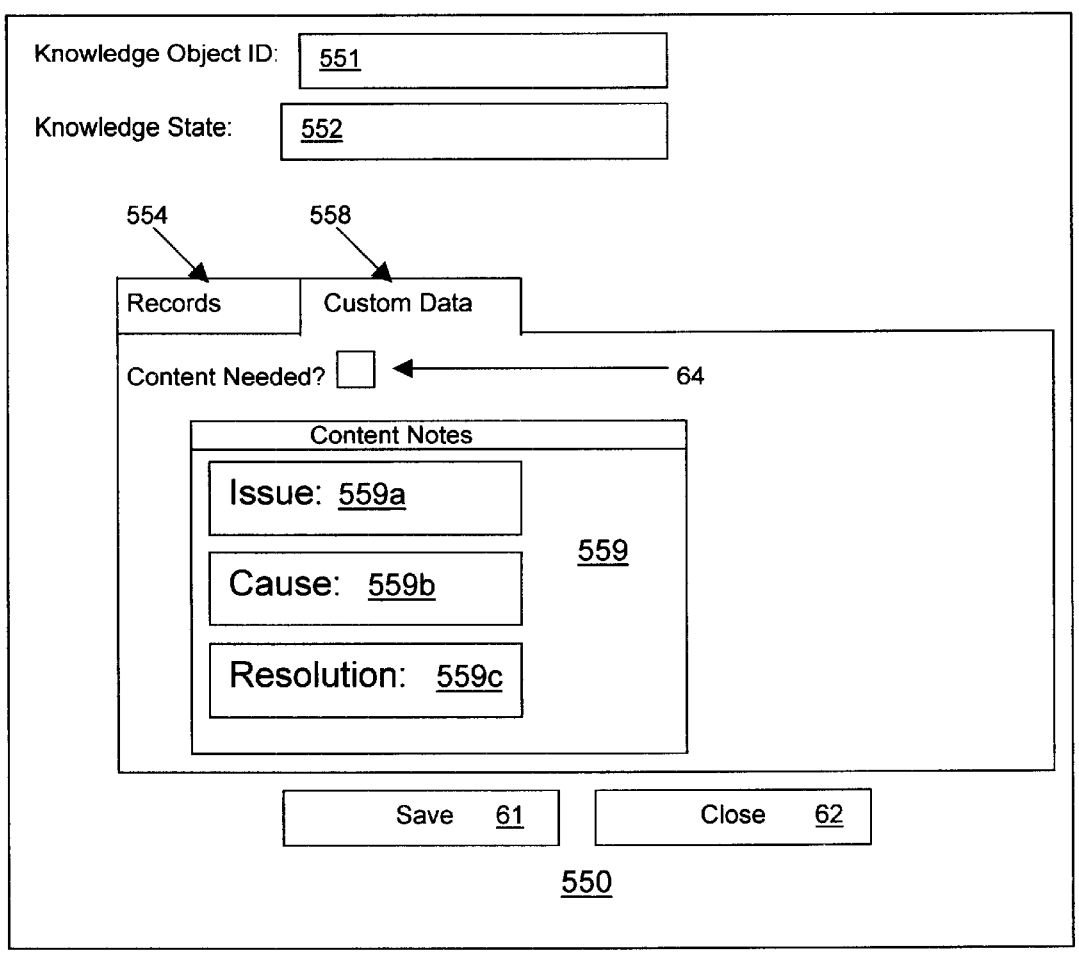
FIG. 12 is a block diagram of the knowledge object editor edit screen 550, when the Records tab is selected.

The knowledge object editor edit screen 550, shown in FIGS. 11 and 12, has a read only Knowledge Object ID field 551 that displays the identification of the knowledge object 360. It also has a Knowledge State field 553 that contains a picklist for selecting the state (either draft, pending, active, or obsolete) of the knowledge object 360.

The knowledge object editor edit screen 550 has two descriptive tabs, a Records tab 554 for displaying and entering records for each of the knowledge object's record types into the knowledge object 360, and a Custom Data tab 558 for displaying the Content Notes memo created in the Content Notes field 518 of the Record Editor Edit screen 510 shown in FIG. 6. The knowledge object editor edit screen 550 when the Records tab 554 is selected is shown in FIG. 11. The knowledge object editor edit screen 550 when the Custom Data tab 558 is selected is shown in FIG. 12.

When the Records tab 554 is selected, the screen 550 shows a Record Name field 555 and a Records picklist field 556, a Knowledge Object Contents field 557, and an "Edit All Records" button 63. Each line of the Records picklist field 556 has a picklist checkbox 704 with which the displayed record can be selected. The Knowledge Object Contents field 557 displays all of the record types 362 that make up the knowledge object 360, and all of the associated records 361 that are assigned to the record type 362 for the knowledge object 360. The associated records 361 are displayed appended to and under the record type 362. The "Edit All Records" button 63 calls the record editor edit screen 530 so that records can be edited.

A record 361 is assigned to a record type 363 by entering its record name into the Record Name field 555. One or more records may be selected by checking its associated picklist checkbox 704. The record is automatically displayed under its associated record type 361 in the Knowledge Object Contents field 557.

When the Custom Data tab 558 is selected, the screen 550 shows a "Content Needed?" checkbox 64 and a Content Notes field 559. The Content Notes field 559 is a text field that displays and allows for editing of the Content Notes memo 518' created in the Content Notes field 518 of the Record Editor Edit screen 510. The Content Notes field 559 contains an Issue section 559a, a Cause section 559b, and a Resolution section 559c that together define the Content Notes memo 518'.

Knowledge Metrics 431

General

Certain of the knowledge metrics 431 developed by the knowledge monitoring system 430 are used by the knowledge maintenance system 450 to manage backlog. They include a Absolute Knowledge Growth metric 435, a Knowledge Growth Rate metric 436, and a Knowledge Turnaround Time metric 437, all shown in FIG. 14. Also shown in FIG. 14 is the Knowledge Delivery Volume metric 438, from which is developed the Overall Knowledge Delivery metric 438", shown in FIG. 17.

Returning to FIG. 14, the Absolute Knowledge Growth metric 435 is the change in the count of the number of active knowledge during a selected period. The Knowledge Growth rate metric 436 is a percentage calculated from the Absolute Knowledge Growth metric 435, compared to a count of the number of active knowledge objects 360 in the knowledge base memory 35 at the beginning of the selected period of time. The Knowledge Turnaround Time metric 437 is the average time elapsed from the time that a suggestion is made for new knowledge to be incorporated into the knowledge base until the time of availability of the new knowledge in the knowledge base.

Absolute Knowledge Growth Metric 435 and Knowledge Growth Rate Metric 436

Figure 15:
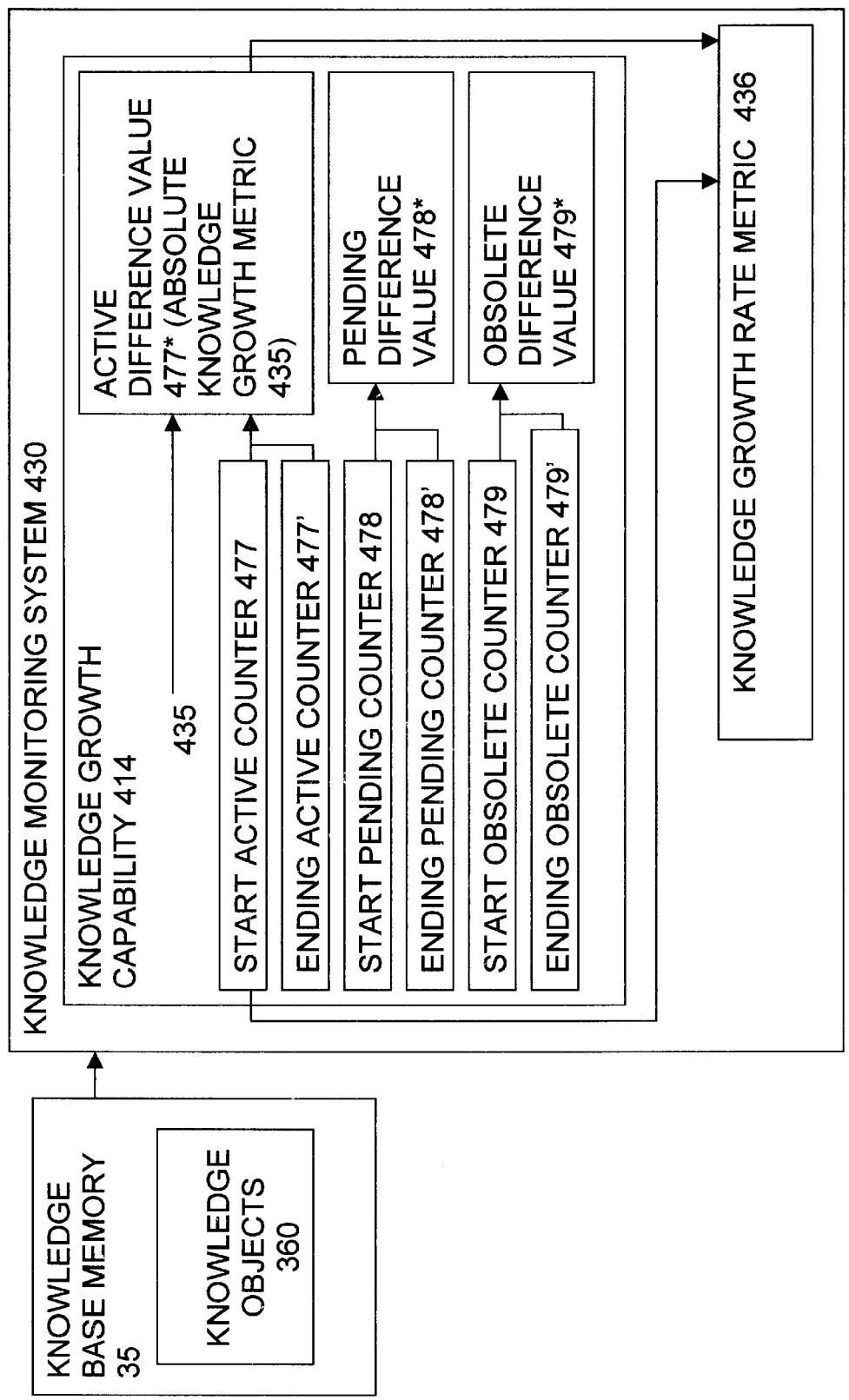
FIG. 15 is a block diagram of the development of the Absolute Knowledge Growth metric 435 and the Knowledge Growth Rate metric 436 shown in FIG. 14.

The Absolute Knowledge Growth metric 435, which is the size that the knowledge base grew during a selected period, is developed as shown in FIG. 15. When any changes are made to a knowledge object 360, such as when it was created, made pending, activated, returned to pending, obsoleted, the particulars of the change are recorded and stored with the knowledge object in the memory 35. The particulars include the change, the date of the change and the person effecting the change.

The knowledge monitoring system 430 has a knowledge growth capability 414 with a start active counter 477 and an end active counter 477'. When the knowledge monitoring system 430 develops the Absolute Knowledge Growth metric 435, it identifies the selected period of time and the beginning and end dates for the selected period of time, and retrieves all knowledge objects that were active on the start date of the selected period of time. It increments the start active counter 477 for every active knowledge object that it retrieves. It then retrieves all knowledge objects that were active on the end date of the selected period of time, incrementing the ending active counter 477' for every active knowledge object that it retrieves.

The knowledge growth capability 414 develops the active difference value 477* by subtracting the value of the start active counter 477 from the ending active counter 477'. The active difference value 477* is the Absolute Knowledge Growth metric 435. It then develops the Knowledge Growth Rate metric 436 by dividing the Absolute Knowledge Growth metric 435 by the value of the beginning active counter 477.

The knowledge growth capability 414 also stores other values and develops other metrics concerning knowledge object count in the memory 35, to be used in reports for the reporting systems 42, 46. For example, for the Pending Knowledge Objects Balance Sheet Report 461, it stores the number of pending knowledge objects at the start and end of the selected time period and the number of knowledge objects obsoleted during the selected time period to be used in.

The knowledge growth capability 414 develops the pending and obsolete knowledge object counts with a start pending counter 478, an ending pending counter 478', a start obsolete content counter 479 and an ending obsolete content counter 479'. When the knowledge monitoring system 430 develops the Pending Knowledge Objects Balance Sheet Report 461, it identifies the selected period of time and the beginning and end dates for the selected period of time, and retrieves all knowledge objects that were pending or obsolete on the start date of the selected period of time. It increments the start pending counter 478 for every pending knowledge object that it retrieves, and the start obsolete content counter 479 for every obsolete knowledge object that it retrieves. It then retrieves all knowledge objects that were pending or obsolete on the end date of the selected period of time, incrementing the ending pending counter 478' for every pending knowledge object that it retrieves, and the ending obsolete content counter 479 for every obsolete knowledge object that it retrieves.

The knowledge growth capability 414 develops the pending difference 478* by subtracting the value of the start pending counter 478 from the end pending counter 478'. It develops the obsolete difference 479* by subtracting the value of the start obsolete counter 479 from the end obsolete counter 479'.

Knowledge Turnaround Time Metric 437

The Knowledge Turnaround Time metric 437, also known as the Turnaround Time metric 437, may be developed manually, with authors 14 keeping track of when they receive a report of need for knowledge base content and when they activate the new knowledge developed therefrom in the knowledge base. The authors' records could be used to develop average turnaround times for each author 14, which could be averaged to develop a team turnaround time.

Figure 16:
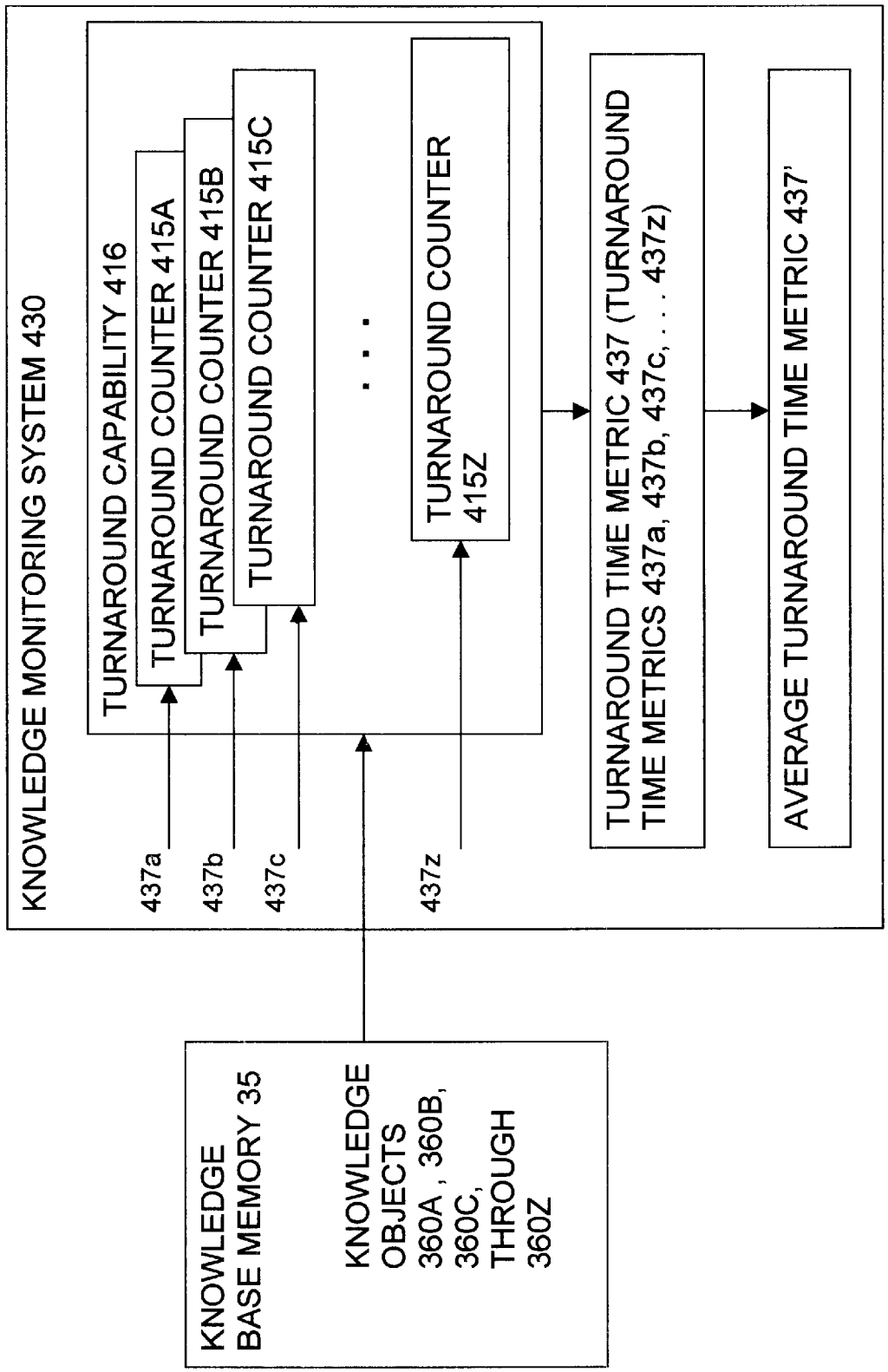
FIG. 16 is a block diagram of the development of the Turnaround Time metric 437 shown in FIG. 14.

Alternatively, the knowledge turnaround time could be developed as shown in FIG. 16. When a knowledge object is saved, the engine stores the contents displayed in the Creation date field 543 and the Date Activated field 509 in the knowledge object editor search screen 540. The knowledge monitoring system 430 has a turnaround capability 416 having turnaround counters 415a, 415b, 415c, through 415z for each knowledge object 360a, 360c, 360c, through 360z in a set.

When the knowledge monitoring system 430 develops the Knowledge Turnaround Time metric 437, it identifies the selected period of time and the beginning and end dates for the selected period of time, and retrieves all of the knowledge objects that were activated during the selected period of time. The capability 416 then counts for each knowledge object in the returned set the number of days between the dates of the creation and activation, stores the count in the counters 415a, 415b, 415c, through 415z, and provides the Turnaround Time metric 437, which is the associated Turnaround Time metrics 437a, 437b, 437c, through 437z, in instantiation reports of the knowledge objects 360a, 360b, 360c, through 360z. The turnaround capability 416 could also average the values of the counters 415a, 415b, 415c, through 415z for defined sets of knowledge objects to develop an Average Turnaround Time 437', and provide aggregation reports of the averages.

Knowledge Delivery Volume Metric 438

The Knowledge Delivery Volume metric 438 is generated by keeping a count of the number of new knowledge objects delivered to a second entity in a selected period. The metric 438 could be developed by counting the number of active knowledge objects reported in a periodic report to a customer, or it could be the count of the number of new knowledge objects activated in the selected period of time.

Figure 17:
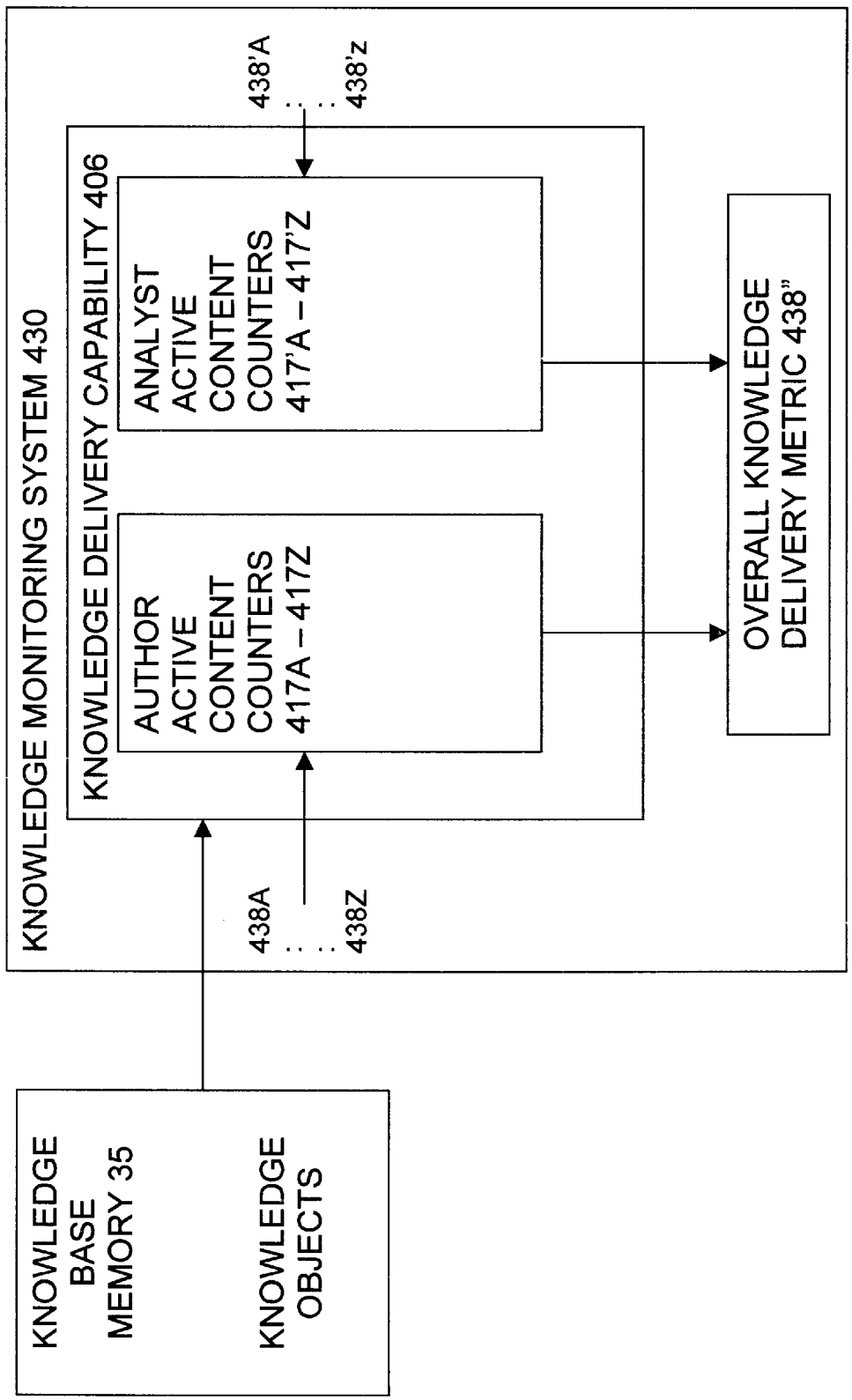
FIG. 17 is a block diagram of the development of the Overall Knowledge Delivery Volume metric 438".

The knowledge monitoring system 430 develops the Knowledge Delivery Volume metric 438 as seen in FIG. 17 by keeping track of how many knowledge objects 360 have been activated by each knowledge author 14 and analyst 15 during the selected period. The knowledge monitoring system 430 has a knowledge delivery capability 406 that develops the knowledge object activation count for each author 14 and analyst 15 using author active content counters 417a through 417z, one for each knowledge author 14a through 14z, and analyst active content counters 417'a through 417'z, one for each knowledge analyst 15a through 15z.

Agent knowledge object activation is not tracked because agents do not activate knowledge objects. As discussed above, the knowledge maintenance system 450 provides that only knowledge authors 14 and knowledge agents are able to activate knowledge objects. Agent input into the knowledge base is always in the pending state. Authors 14 and agents activate by adding new knowledge objects to the knowledge base memory 35, or by removing the pending status of agent queries, which are stored in the memory 35 as pending knowledge objects 360. Knowledge object activation occurs when an author 14 or analyst 15 saves the query. In response, the knowledge engine 30 stores the knowledge object, saving with it its date of activation and the identification of the person who activated it.

When the knowledge monitoring system 430 develops the Knowledge Delivery Volume metric 438, the capability 406 identifies the selected period of time and the beginning and end dates for the selected period of time, and retrieves all of the knowledge objects having dates of activation between the start and end dates of the selected period of time. For each knowledge object, the monitoring system 430 identifies the person who activated the object and increments the appropriate active content counter 417a through 417z or 417'a through 417'z that is associated with the author 14 or analyst 15 who activated the knowledge object 360.

The active content counters 417a through 417z and 417'a through 417'z are the Knowledge Delivery Volume metrics 438a through 438z and 438'a through 438'z for each author 14 and analyst 15. The knowledge delivery capability 406 then sums the Knowledge Delivery Volume metrics 438a through 438z and 438'a through 438'z to develop the Overall Knowledge Delivery Volume metric 438".

Knowledge Object Use System 403

As noted in FIG. 14, in addition to the developing the above metrics, the knowledge monitoring system 430 can track the number of times a selected knowledge object 360 is recorded in total and for a selected period of time using a Knowledge Object Use System 403. Knowledge object use tracking is also used in reports developed for the knowledge maintenance system 450, described below.

Figure 18:
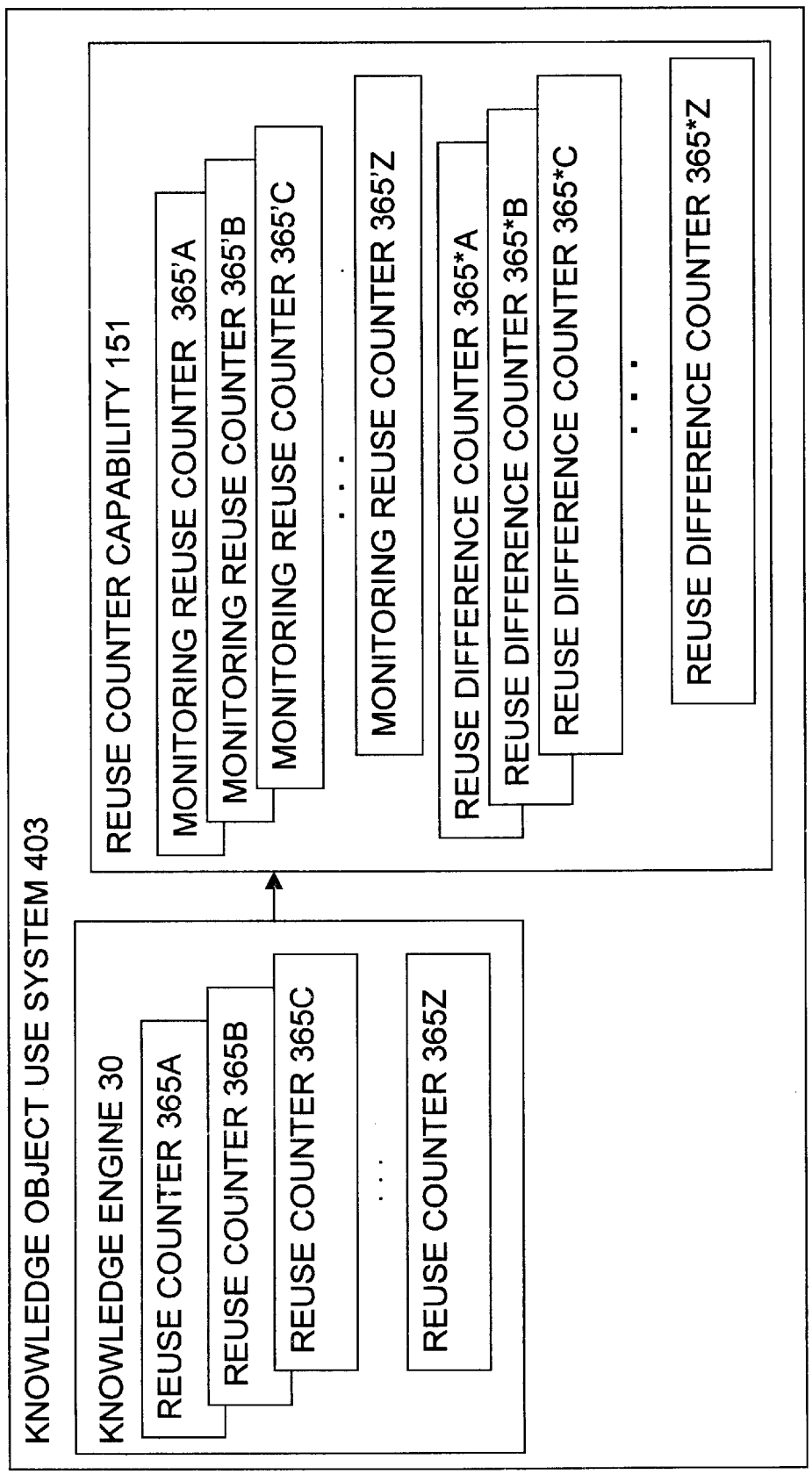
FIG. 18 is a block diagram of the knowledge object use system 403 as shown in FIG. 14.

Referring to FIG. 18, the knowledge engine 30 has reuse counters 365a, 365b, 365c, through 365z, one for each knowledge object 360a, 360b, 360c, through 360z. The reuse counter 365r keeps track of the number of times the knowledge object 360r is recorded, which occurs every time that the Save button on the query users screen 510 is selected to save a query that matches the knowledge object 360r. The knowledge monitoring system 450 has a reuse counter capability 151 having monitoring reuse counters 365'a, 365'b, 365'c, through 365'z to store the current value of each reuse counter 365a, 365b, 365c, through 365z. It also has reuse difference counters 365*a, 365*b, 365*c, through 365*z to generate the number of times that the reuse counters 365 were incremented during a selected period.

When the knowledge monitoring system 430 develops the number of times a selected knowledge object 360 is recorded, the capability 151 identifies the selected period of time and the beginning and end dates for the selected period of time, and retrieves the values of the reuse counters 365a, 365b, 365c, through 365z, and retrieves all of the knowledge objects the use of which were recorded during the selected period of time. The capability stores the value of each reuse counter 365a, 365b, 365c, through 365z in monitoring reuse counters 365'a, 365'b, 365'c, through 365'z and increments the reuse difference counters 365*a, 365*b, 365*c, through 365*z for each time that its associated knowledge object 365a, 365b, 365c, through 365z was recorded during the selected period of time.

Knowledge Maintenance Reporting Subsystems 46

Specifications are also developed for the reporting subsystems of the back end 40. Reporting specifications are developed detailing a standard set of internal and external reports. The reporting system of the preferred embodiment has a knowledge monitoring reporting subsystem 42 that supports the knowledge monitoring process 430 and a knowledge maintenance reporting subsystem 46 that supports the knowledge maintenance process 450.

Figure 21:
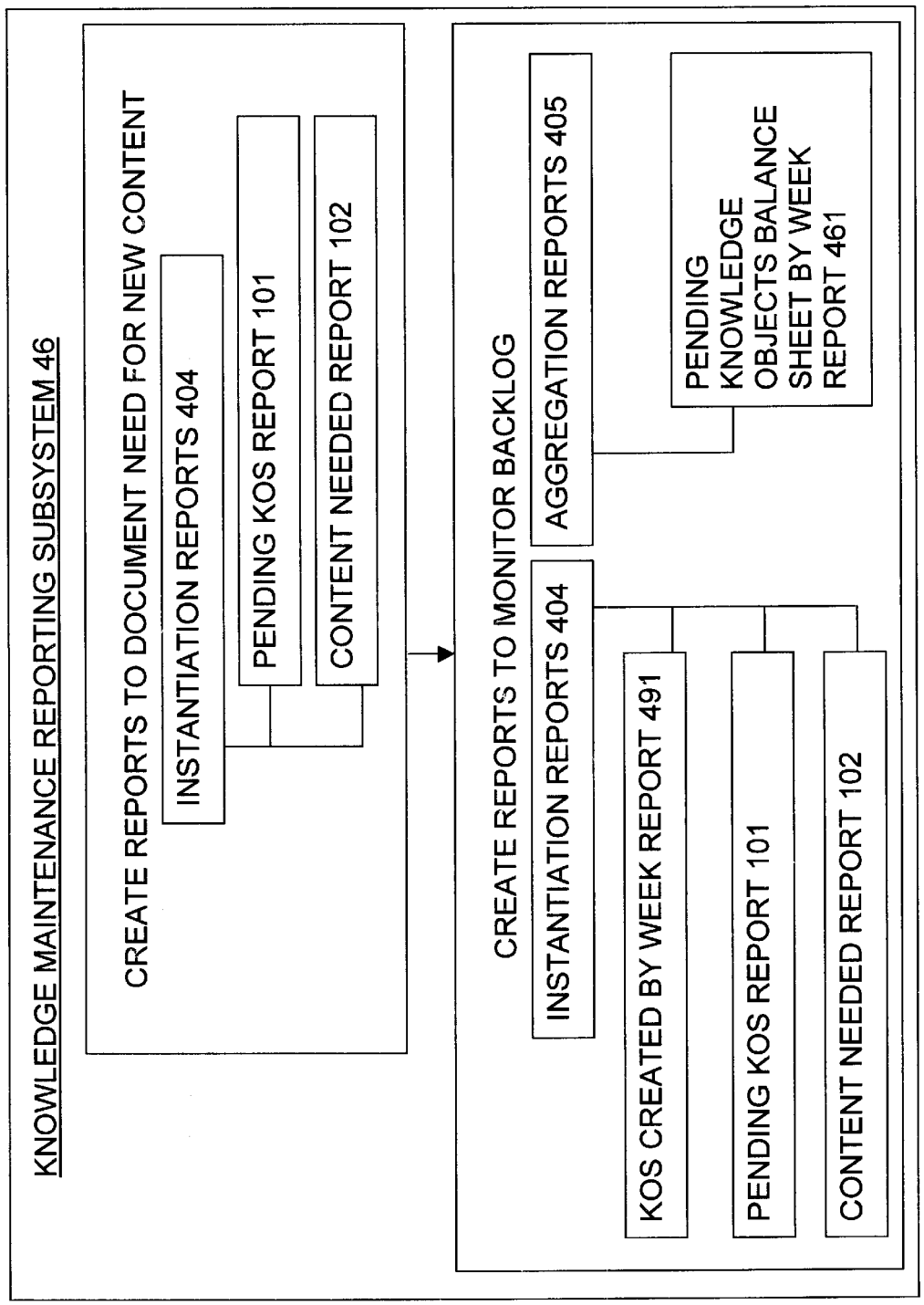

Any conventional report generating user interface may be used to implement the. The knowledge maintenance reporting subsystem 46 described below. The subsystem 46 is developed to support the knowledge maintenance system 450 in evaluating potential need for new content in the knowledge base. The knowledge maintenance reporting subsystem 46 is coupled with the knowledge base maintenance system 450. As shown in FIG. 21, the knowledge maintenance reporting subsystem 46 provides reports of need for new content for the knowledge base system 10 and reports of authoring output to the knowledge analyst 15 to assist in backlog management.

The specifications for the knowledge maintenance reporting subsystem further require the knowledge base architecture 342 to support periodic collection and reporting of memos documenting knowledge base use and need for new content and of data about knowledge authoring.

The knowledge maintenance reporting subsystem 46 provides two instantiation reports for documenting need for new content, to cover the two channels described in the knowledge base use process 410, described below, by which agents may report need for new content. First, the knowledge maintenance reporting subsystem 46 compiles and produces a Pending Knowledge Objects report 101 that lists the particulars of all of the knowledge objects 360 in a pending state. Second, the knowledge maintenance reporting subsystem 46 provides a Content Needed report 102 that lists the particulars of all of the knowledge objects 360 that have the "Content Needed" checkbox 64 activated. The particulars for both reports include the knowledge object ID number, date of creation, the agent creator, the knowledge object's record types and their associated record names, and content notes, if any.

For backlog management, the instantiation reports, Content Needed report 102 and the Knowledge Objects Created by Week report 491, document authoring output to assist the knowledge analyst 15 in backlog management. The Knowledge Objects Created by Week report 491, shown in FIG. 20, identifies the particulars for all the knowledge objects created in the selected week. The report 491 is both an instantiation report 404 and an aggregation report 405. The report 491 is an instantiation report that identifies the particulars for all the knowledge objects created in the selected week and the value of their associated reuse difference counters 365* and reuse counters 365'r. However, for purposes of the knowledge monitoring subsystem, it is also an aggregation report because the knowledge objects in the report are totaled to provide the weekly Overall Knowledge Delivery Volume metric 438'', which is developed by the knowledge monitoring system 430.

For each knowledge object 360a through 360z, the report 491 identifies the knowledge object ID number, author 14, and creation date. For each knowledge object, such as knowledge object 360r, the report 491 also identifies for all of the records, such as the record name 361r, the Hardware record 361e–r, Software record 361f–r, Environment record 361g–r, Issue record 361a–r, Cause record 361b–r, and Resolution record 361c–r. The report 361 may be printed for each author 14 to identify how many knowledge objects an author 14 created in a week.

The maintenance system 450 also provides aggregation reports for documenting authoring output assist the knowledge analyst 15 in backlog management. For example, the Pending Knowledge Objects Balance Sheet by Week report 461 is used to show the extent of progress in a selected week toward eliminating authoring backlog.

The Pending Knowledge Objects Balance Sheet by Week report 461, shown in FIG. 19, is developed by the knowledge monitoring system 430 to present the Absolute Knowledge Growth metric 435, Knowledge Growth Rate metric 436, and Knowledge Turnaround Time metric 437. The Balance Sheet report 461 contains a Pending Start column 462 to display the value of the start pending counter 478, which is the number of pending knowledge objects in the knowledge base memory 35 at the start of the week. The report 661 also has a Pending Added column 463 to display the value of the total agent pending query value 408' developed by the knowledge object state counter capability 409. The value 408' is the number of pending knowledge objects added during the week.

The Balance Sheet report 461 also has a Pending Left column 464 to display the value of the ending pending counter 478', which is the number of pending knowledge objects left at the end of the week. The Balance Sheet report 461 also contains a Promoted to Active column 465 to display the Absolute Knowledge Growth 435, which is the number of pending knowledge objects that were promoted to active state during the week. The report 461 has a Discarded to Obsolete column 466 to display the obsolete content counter value 479*, which is the number of knowledge objects that have been discarded to the obsolete state in the week.

The Balance Sheet report 461 contains an Average Days to Active column 467 to display the Average Knowledge Turnaround Time metric 437', which is the average number of days that a knowledge object remained in the pending state before it was activated. The Balance Sheet report contains Rate % Activated column 456 that displays the Knowledge Growth rate metric 436.

In particular, the Pending Start column 462, the Pending Added column 463, and the Pending Left column 464 could provide an agent with the size of the backlog. The Promoted to Active column 465 and Discarded to Obsolete column 466 could show an agent how many objects an author 14 can address in a week. In addition, the Average Days to Active column 467 could indicate a problem with knowledge turnaround. The Balance Sheet report 461 could be organized by author 14 so that the analyst 15 could review authoring progress by author 14. The columns could then be totaled so that the analyst 15 could review progress for the entire knowledge base.

Knowledge use may be monitored in any other way deemed appropriate for the organization. For example, the Knowledge Re-use by Suggestion Originator for the Week report 130, shown in FIG. 22, shows all of the knowledge objects that were used during the selected week, sorted by the agent who made the suggestion for the knowledge object by saving a unique query. The report 130 has a Suggestion Originator column 131 that identifies the agents, such as agent 13w and agent 13q. It also has the Knowledge Objects Authored column 132 that simply lists by ID number all of the knowledge objects from the agent and that were used during the selected week. The Create Date column 133 identifies the creation date of the objects identified in the Knowledge Objects Authored column 132. As a measure of the quality of each agent's output, the report 130 has a Knowledge Object Reuse column 135 that displays the number of times that each knowledge object reported in the Knowledge Objects Authored column 132 was used that week by displaying the contents of the knowledge object reuse difference counter 365* for the object.

In the example shown in FIG. 33a, three knowledge objects suggested by agent 13w and identified by their identification numbers, ID 360a, ID 360f, and ID 360u, were used. They were created on the dates DATE a, DATE f, DATE u respectively and were used the number of times stored in the reuse difference counters 365*a, 365*f, and 365*u respectively. The report continues to show that two knowledge objects suggested by agent 13q and identified by their identification numbers, ID 360b, ID and 360g respectively, were used. They were created on dates DATE b and DATE g respectively and were used the number of times stored in the reuse difference counters 365*b and 365*g respectively.

The report 130 also has an Agents Total row for each agent in the report 130. The rows, in the present example 134w for agent 13w and 134Q for agent 13q, appear after each agent entry in the report and display two values. The first is the number of knowledge objects suggested by the identified agent 13 and used that week. It is the total of the Knowledge Objects Authored column 132 for the agent 13, which for agent 13w would be three and for agent 13g would be two. The second value is the total number of times that a suggestion from the agent 13 was used during the week, which is the total of the Knowledge Object Reuse column 135 for the agent 13. Finally, the report 130 has a Totals row 134' for displaying the grand total of all entries in the Knowledge Objects Authored column 132 and the Knowledge Object Reuse column 135.

Knowledge Base Construction and Seeding

General

The seed case development process 140 is used to develop seed case knowledge objects for the domain selected in the domain analysis using the reservoirs identified in the reservoir mapping and the architecture defined in the vector analysis. They follow the authoring conventions and guides and templates developed in the vector analysis, and seed in the order and numbers developed with the assistance of the seeding methodology indicator.

Domain and reservoir selection and seeding methodology are described in detail in the in the co-pending related patent applications, U.S. Ser. No. 09/382,057, entitled Method and System for Development of a Knowledge Base System, by Sharon Stier and Debra Ann Haughton (Applicant Reference No. S1/P01) and U.S. Ser. No. 09/379,822, entitled Method of Selecting Desired Domains and for Developing a Seeding Methodology for a Knowledge Base System, by Sharon Stier and Debra Ann Haughton (Applicant Reference No. S1/P02). Both were filed on the even date herewith and are herein incorporated by reference.

Once the seed cases are developed, the knowledge base populating process 80 is used to enter the seed knowledge objects into the knowledge base memory 35.

Seed Case Development Process 140

General

Knowledge authors 14, with the assistance of a knowledge engineer, populate the knowledge base using an innovative authoring methodology involving objectifying the knowledge. The authors 14 are led by the knowledge engineer to build the knowledge through a white board methodology of reviewing current knowledge and past support, "How do I." It is also preferred to have a synonym records type to store at least one synonym with the knowledge object to facilitate retrieval of the record by searching the knowledge base.

The seed case development process 140 by which authors 14 and knowledge engineer develop each potential new knowledge object from information in the knowledge reservoirs is described with reference to FIG. 23.

The seed case development process 140 starts with step 141, in which the authors 14 and knowledge engineer develop a set of unique likely support interaction instantiations. Starting in step 142, they proceed through the set of interaction instantiations, one instantiation at a time, following the knowledge objectification process 150 for each instantiation to develop for each instantiation a knowledge object 360 of the knowledge object type 363 that is appropriate for the instantiation. The knowledge object types 363 are defined in accordance with the knowledge base architecture 342 that was developed in the vector analysis 310.

The knowledge objectification process 150 involves, for each interaction instantiation, developing the knowledge object 360 and its associated records 361. In a step 150a, all of the essential facts are identified for the variables that define the interaction. The facts considered to be essential for the knowledge object type 363 were defined in the vector analysis 310 as the record types 362, specifically Hardware record type 362e, Software record type 362f, Environment record type 362g, Issue/Symptom record type 362a, Cause record type 362b, and Resolution record type 362c. If appropriate for the target instantiation, they also identify facts for the "How do I" record type 362d.

In step 150b, names are developed for the essential facts that will become the record names. Preferably, synonyms are also developed for the names of the essential facts so that at least one synonym is stored with the records in the knowledge object to facilitate retrieval of the knowledge object by searching the knowledge base. The authors 14 and knowledge engineer draft and record name to meet the definitions and format guidelines in the authoring conventions and guidelines that were developed during the architecture definition 341 of the vector analysis 310. In addition, any hypertext or facets necessary to complete describe the records 361 are identified and noted.

The architecture 341 definition of the knowledge object 360 also includes links 364 to show associations between the records 361. However, in the preferred embodiment, the links 364 between the records 361 of a knowledge object 360 are developed by the knowledge engine 30 automatically when the knowledge object 360 is entered into the knowledge base memory 35.

As can be seen, objectifying the knowledge before introducing it into the knowledge base allows records 361 to be used in multiple knowledge objects 360. It also allows the knowledge to be incorporated with the appropriate granularity. Because the knowledge to be introduced is first broken into elements 366, and each element 366 is generalized to the appropriate level, the knowledge object 360 is not incorporated into the knowledge base with just one granularity. All of the object's elements 366 are introduced into the knowledge base at its own appropriate granularity.

Returning to the seed case development process 140, in step 143, the authors 14 and knowledge engineers then conduct the objectified knowledge review 160 on each newly created knowledge object 360. In the objectified knowledge review 160, described in more detail below with reference to FIG. 24, the new knowledge, objectified as a potential knowledge object 660 having potential new records 661 and potential new links 664, is reviewed against the existing knowledge in the knowledge base, which is also objectified into existing knowledge objects 360, to identify affected knowledge objects 760 in the knowledge base that have existing records 361 and links 364 that would be affected by addition of the potential knowledge object 660 into the knowledge base and to develop any additional new knowledge 670 that may be developed when the potential new knowledge object 660 is combined with the affected knowledge objects 760. In the objectified knowledge review 160, the knowledge base is amended to add the new knowledge represented by the potential new record in to the knowledge base while minimizing the affect of adding the new knowledge on the affected knowledge objects. The knowledge base is also amended to incorporate any additional new knowledge that may have been developed by analyzing the affected knowledge objects against the potential knowledge object.

In step 144, when all of the records have been through the objectified knowledge review 160, the potential knowledge objects is reviewed once again to ensure, after any modifications that may have occurred, that it still represents a unique support interaction instantiation. A unique knowledge object could contain at least one unique record, or it could be a unique combination of old records.

In step 145, if the potential knowledge object does not represent a unique instantiation, it is duplicative and deleted from the set of likely support instantiations. In step 146, if the potential knowledge object represents a unique instantiation, it is approved for entry into the knowledge base. It is recorded in a spreadsheet, not shown. Each row of the spreadsheet is a potential knowledge object 660, which in the preferred embodiment is a unique, complete likely support interaction having a likely problem with a resolution. There is a spreadsheet column for each record type 362. All of the record types 362 that have been identified in the vector analysis for the knowledge object type should be filled out in the spreadsheet, one record 361 for each record type 362 in each potential knowledge object 360.

Finally, in step 147, the process described in steps 142–146 is repeated for the remaining instantiations in the set of likely support interactions.

As the knowledge objects to be incorporated into the knowledge base are identified using the Seed Case Development process 140, the knowledge base takes form.

Objectified Knowledge Review 160

General

In every knowledge base, it is possible that that knowledge could be incorporated into the knowledge base in a duplicative or redundant fashion. The purpose of the objectified knowledge review 160 is to minimize that possibility by testing for and, if found, minimizing synonymic redundancy and subset redundancy, which are described in more detail below. A result of the review 160 is that additional new knowledge may be developed by combining the potential knowledge object 660 with any affected knowledge objects 760 found in the knowledge base while examining the possible redundancies.

Having objectified the new knowledge into a potential knowledge object 660 with at least one potential new element 666 of information, the authors 14 and agents conduct the objectified knowledge review 160 on the potential knowledge object 660 one potential new element 666 at a time. In step 161, they test the potential new element 666 against all elements 366 existing in the knowledge base that have the same element type as the potential new element 666, in order to identify affected elements 766 that would be affected by addition of the potential new element 666 into the knowledge base system 10.

Affected elements 766 are identified by looking for inter-relationships between the elements 666, 366 at the most abstract level possible. Affected elements 766 represent elements 366 in the knowledge base that are apparently identical to the potential new element 666, or form apparent dual subset redundancies, apparent subset/superset redundancies, or apparent synonymic redundancies with the potential new element 666.

By so identifying affected elements 766, the affected knowledge objects 660 in which the affected elements 766 are contained are identified. In the review 160 of the preferred embodiment, the potential new elements 666 are potential new records 661 and the affected elements 766 are affected records 761.

In step 162, the set of affected records 761 is reviewed and a record status 662 is developed for the potential new record 661. If affected records 761 were not identified, the record 661 is given a "No Existing Records" status 663, and in step 163, the potential new record 661, now found to be unique and needed in the knowledge base, is added to the knowledge base. If in step 162, affected records 761 were identified, the record is provided with an "Existing Record" status 664 or a "Similar Record" status 665, depending on what affected records were found, and in step 163 a granularity review 170, described in detail below, is conducted of any potential new record 661 having an Existing Record and Similar Record status 664, 665.

In the granularity review 170 of step 163, the potential new record 661 is tested, depending on its record status 662, against each affected record 761 to identify actually identical records, or to identify an actual dual subset redundancy, an actual subset/superset redundancy, or an actual synonymic redundancy between the records 661, 761. In addition, during the granularity review 170, additional new knowledge 670 may be developed when the potential new record 661 is combined with the affected record 761. Decisions are made as to what edits, if any, are needed to the knowledge base memory to incorporate the knowledge represented in the potential new record 661, to eliminate or minimize redundancies between the potential new record 661 and the affected record 761, and to incorporate any additional new knowledge 670 into the knowledge base. Step 164 is repeated until all of the affected records 761 are reviewed against the potential new record 661.

Figure 25:
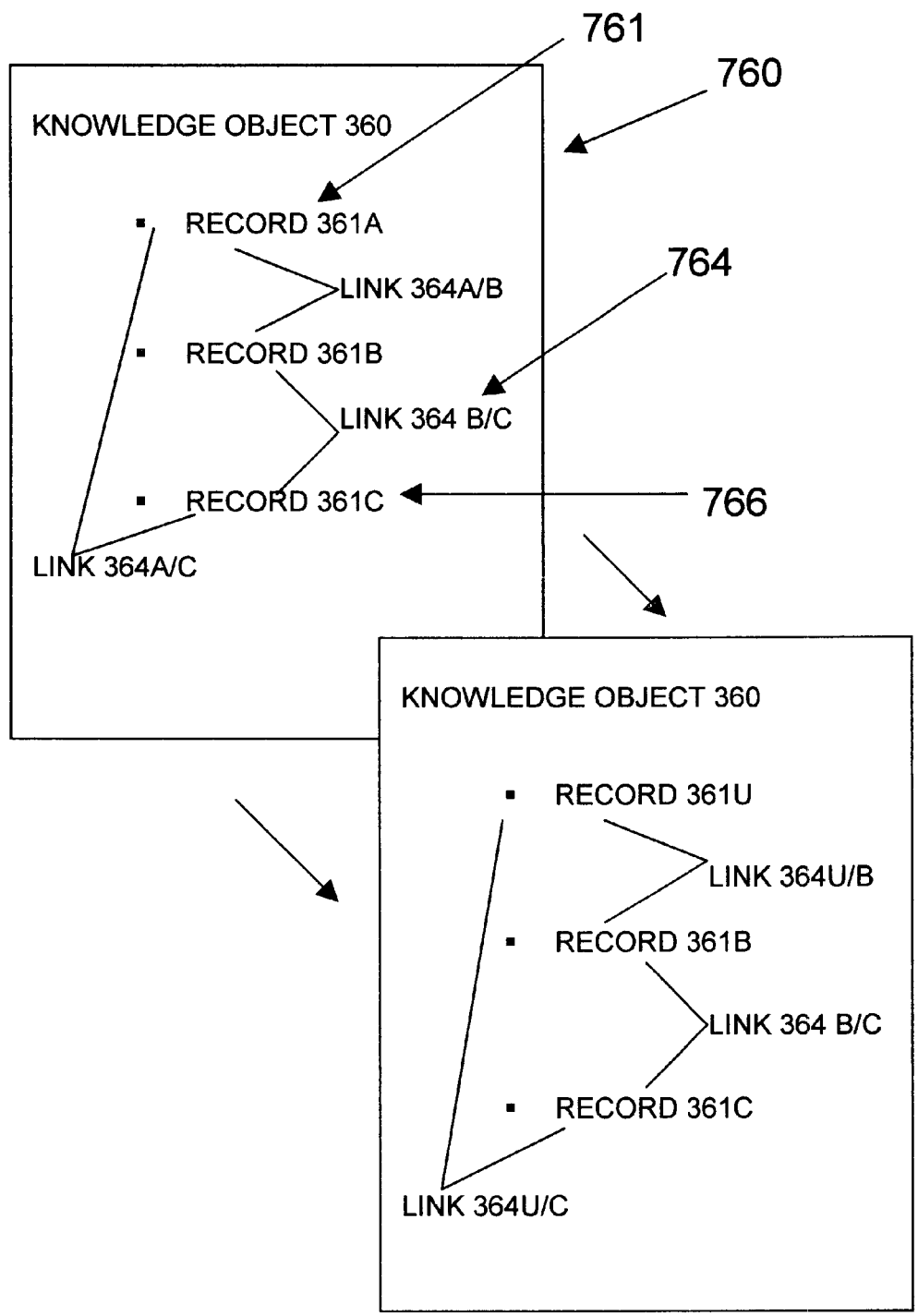
FIG. 25 is a diagrammatic example of link and record editing.

In step 165, the affected elements 766 and potential new elements 666 are either accepted as is or are updated in accordance with the decisions made in the granularity review 170 concerning the potential new record 661 and the affected records 761. By amending the affected elements 766, as shown in FIG. 25, the affected knowledge objects 760 are amended. In the preferred embodiment, elements 366 may be records 361 or links 364, so affected element updating means either updating affected records 761 or updating affected links 764.

Updating affected records 761 involves editing existing records 361 to store the new knowledge represented in the potential new record 661 and deleting affected records 761 that are duplicative now that the new knowledge is incorporated into the knowledge base. Editing records 361 may involve adding new synonyms or ways to phrase a current issue. It may also involve removing an existing record from a knowledge object and substituting a different one in its place.

Updating affected links 764 involves at least one of the following: editing affected links 764 to store the new knowledge represented in the potential new link 664 and deleting the affected links 764 that are duplicative or unnecessary now that the new knowledge is incorporated into the knowledge base. In the preferred embodiment, where the links 364 are created automatically by the knowledge engine 30, link editing is done indirectly by the authors 14 and knowledge engineer by selecting for the knowledge object 360 the appropriate records 361 between which the links 364 will be developed. The knowledge engine 30 then modifies an object's links 364 in response to the modifications of the records 361 within the object 360.

As an example, referring to FIG. 25, if a knowledge object 360 has records 361a, 361b and 361c, and existing record 361a is removed from the knowledge object 360 and a new record 361u is substituted in its place, the engine 30 edits the links 364 in the knowledge object 360 by deleting the links 364a/b and 364a/c between the removed record 361a and the knowledge object's remaining records 361b and 361c, and adding new links 364a/b and 364a/c between the new record 361a and the knowledge object's remaining records 361b and 361c.

Finally, when the element updating of step 165 is completed, in step 166, the process described in steps 161–165 is repeated for the remaining potential new records 661 in the potential knowledge object 660.

Affected Knowledge Objects 760

Figure 26:
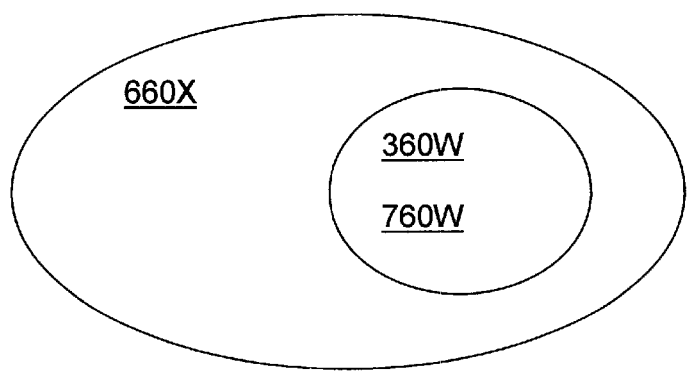
FIG. 26 is a diagrammatic example of synonymic redundancy in knowledge objects.

Affected knowledge objects 760 may be existing knowledge objects 360 into which the potential new knowledge object 660 could be incorporated. For example, as shown in FIG. 26, if the potential new knowledge object 660Y describes a resolution to a problem in which Operating System A will not start, and the same resolution is described in an existing knowledge object 360Z for operating systems in general not starting up, the existing knowledge object 360Z is an affected knowledge object 760Y into which the potential new knowledge object 660Y could be incorporated.

Figure 27:
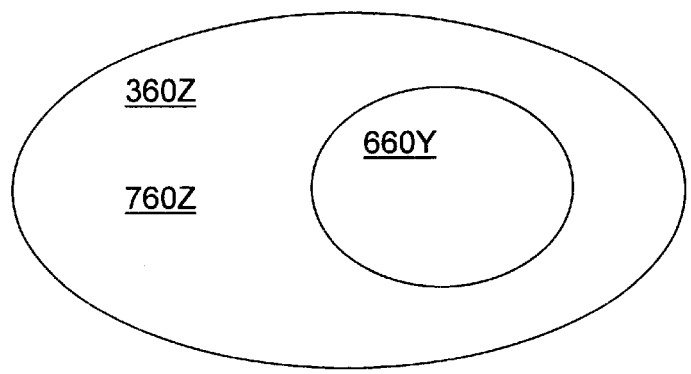
FIG. 27 is a diagrammatic example of subset/superset redundancy in knowledge objects.

Affected knowledge objects 760 could be existing knowledge objects 360 that could be incorporated into the potential new knowledge object 660. For example, as shown in FIG. 27, if the potential knowledge object 660X describes a resolution for unjamming printers in general, and the same resolution is described in an existing knowledge object 360W for unjamming Printer B, the existing knowledge object 360W is an affected knowledge object 760W that could be incorporated into the potential new knowledge object 660X.

Figure 28:
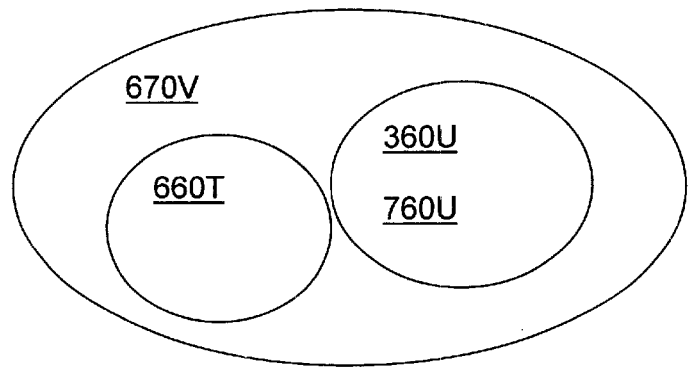
FIG. 28 is a diagrammatic example of dual subset redundancy in knowledge objects.

Further, affected knowledge objects 760 could be existing knowledge objects 360 having existing knowledge from which the additional new knowledge 670 could be developed when the existing knowledge is combined with the new knowledge. For example, as shown in FIG. 28, if the potential new knowledge object 660V describes a resolution for changing the volume for speaker C, and the same resolution is described in an existing knowledge object 360U for changing the volume for speaker D, and an as yet un-created potential knowledge object 660T could be created to contain the additional new knowledge that there is a common resolution for changing the volume for speakers in general, existing knowledge object 360U is an affected knowledge object 760U having existing knowledge from which additional new knowledge 670V could be developed when the existing knowledge is combined with the new knowledge.

In the preferred embodiment of the present invention, redundancies between knowledge objects are minimized by minimizing the redundancies between the records that compose the knowledge objects. The minimizing of redundancies between records is accomplished through the granularity review 170 described below.

Granularity Review 170

General

The granularity review 170 is conducted on each of the affected records 761 that is identified during step 161 of the objectified knowledge review 160. It starts with step 171 of determining the record status 662 of the potential new record 661 given the affected record 761. If the record 661 has an Existing Record Status 664, it is apparently redundant because its record name is identical to the name of an affected record 761 currently under review, and the review 170 proceeds to step 172. If the record 661 has a Similar Record Status 665, the potential new record 661 has an apparent dual subset redundancy, apparent superset/subset redundancy, or apparent synonymic redundancy with the affected record 761 currently under review. If the determination is made that the potential new record 661 has neither status 664, 665 because of affected record 761, the affected record 761 is not really affected by the record 661, which may now be entered into the knowledge base. The review 170 proceeds to step 176 to make that decision.

If the potential new record 661 was given a Existing Record status 664 because of the affected record 761 currently under review, the records 661, 671 are apparently identical, and, in a step 172, a review is made of the records 661, 761 to determine whether they are actually identical. The determination is usually done by inspecting the records 661, 761. If the record names of records 661, 761 are identical, the review 170 proceeds to step 176. If the records 661, 761 are not identical, the potential record 661 and affected record 761 are reviewed once again in step 171 to determine whether the record 661 should have a Similar Record status because of the affected record 761.

If the potential new record 661 was granted a Similar Record status 665 because of the affected record 761 currently under review, in a step 171a, the records 661, 761 are reviewed to determine whether they constitute an apparent dual subset redundancy, apparent superset/subset redundancy, or apparent synonymic redundancy. If the affected record 761 has an apparent subset/superset redundancy with the potential new record 661, in a step 174 a subset/superset redundancy review 74 is conducted to determine whether the records 661, 761 represent an actual subset/superset redundancy. If the affected record 761 has an apparent synonymic redundancy with the potential new record 661, in a step 175 a synonymic redundancy review 77 is conducted to determine whether the records 661, 761 represent an actual synonymic redundancy. During the reviews 73, 74 and 75 additional new knowledge may be developed by combining the potential new record 661 and the affected record 761.

After the reviews 73, 74, and 75, in a step 176 decisions are made as to what edits, if any, are needed to the knowledge base memory to incorporate the knowledge represented in the potential new record 661, to eliminate or minimize redundancies between the potential new record 661 and the affected records 761, and to incorporate any additional new knowledge 670 into the knowledge base. If the records 661, 671 were actually identical, the record 661 already appears in the knowledge base, and no amendments need to be made to the knowledge base. If a potential new record 661 proved not to be redundant with an affected record 761, both should co-exist in the knowledge base, and the amendment to the knowledge base constitutes adding the potential new record 661 into the knowledge base.

When the appropriate decisions concerning amendments have been made, in a step 177, the granularity review is repeated for all of the other remaining affected records 761 for the potential new record 661. When all of affected records have been analyzed against the potential new record 661, the granularity review 170 of step 163 has now been completed and the objectified knowledge review can proceed to step 164 of editing the affected records and the potential new record 661 in the manner decided during the granularity review 170.

Step 171: Redundancies

In the step 171, the affected record 761 being reviewed is analyzed in order to determine what kind of redundancy the potential new record 661 represents for it, and a record status 662 is provided to the potential record 661 based on that analysis. When the record 661 is given an Existing Record status 664, at least one affected record 761 having the same record type 362 as the potential new record 661 was found and is apparently identical to the potential new record 661. In other words, the needed record may already exist. With an Existing Record status 664, the granularity review proceeds to Step 172 to determine whether the records really are identical.

When the record 661 is provided with a Similar Record status 665, at least one affected record 761 was found that is not identical but is similar enough to the potential new record 661 to represent an apparent redundancy with the potential new record 661. With a Similar Record status 665, the granularity review 170 proceeds to a step 171a to determine whether the similarity represents an apparent dual subset, subset/superset, or synonymic redundancy.

The purpose of the granularity review 170 is to ensure that each record is incorporated into the knowledge base at the appropriate granularity, thus minimizing synonymic redundancy and subset redundancy. Synonymic redundancy refers to records that essentially mean the same thing but are not exactly identical. Subset Redundancy refers to two (or more) records, where one record contains the meaning of the other, but at a more general or specific level.

An example of synonymic redundancy would be two records 361a, 361b for the Issue record type 362a, record 361a being "Print quality is poor," and record 361b being "Poor print quality." Once created, records are referred to only by ID numbers, and all references are through reference pointers only. Therefore, while the records 361a, 361b clearly mean the same thing, the knowledge engine 30 does not recognize them as such.

Unless synonymically redundant records such as records 361a, 361b are linked, the knowledge engine 30 will not recognize their congruency. Each record has its own frequency of selection based upon how often it is selected. When resolving a problem represented in unlinked synonymically redundant records, a knowledge base user picks one of the unlinked synonymically redundant records, such as record 361a. She chooses record 361a to the exclusion of record 361b. Her selection affects the frequency of selection of only records 361a. Although the actual frequency of the problem is a combination of the frequencies of both unlinked synonymic records 361a, 361b, the knowledge engine 30 will only calculate combined frequencies for linked records. As an example, if record 361 a for "Print quality is poor" is selected three times, and record 361b for "Poor print quality" is selected five times, there is no clear indication that a quality problem existed with the printer on eight separate occasions. A preferred solution is to delete one record, incorporating the deleted problem statement into the remaining record as a synonym.

Figure 30:
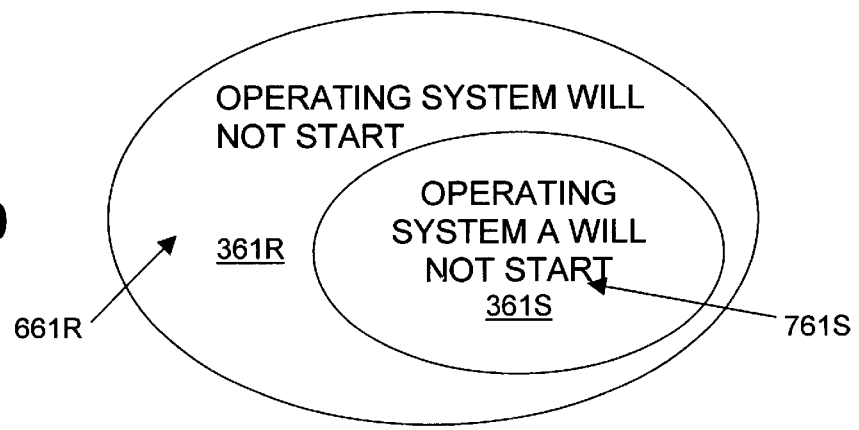
FIG. 30 is a diagrammatic example of subset/superset redundancy in records.

Subset redundancy comes in two forms, subset/superset redundancy, where one record is a generalized case of the other, and dual subset redundancy, where two or more records are subsets of an un-created, more generalized records. Referring to the examples of affected knowledge objects above, an example of a subset/superset redundancy, shown in FIG. 30, would be the following pair of records 361S, 361R of the Issue record type 362a: record 361S is "Operating System A will not start" and record 361R is "Operating system will not start." Record 361S is a subset of record 361R; record 361R is a superset of record 361S. One solution is to delete record 361S, incorporating the deleted problem statement of record 361S into record 361R as a synonym.

Figure 31:
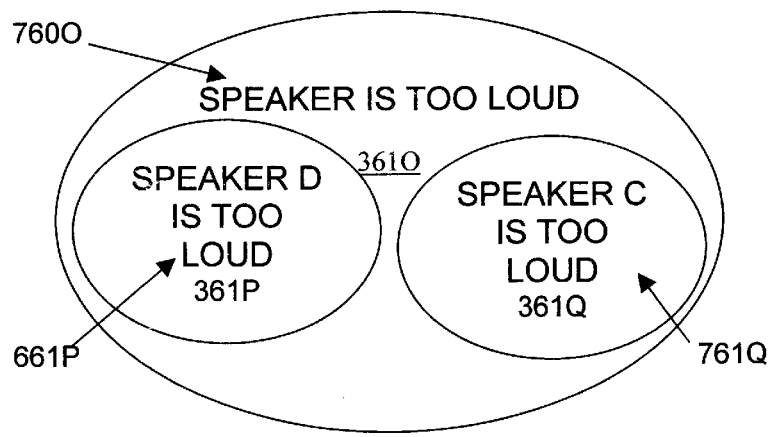
FIG. 31 is a diagrammatic example of dual subset redundancy in records.

An example of dual subset redundancy, shown in FIG. 31, would be the following pair of records 361Q, 361P of the Issue record type 362a: record 361Q is "Speaker C is too loud," and record 361P is "Speaker D is too loud." Records 361Q, 361P are both subsets of an uncreated record 361O, "Speaker is too loud." Since the mechanism for solution is likely the same for any set of speakers, there is little need to have such a granular record as it is stated in records 361P, 361Q. Possible solutions would be to create the new record 361O to contain the generalized problem description, using the problem statement in records 361P, 361Q as synonyms. Alternatively, one record could be deleted and the other edited to carry the generic description, incorporating its original problem statement and the deleted problem statement as synonyms. If the target user would not always think of the speaker problem in a general way, a generalized description would not be useful, and both records might be kept in the knowledge base to preserve the intentional redundancy. Additionally, the generalized description of records 361*p* and 361Q could be added to both records as a synonym, and the records could be linked together for frequency counting purposes.

The problem with leaving synonymic and subset redundancies in the knowledge base is that the knowledge engine 30 does not learn the appropriate frequency for the problem, which can lead to the knowledge base system providing incorrect solutions. Even when the correct solution is provided with both records, the frequency of the occurrence of the underlying generic issue in the unlinked synonymic or subset/superset records will be miscalculated. The knowledge engine 30 will not know the frequency of the underlying problem, and will miscalculate the likelihood of the resolution being the correct resolution. For example, in response to a query about the generic issue, the correct problem and resolution might be presented. However, the knowledge engine 30 might return another problem and resolution that is incorrect for the issue as presented but might be returned as the most likely resolution to the problem because it has an occurrence frequency that is higher than the occurrence frequency of either of the redundant records alone. When new knowledge is objectified and a granularity review 170 is conducted on the elements of the knowledge object before its entry into the knowledge base, synonymic and subset redundancies are caught and corrected by editing the records or providing appropriate links between records.

Each of the redundancy reviews 73, 74 and 75 involve generalizing the potential new record 661 and the affected records 761 to the greatest extent possible, and then analyzing the differences and similarities between them. Based on the analysis, the knowledge engineer and authors 14 decide how to proceed with the potential new record 661 and each affected record 761.

When the distinctions between the records 661, 761 outweigh the similarities, a decision could be made in step 176 to maintain the distinctions between the potential new record and the affected record to maintain a high level of granularity in the system. When the similarities between the records outweigh the distinctions, a decision could be made in step 176 to clarify the similarities, thus maintaining a lower level of granularity in the system. How granular to make the records of a knowledge base will depend upon the specific business needs that set the goals for implementing the knowledge base, and on the types of problems to be encountered in the knowledge base.

Step 173: Dual Subset Redundancy Review 73

Figure 32:
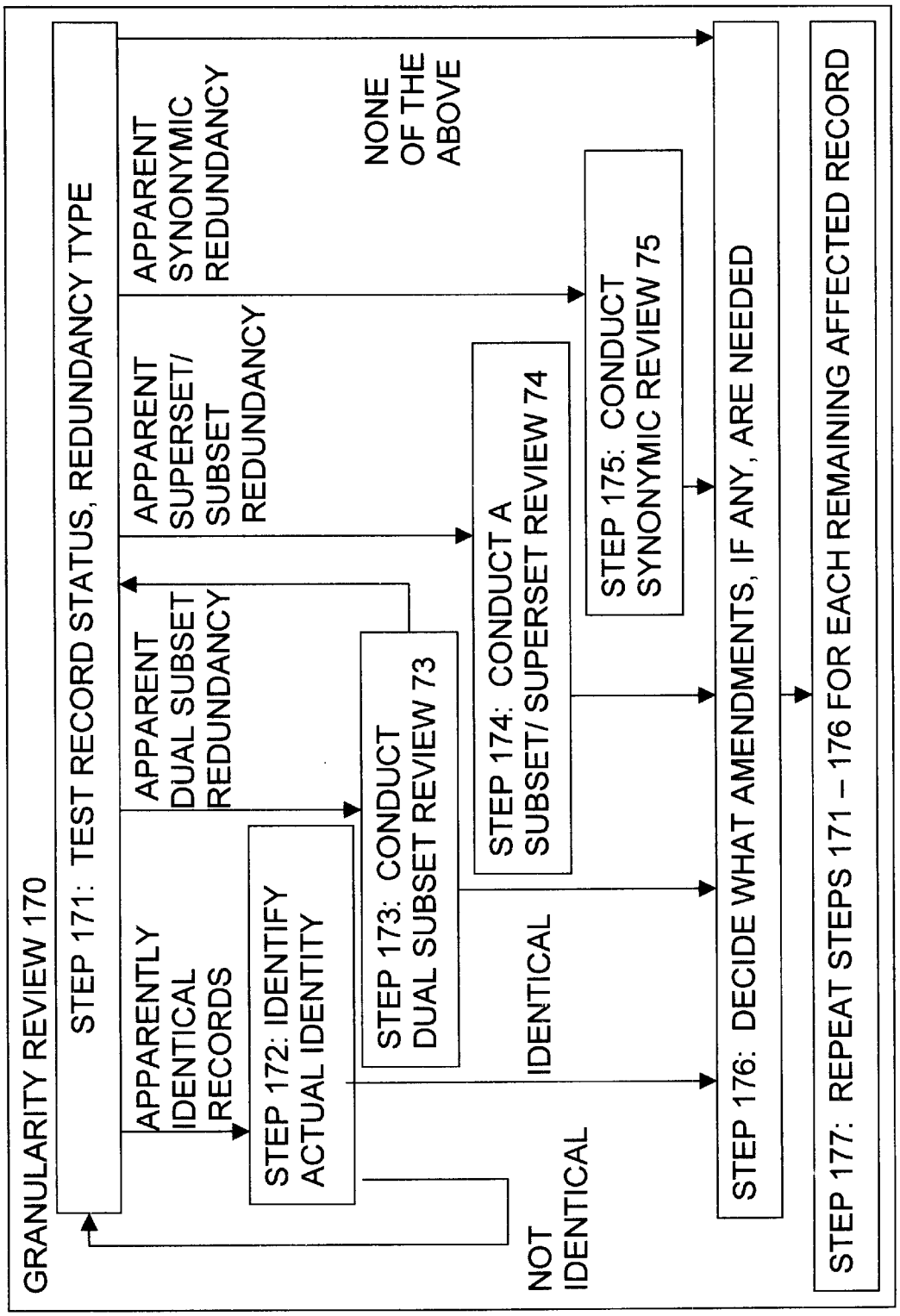
FIG. 32 is a block diagram of the granularity review 170 shown in FIG. 24.

In the dual subset redundancy review 73, also known as the dual subset review 73 and conducted in step 173 (see FIG. 32), an apparent dual subset redundancy between records 661, 761 is tested in order to determine whether the records 661, 761 represent an actual dual subset redundancy. Referring to the example in FIG. 31, for purposes of describing the review 73, the record 361P may be considered to be the potential new record 661P, and the record 361Q may be considered to be the affected record 761Q.

The records 661P and 761Q, both of which being records of the Issue record type 362a, may not demonstrate actual dual subset redundancy if the high level of granularity shown by the potential and affected records is dictated by differences in resolution or in some other knowledge about Speaker D or Speaker C that will be stored in the knowledge base. The appropriate granularity for the potential new record 661P and the affected record 761Q is tested in the dual subset redundancy review 73.

Figure 33:
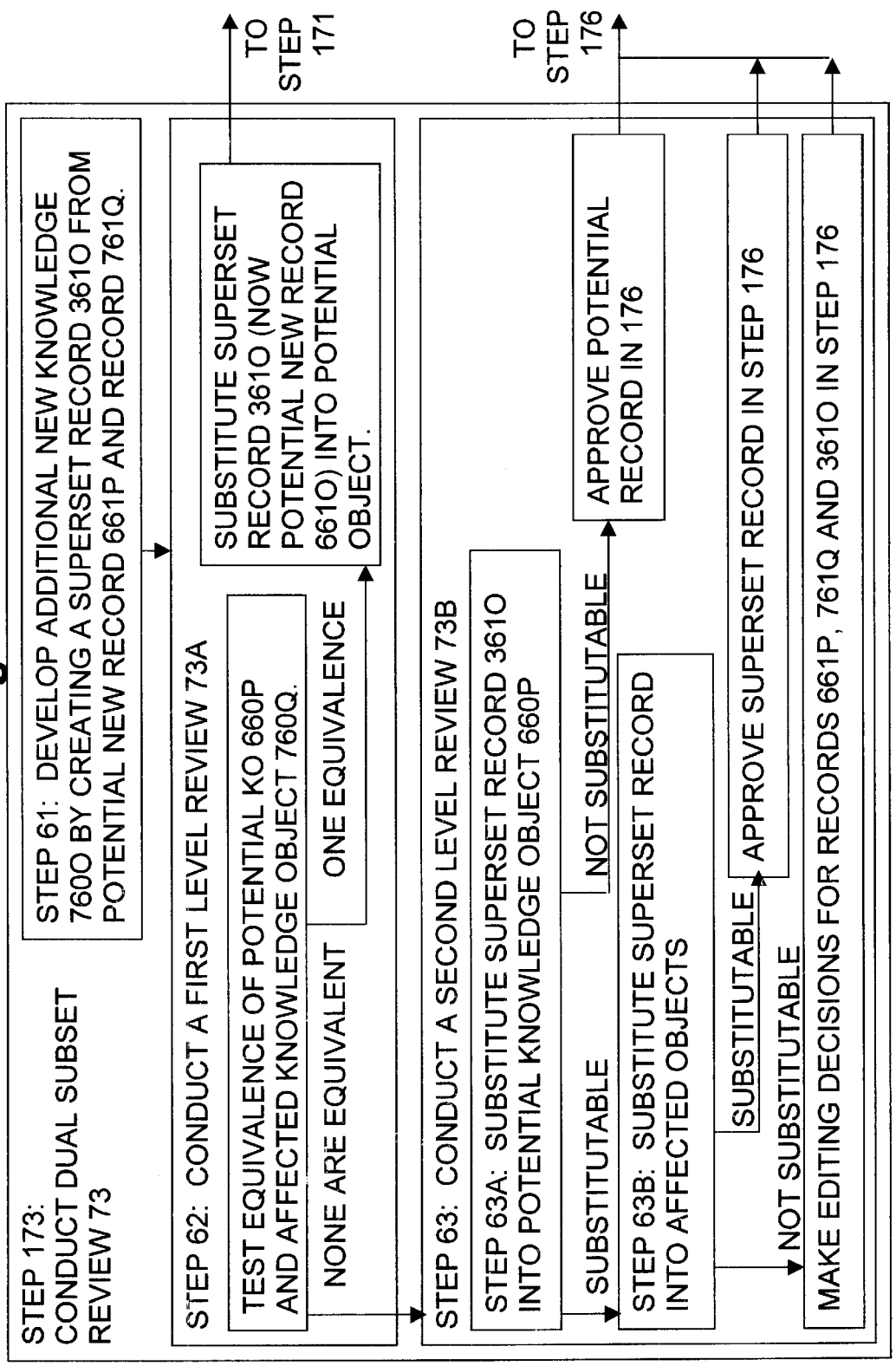
FIG. 33 is a block diagram of the dual subset review 73 shown in FIG. 32.

The dual subset redundancy review 73 is shown in FIG. 33. The first step 61 is to develop the additional new knowledge 670O that would be the superset generated from the combination of the dual subsets represented by the records 661P, 761Q. The additional new knowledge 670O would be that the loud volume of Speaker D and the loud volume of Speaker C could be treated as equivalents and a more generic descriptor concerning loud speaker volume in general, and it may be embodied in a new record 361O for the Issue record type 362a. The language of the superset record 361O is developed using the authoring conventions and guides developed during the architecture definition 341 of the vector analysis 340.

The purpose of the dual subset granularity review 73 is to look for equivalence between the records 661P and 761Q, and substitutability of the superset record 361O. The equivalence testing involves determining whether the records 661P, 761Q are really the same, whether the mechanisms for solution and other associated information are the same for the potential new record 661P and the affected record 761Q, and whether, for purposes of describing the factual circumstances of the support interactions embodied in the knowledge objects of the knowledge base, the knowledge embodied in the records 661P, 761Q could be as described as well by the more generic additional new knowledge 670O embodied in the record 361O.

The equivalence testing has two levels, a first level review 73a that tests the equivalence of the potential knowledge objects 660P and any affected knowledge object 760Q with which the affected record 761Q is associated, and a second level review 73b that tests the equivalence of the records 661P, 761Q, 361O within the potential and affected knowledge objects 660P, 760Q.

In step 62, the first level review 73a is conducted by testing for equivalence between the potential knowledge object 660P and any affected knowledge object 760Q. The potential new record 661P and the other records 361P of the potential new knowledge object 660P are reviewed against the affected record 761Q and the other records 361Q of each of the affected knowledge objects 760Q. In the preferred embodiment, the first level review 73a involves determining whether the factual circumstances of the support interaction defined by the potential knowledge object 660P, including the cause of and resolution for the support problem, is equivalent to any of the support interactions defined by the affected knowledge objects 760Q.

If equivalence is found between potential knowledge object 660P and at least one affected knowledge object 760Q, in every other aspect but records 661P, 761Q, it is not necessary to add to the knowledge base the knowledge object 660P as it is currently written. However, it may be appropriate to add object 660P with a superset record 361O associated with it. Before doing so, it is necessary to test for the apparent dual subset redundancy that is represented by records 361O, 760Q. Therefore, the potential new record 661P would be abandoned, replaced in the potential knowledge object 660P with the superset record 361O, which would now be potential knowledge object 661O. The review 73 would end, and the granularity review 170 would return to step 171 to initiate the testing of the apparent subset/superset redundancy of records 661O, 761Q.

If, in the step 62a, equivalence is not found in solution or other aspect between potential knowledge object 660P and any affected knowledge object 760Q, the level of granularity demonstrated by having different records 661P, 761Q might be necessary. In other words, a decision could be made to maintain intentional redundancy for the records 361P, 361Q in order to provide the separate paths to their different resolutions with which they are respectively linked or to the knowledge that their associated knowledge objects, respectively 660P, 760Q, do not share.

However, it is possible that the differences in solution or other aspect between the knowledge objects arise from other records in the knowledge objects, and not records 661P, 761Q. Before deciding to maintain the granularity of records, 661P, 761Q, the review 73 proceeds to step 63 for the second level review 73b, in which the record 361O is substituted into the knowledge objects 760Q and 660P to determine whether the support interactions defined by the knowledge objects 660P, 760Q could be just as well described by the generic knowledge in record 361O.

In a first step 63a, the record 361O is substituted into the potential knowledge object 660P. If the support interaction is not described with sufficient accuracy when record 361O is used, intentional redundancy should be maintained in the knowledge base. In step 176 the potential new record 661P will be approved for entry in the knowledge base and for use in the potential knowledge object 660P. The proposed language of the potential new record 661P may be modified in order to emphasize the distinctions between the records 661P, 761Q and to eliminate or minimize the apparent dual subset redundancy and thus eliminate the affect of the potential new record 661P on the affected record 761Q. The proposed language of the affected record 761Q may also be modified in order to eliminate or minimize the apparent dual subset redundancy.

If, on the other hand in step 63a the support interaction defined by the knowledge objects 660P is described with sufficient accuracy when record 361O is used, the level of granularity demonstrated by having different records 661P, 761Q may not be necessary. Thus, by generalizing the records to the greatest extent possible, an actual dual subset redundancy between the potential new record 661P and an affected record 671Q may have been found and additional new knowledge 670O may have been developed from the new knowledge embodied in the potential knowledge object 660P combined with the knowledge embodied in the affected knowledge object 760Q.

However, because records may be associated with multiple knowledge objects, it is possible that the affected record 761Q is associated with knowledge objects in the knowledge base whose support interactions will not be accurately described by the superset record 361O. The knowledge objects with which the affected record 761Q is associated are the affected knowledge objects 760Q. Substituting a record 361O for the affected record 761Q may not be appropriate in all of the affected knowledge objects 760Q.

Before determining whether records 661P, 761Q represent an actual dual subset redundancy that could be eliminated by substituting the record 361O, in a step 63b, the record 361O is substituted one by one into the affected knowledge objects 760Q, and each affected knowledge object 760Q is reviewed to determine whether the additional new knowledge 670O embodied in a record 361O actually may replace the knowledge embodied in the affected record 761Q to describe the issue in the support interaction embodied in the knowledge object 760Q.

If the substitution was not acceptable in even one of the affected knowledge objects 760Q, the records 661P, 761Q are not completely redundant and the review 170 would proceed to step 176 where a decision is made as to how to proceed with the records 661P, 761Q, and 361O. One decision might be to leave record 761Q as is, reject record 361O, and approve the potential new record 661P for entry in the knowledge base and use in the potential knowledge object 660P.

Another decision might be to modify the wording of record 661P to incorporate the superset wording of 361O. The modified record 661P could then be approved for entry in the knowledge base and used in the potential knowledge object 660P. Since the superset language was found to be substitutable in some but not all of the affected knowledge objects 760Q, the record 661P could also be substituted for the affected record 761Q in the knowledge objects 760Q for which substitution of it for the affected record 761Q was acceptable, while the record 761Q is maintained in the affected knowledge objects 760Q for which substitution was not acceptable. Which decision to make will depend upon the specific business needs that set the goals for implementing the knowledge base, and on the types of problems to be encountered in the knowledge base.

If the substitutions of record 361O in steps 63a and 63b were acceptable in all of the knowledge objects 660P 760Q, an actual dual subset redundancy has been established between the records 661P, 761Q, and record 361O represents additional new knowledge 670 developed from records 661P, 761Q. In step 176, the decision would be made to add the additional new knowledge 670O to the knowledge base by rejecting the potential new record 661P, modifying the affected record 761Q to incorporate generalized wording that encompasses the meaning of both records 661P and 761Q, namely "Speaker is too loud," and replacing record 661P in knowledge object 660P with the modified record 761Q.

Step 174: Superset/Subset Redundancy Review 74

In the superset/subset redundancy review 74, also known as the superset/subset review 74 and conducted in step 174 (see FIG. 32), an apparent superset/subset redundancy between records 661, 761 is tested in order to determine whether the records 661, 761 represent an actual superset/subset redundancy that could be resolved by adopting the language of the superset as the language of the subset. Referring to the example in FIG. 30, for purposes of describing the review 74, the record 361R may be considered to be the potential new record 661R, and the record 361S may be considered to be the affected record 761S.

The appropriate granularity of the records 661R, 761S is tested in the review 74 by looking for equivalence between the proposed knowledge object 660R associated with the potential new record 661R and the affected knowledge object 760S associated with the affected record 760S. As in the dual subset redundancy review 73, the equivalence test involves determining whether the records 661R, 761S are really the same, whether the mechanisms for solution and other associated information are the same for the records 661R, 761S.

Figure 34:
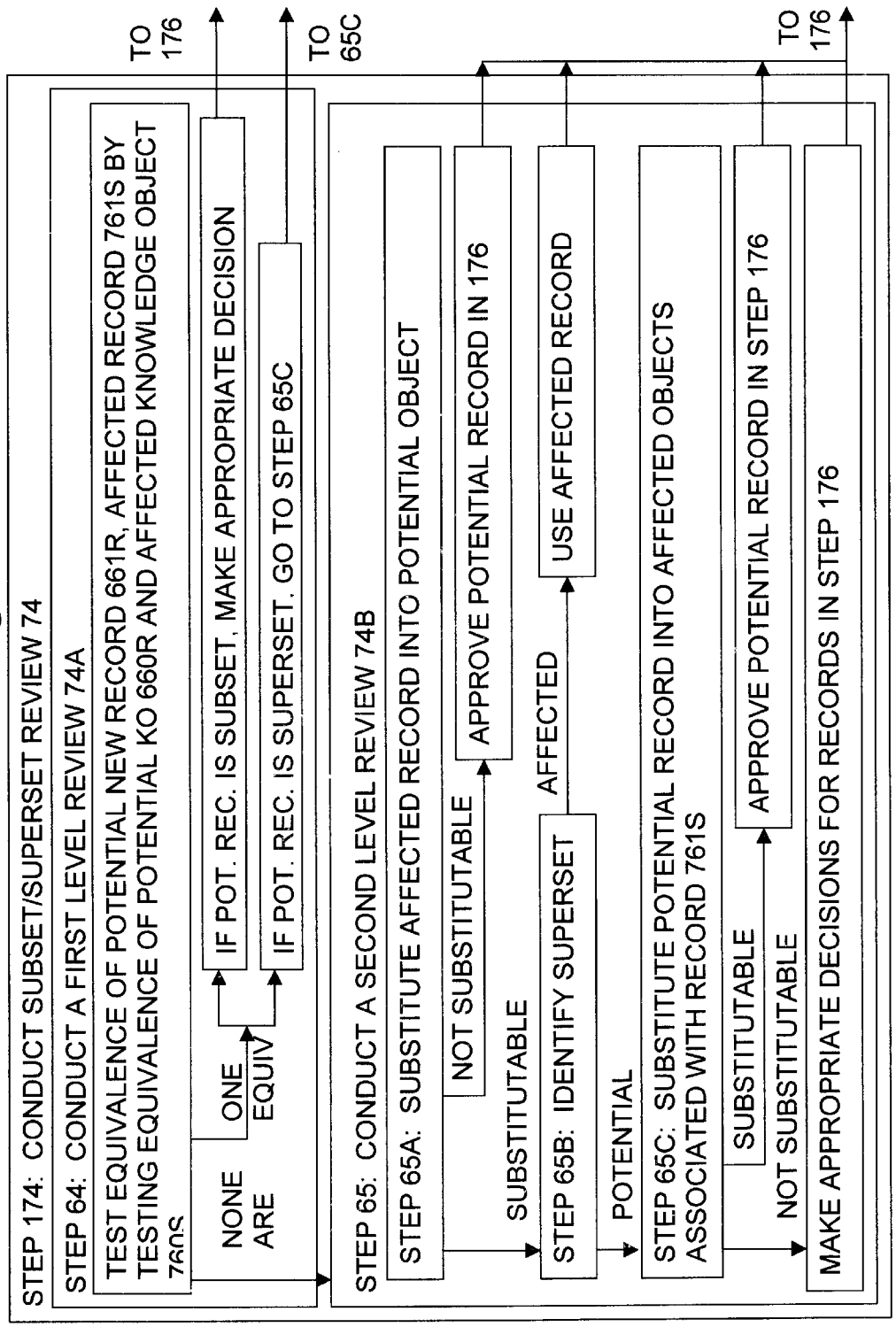
FIG. 34 is a block diagram of the subset/superset review 74 shown in FIG. 32.

The superset/subset redundancy review 74 is shown in FIG. 34. As with the review 73, the equivalence testing of review 74 has two levels, a first level review 74a, shown in step 64, that tests the equivalence of the knowledge objects 660R, 760S, and a second level review 74b, shown in step 65, that tests the equivalence of the records 661R, 761S within the knowledge objects 660R, 760S.

As with the first level review 73a, the first level review 74a in step 64 involves testing equivalence by reviewing the other records 361R of the potential new knowledge object 660R that is associated with the potential new record 661R against the other records 361S of each of the affected knowledge objects 760S. As with the dual subset redundancy first level review 73a, the equivalence test involves determining whether the factual circumstances of the support interaction defined by the potential knowledge object 660R, including the cause of and resolution for the support problem, is equivalent to the support interactions as defined by the affected knowledge objects 760S.

If in the step 64 equivalence is found between the potential knowledge object 660R and at least one affected knowledge object 760S in every other aspect but records 661R, 761S, it may not be necessary to add the knowledge object 660R into the knowledge base. The decision how to proceed will depend upon whether the potential new record 661R is the subset or the superset record. If the potential record 661R is the subset record, a decision will be made in step 176 to either delete knowledge object 660R, and thus record 661R, or add the record 661R to the knowledge base, thus intentionally preserving the subset/superset redundancy of records 661R, 761s in the knowledge base. The review 64 would end and the review 170 would proceed to step 176 to make that decision.

If, as in the present example, the potential record 661 is the superset record, the decision might be made in step 176 to delete knowledge object 660R. However, before doing so, it is still necessary to determine whether the superset language of record 661R represents the appropriate granularity for the affected record 761S, despite whether an equivalence exists between the object 660R and an object 760S. It is necessary to test the superset language of record 661R in all of the affected records 760S. To accomplish that, the review 64 ends and the review 74 proceeds to step 65C of the second level review 65.

If in step 64 equivalence is not found between the records 661R and 761S, the level of granularity demonstrated by having different records 661R, 761S might be necessary.

However, as with the case with dual subset redundancy, it is possible that the differences in solution or other aspect between the knowledge objects arise from other records in the knowledge objects, and not records 661R, 761S. Before deciding to maintain the granularity of records, 661R, 761S, the review 74 proceeds to the second level review 74b to analyze the interchangeability of the records 661R, 761S in the knowledge objects 660R, 760S.

In step 65a of the review 74b, the affected record 761S is substituted into the potential knowledge object 660R to determine whether the support interaction defined by the knowledge object 660R could be just as well described by the affected record 761S. If the support interaction of knowledge object 660R is not described with sufficient accuracy when the substitution occurred, intentional redundancy should be maintained in the knowledge base. In step 176, a decision could be made to approve the record 661R for entry into the knowledge base and for use in the potential knowledge object 660R. Again, a decision could be made to modify the proposed language of the potential new record 661R in order to emphasize the distinctions between the records 661R, 761S and to eliminate or minimize the apparent superset/subset redundancy. And, again, a decision could be made to modify the proposed language of the affected record 761S in order to eliminate or minimize the apparent superset/subset redundancy. The review 74 ends and the review 170 proceeds to step 176 to make the appropriate editing decisions.

If, on the other hand in step 65a the support interaction defined by the knowledge object 660R is described with sufficient accuracy with the substitution, highlighting that an actual superset/subset redundancy might exist between the records 661R, 761S, the level of granularity demonstrated by having different records 661R, 761S might not be necessary. It is necessary to determine whether all of the affected knowledge objects 760S would be described accurately with the superset record.

The first step 65a in the second level review 75b is to identify whether the affected record 761 constitutes the superset or the subset. In the present example, the affected record 761S constitutes a subset of the potential new record 661R. If it did not, the affected record would already be phrased in the language of the superset, and all of the knowledge objects with which the affected record 761 is associated would already be described accurately with the superset record. A decision would be made in step 176 that the affected record be used in the potential knowledge object. The review 170 would proceed to step 176 to make that decision.

Since affected record 761S constitutes a subset of the potential new record 661R, a step 65c of the second level review 74b would be taken in which each affected knowledge object 760S is reviewed for whether the superset record 661R could be substituted for record 761S. If the substitution was not acceptable in even one of the knowledge objects with which the record 761S is associated, the records 661R, 761S are not completely redundant and the review 170 would proceed to step 176 where a decision is made as to how to proceed with the records 661R and 761S.

One decision might be to leave record 761S unmodified and used in any of the knowledge objects 760S for which substitution was not acceptable, while approving the potential new record 661R for entry in the knowledge base in any of the knowledge objects 760S for which substitution of it for the affected record 761S was acceptable. If the potential knowledge object 660R was not found equivalent to an affected knowledge object 760S during the first level review 74A, the potential record 661R would be used in the potential knowledge object 660R. If the potential knowledge object 660R was found equivalent to an affected knowledge object 760S during the first level review 74A, a decision would be made in step 176 to delete the potential knowledge object 660R. In either event, the apparent subset/superset redundancy would thus be kept in the knowledge base.

Another decision might be to modify the wording of record 661R to make it more specific, perhaps identifying the knowledge base of the factual situation in the support interaction being described by the potential knowledge object 660R, and maintain the potential knowledge object 660R in the knowledge base, whether or not it was found to be equivalent to an affected knowledge object 760S during the first level review 74A. Thus, an apparent but not actual dual subset redundancy between the records 661R and 761S would be intentionally left in the knowledge base.

If the substitutions in steps 64b and 65b of 661R were acceptable in all of the knowledge objects with which the affected records 761S are associated, an actual subset/superset redundancy has been established between the records 661R, 761S. In step 176, the superset/subset redundancy would be eliminated by rejecting the potential new record 661R and amending the affected record 761S to have the generalized wording that encompasses the meaning of the record 661R, and adopting the record 761S into the potential knowledge object 660R. The review 170 would proceed to step 176 to make that decision.

Step 175: Synonymic Redundancy Review 75

Figure 29:
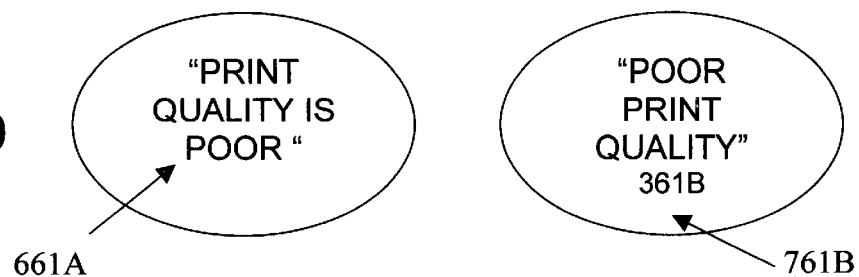
FIG. 29 is a diagrammatic example of synonymic redundancy in records.

In the synonymic redundancy review 75, also known as the synonymic review 75 and conducted in step 175 (see FIG. 32), an apparent synonymic redundancy between records 661, 761 is tested in order to determine whether the records 661, 761 are actually synonyms. Referring to the example in FIG. 29, for purposes of describing the review 75, the record 361A may be considered to be the potential new record 661A, and the record 361B may be considered to be the affected record 761B.

The review 75 is similar to the reviews 73, 74. The appropriate granularity of the records 661A, 761B is tested in the review 75 by looking for equivalence between the proposed knowledge object 660A associated with the potential new record 661A and the affected knowledge objects 760B associated with the affected record 761B As in the reviews 73 and 74, the equivalence test involves determining whether the records 661A, 761B are really the same, whether the mechanisms for solution and other associated information are the same for the records 661A, 761B.

Figure 35:
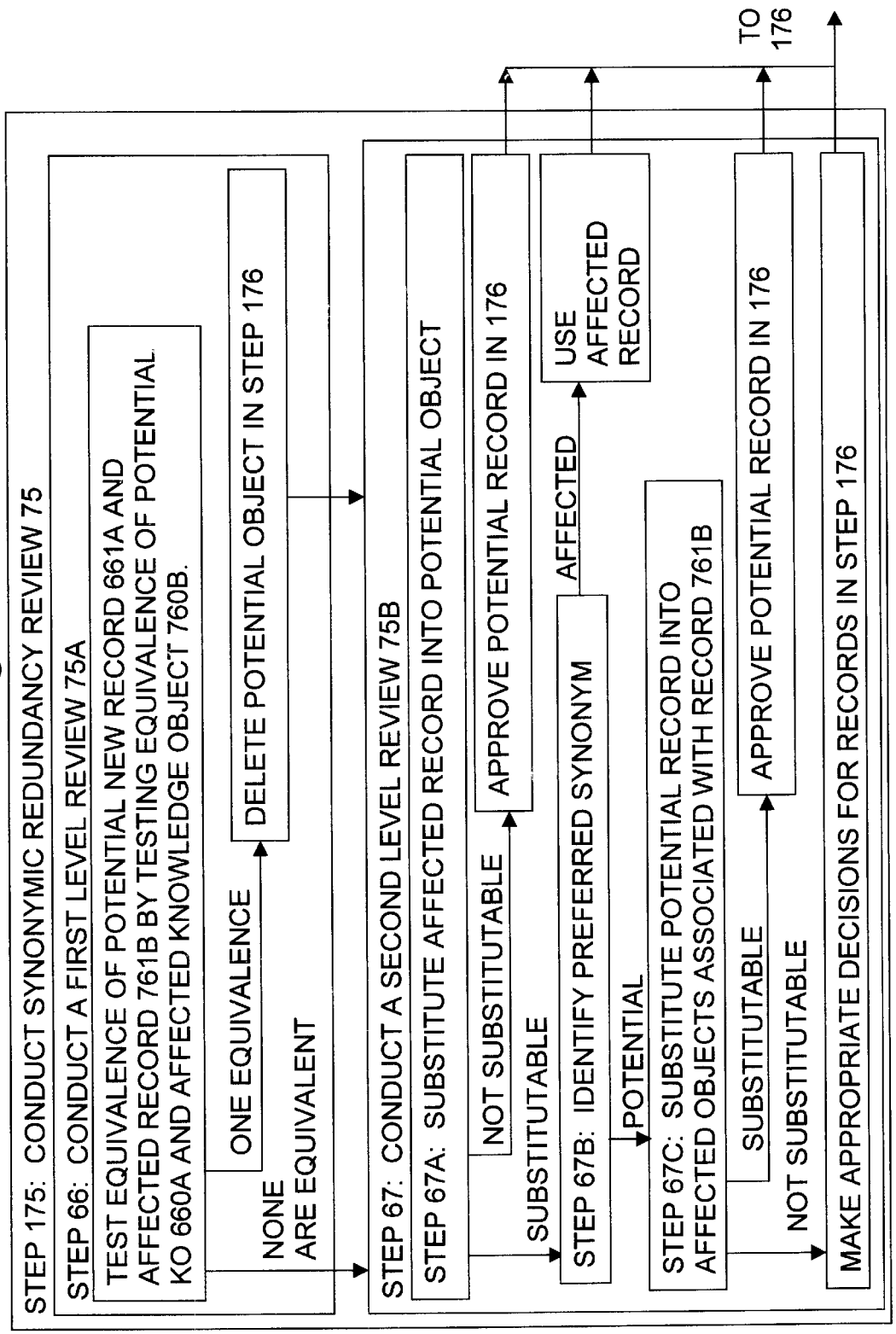
FIG. 35 is a block diagram of the synonymic review 75 shown in FIG. 32.

The superset/subset redundancy review 75 is shown in FIG. 35. As with the reviews 73, 74, the equivalence testing of review 75 has two levels, a first level review 75a, shown in step 66, that tests the equivalence of the knowledge objects 660A, 760B, and a second level review 75b, shown in step 67, that tests the equivalence of the records 661A, 761B within the potential and affected knowledge objects 660A, 760B.

As with the first level reviews 73a and 74a, the first level review 74a in a step 66 involves testing equivalence by reviewing the other records 361A of the potential new knowledge object 660A that is associated with the potential new record 661A against the other records 361B of each of the affected knowledge objects 760B. As with the first level reviews 73a, 74a, the equivalence test involves determining whether the factual circumstances of the support interaction defined by the potential knowledge object 660A, including the cause of and resolution for the support problem, is equivalent to the support interaction as defined by the affected knowledge object 760B.

If in step 66 equivalence is found between the potential knowledge object 660A and at least one affected knowledge object 760B in every other aspect but records 661A, 761B, it may not be necessary to add the knowledge object 660A into the knowledge base. A decision could be made in step 176 to delete knowledge object 660A, and thus record 661A. Before doing so, the language of the record 661A should be tested to determine whether it should be adopted as the record name or the synonym for record 761B. The review 75 proceeds to the second level review 75b in order to make that determination.

If in step 66 equivalence is not found between the records 661A and 761B, the level of granularity demonstrated by having different records 661A, 761B might be necessary. However, as with the case with dual subset and subset/superset redundancies, it is possible that the differences in solution or other aspect between the knowledge objects arise from other records in the knowledge objects and not records 661A, 761B. Before deciding to maintain the granularity of records, 661A, 761B, the review 75 proceeds to the second level review 75b where the records 661A and 761B are switched to determine whether the support interaction defined by the knowledge object 660A, 760B could be just as well described by, respectively, the records 761B, 661A.

The second level review 67 start with a step 67a of substituting the affected record 761B into the potential knowledge object 660A. If the support interaction of the potential knowledge object 660A is not described with sufficient accuracy with the affected record 761B, intentional redundancy should be maintained in the knowledge base. In step 176, a decision could be made to approve the record 661A for entry into the knowledge base and for use in the potential knowledge object 660A, which would not be deleted even if equivalence was found in step 66. A decision could be made to modify the proposed language of the potential new record 661A in order to emphasize the distinctions between the records 661A, 761B and to eliminate or minimize the apparent synonymic redundancy. And, again, a decision could be made to modify the proposed language of the affected record 761B in order to eliminate or minimize the apparent synonymic redundancy.

If, on the other hand in step 67a the support interaction defined by the knowledge object 660A is described with sufficient accuracy with the record 761B, highlighting that an actual synonymic redundancy might exist between the records 661A, 761B, the level of granularity demonstrated by having different records 661A, 761B might not be necessary. In step 67b, a decision is made which record name, the one for the record 661A or 761B, constitutes the preferred synonym, which is preferably the synonym in the set that is the most likely to used in a query of the knowledge base. If the record 761B contains the preferred wording of the record name, all of the affected knowledge objects 760B are already described with the preferred synonym. No additional testing would be necessary. A decision would be made in step 176 that the potential new object 661A be abandoned and that the record name of the abandoned record 661A be added to synonym list of the affected record 760B. If the potential knowledge object 660A was found equivalent to an affected knowledge object 760B during the first level review 75a, a decision would be made in step 176 to delete the potential knowledge object 660A. Otherwise, the modified record 761B would be adopted for use in the knowledge object 660A. The review 170 would proceed to step 176 to make that decision.

If the record 661A contains the preferred wording of the record name, in step 67c of the second level review 75b, the record 661A is substituted for the affected record 761B in each of the affected knowledge object 760B to determine whether the support interactions embodied in the affected knowledge objects 760B are adequately described. If the substitution was not acceptable in even one of the knowledge objects with which the record 761B is associated, the records 661A, 761B are not completely redundant and the review 170 would proceed to step 176 where a decision is made as to how to proceed with the records 661A and 761B.

One decision might be to modify the wording of the record 761B to make more explicit the difference between 661A and 761B. The potential new record 661A could be approved for entry in the knowledge base with the original wording of record 761B added to the potential new record 661A as a synonym. The record 661A could then be used in the potential knowledge object 660A and in any of the knowledge objects 760B for which substitution of it for the affected record 761B was acceptable, while the record 761B, with the wording of its record name modified to clarify the difference between records 661A, 761B, is used in the affected knowledge objects 760B for which substitution was not acceptable. The apparent synonymic redundancy would thus be minimized in the knowledge base.

If the substitutions in steps 66b and 67b of 661A were acceptable in all of the knowledge objects with which the affected records 761A are associated, and if the wording of the record name for record 661A is preferable, a decision would be made in step 176 that the potential new record 661A be abandoned, that record name of the affected record 761B be modified to become that of the abandoned record 661A, with the original record name of the record 761B added to the affected record 761B as a synonym. If the potential knowledge object 660A was found equivalent to an affected knowledge object 760B during the first level review 75a, a decision would be made in step 176 to delete the potential knowledge object 660A. Otherwise, the modified record 761B would be adopted for use in the knowledge object 660A. The review 170 would proceed to step 176 to make that decision.

Knowledge Base Populating Process 80

General

As mentioned above, upon approval for entry, seed cases are recorded in a spreadsheet, not shown, with each row a potential knowledge object 660. All of the record types 362 that have been identified in the vector analysis 340 for the knowledge object type 363 should be filled out in the spreadsheet, one potential record 661 for each record type 362 in each potential knowledge object 660. A knowledge author 14 who is assigned the task of populating the knowledge base memory 35 follows the knowledge base populating process 80 for entering a potential knowledge object into the knowledge base, described below with reference to FIG. 36, to incorporate the identified knowledge objects 660 into the knowledge base.

Figure 23:
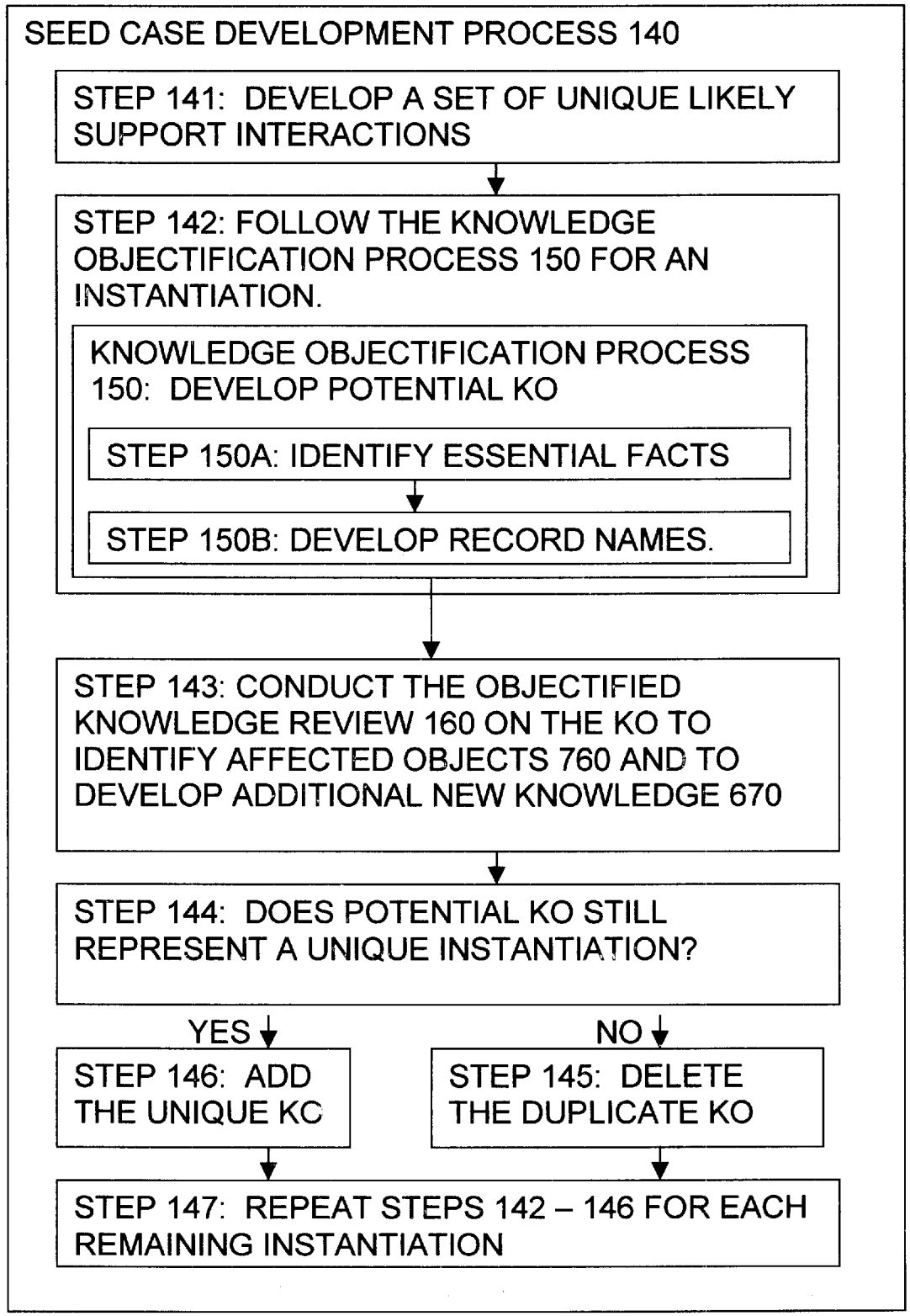
FIG. 23 is a block diagram of the seed case development process 140.
Figure 36:
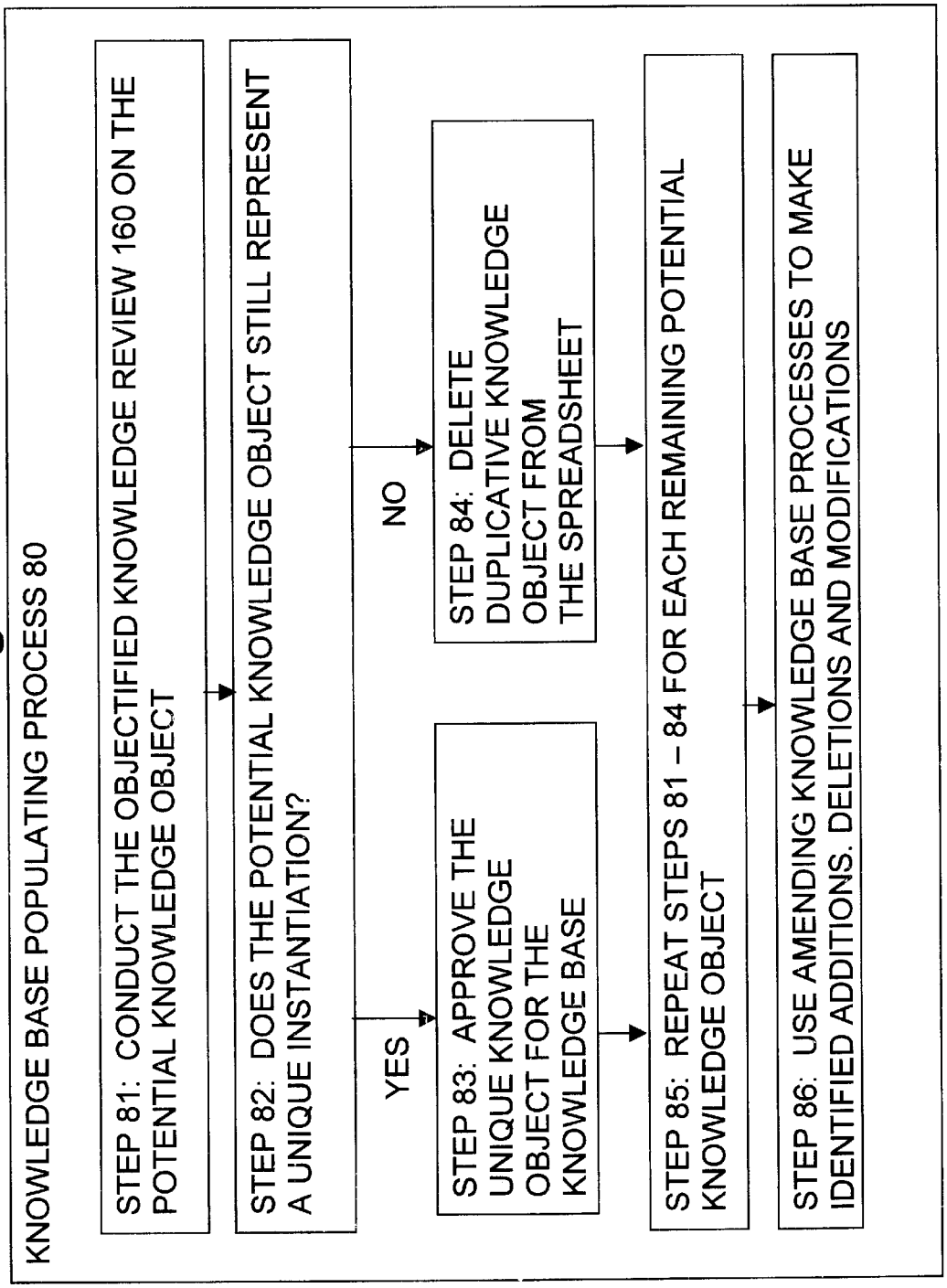
FIG. 36 is a block diagram of the knowledge base populating process 80.

The knowledge base populating process 80, shown in FIG. 36, is similar to the seed case development process 140, shown in FIG. 23 in that the potential knowledge objects 660 are entered one at a time, with the author 14 first reviewing each of the potential elements 666 of the knowledge object 660 for appropriate granularity. As with process 140, the knowledge base populating process 80 enters the potential knowledge object 660 into the knowledge base memory only after all of the elements 666 are reviewed, modified as needed, and then entered into the knowledge base memory 35.

The knowledge base populating process 80 for a knowledge object 660 starts with step 81, in which the author 14 conducts the objectified knowledge review 160 (FIG. 24) conducted during the seed case development process 140, to review each potential new record 661 of the knowledge object 660 for suitability for entry into the knowledge base, and if the potential new record 661 proves suitable, to enter the record into the knowledge base. This time, the reviewing of each potential new record 661 entails reviewing it against all of the records 361 currently existing in the knowledge base memory 35. Additionally, this time the content of the affected records 761 and potential record 661 is reviewed in order to test granularity. Further, the additional objectified knowledge review of step 81 is necessary when the knowledge base memory 35 already has knowledge objects 360 stored within that would not have been considered during the seed case development process 140.

As before with the objectified knowledge review 160, the records reviewed are of the same record type 362a as the potential new record 661. Also as before, the result of the objectified knowledge review 160 is the identification for each potential new record 661 of affected records 761 and the establishing of the appropriate granularity for each potential new record and its associated affected records 761. As before, the review of affected records is conducted using the granularity review 170, shown in FIG. 32. And, as before, in step 164 of the objectified knowledge review 160 the author 14 makes any necessary modifications to the potential new record 661 and affected records 761.

In step 82 of knowledge base populating process 80, the author 14 reviews the potential knowledge object 660 for which she has just reviewed the records. If modifications to the records of a knowledge object render it no longer a unique support instantiation, in step 84 she deletes it from the spreadsheet. If the potential knowledge object 660 still represents a unique support instantiation, in a step 85 she notes her approval of it on the spreadsheet, and submits it to the knowledge analyst assigned to the desired domain 312 to conduct a quality review such as the quality review 113 described below with reference to FIG. 44. If the potential knowledge object 661 fails its quality review, the analyst 15 informs the author who corrects the problem and resubmits the knowledge object to the analyst 15. If the potential knowledge object 661 passes its quality review, the analyst 15 informs the author who enters it into the knowledge base memory 35.

The author 14 may then choose to review all of the knowledge objects 660 on the spreadsheet and then input all of the potential knowledge objects in bulk into the knowledge base, or, she may review and input each potential knowledge object one at a time into the knowledge base. In the preferred embodiment, in step 85, the author 14 repeats steps 81–84 of the knowledge base populating process 80 in order to review all of the potential knowledge objects on the spreadsheet before entering them into the knowledge base. When all of the knowledge base have been reviewed, approved or deleted, in step 86, the author 14 uses the Amending Knowledge Base processes 28 described below, to enter the potential new knowledge object 660 by adding, modifying, and deleting records, and, adding, modifying, and deleting knowledge objects as required.

Identifying Affected Records 761 in the Knowledge Base Memory 35

The first step 161 of the objectified knowledge review 160 is to search the knowledge base memory 35 for affected records 761. In the knowledge base populating process 80, a list of affected records 761 are developed in any way and using any searching capability considered appropriate by the author 14. One way to search for affected records is to search the memory 35 using the query users screen 510 and the knowledge base use process 410 described below. In that way, the author 14 develops an understanding of what an agent 13 would find if she input the potential new record 661. Another way to search for affected records 761 is to search using the record editor search screen 520.

In either case, the search starts with the author 14 opening the record editor 23 in the knowledge base front end 20 through the front end's user interface 480. From the knowledge base main screen, not shown, the author 14 enters her user ID into the user ID field and her password into the password field. If the author 14 wants to search the query users screen 510, she uses the tool selection tab to select query users screen 510. If the author 14 wants to search record editor search screen 520, she uses the tool selection tab to select the record editor 23.

The record editor user interface 24 is opened. It automatically displays the record editor search screen 520. The author 14 conducts the search of affected records 761 in the record editor search screen 520. She enters a record name for the potential new record 661 in the Records field 528. She enters the record type 362 of the potential new record 661 into the Record Type field 526 either manually or from a drop-down list. She then selects the Search button 9 to conduct a search of the knowledge base memory 35 as it presently exists to determine if the record name is unique and not redundant for the selected record type. The results of the search are displayed in the Record Name field 529. The author 14 makes a list of them, for they are the affected records 761 of the potential record 661.

Also, an author 14 may enter phrases similar to the name of the potential record 661 into the Records field 528 to ensure that the potential name does not exist with a different phraseology. Alternatively, the author 14 may conduct a search using the record search capability of the knowledge base knowledge engine 30. A Wildcard search may be conducted of the record names, using a % as a wildcard in a portion of the name inputted into the Records field 528. As an example, "%invalid" will find "Invalid issue" and "User Name Invalid." The knowledge base search is accepted, and the author 14 returned to the main screen of the record editor.

The author 14 may also identify affected records 761 by identifying what other records of the same record type as the potential new record are associated with the records with which the potential new record is associated. The author 14 exits the record editor 23 by selecting the Cancel button 12. The knowledge base main screen, not shown, is displayed, and the author 14 uses the tool selection tab to select the knowledge object editor 25. When opened, the knowledge object editor user interface 26 automatically displays the knowledge editor record search screen 540, shown in FIG. 10a.

The author 14 enters the record name of another record 361 of the knowledge object 660 with which the potential record 661 is associated into the Records field 528. The author 14 also enters the record type 362 of the other record into the Record Type field 526, to see what other records of the record type 362 of the potential new record 661 have been associated with the other records 361 of the knowledge object 660.

For example, a potential new record 661z being reviewed might have the record name of "Mail gateway down" for the Cause record type 362b. In order to identify affected records 761z for the record 661z, the author 14 might enter the name of another record 361 that is already in the knowledge base memory 35 and with which the record 661z is associated in the potential knowledge object 660, such as the record 361y of the Issue record type 362a. In the example, the record 661y has the record name "Can't read mail." The author 14 adds "Can't read mail" to the Records field 548 and the Issue record type 362a to the Record Type field 546, and then selects the Search button 19.

If the record 361y is in the knowledge base memory 35, it will appear in the picklist of the Record Name field 549. The author 14 selects the picklist checkbox 703 associated with the record 361y, and record 361y appears automatically in the Issue record type category in the Knowledge Object Contents field 507.

The author 14 then deletes the words in the Records field 548, and selects the Cause record type 362b in the Record Type field 526. When the author 14 selects the Search button 19, all of the records 361 in the knowledge base memory 35 of the Cause record type 362b with which the record 361y is associated are displayed in the Record Name field 549. Any of the returned records 361 which are apparently identical or constitute apparent dual subset, subset/superset or synonymic redundancies with the record 661z are affected records 761z, and the author 14 notes them for granularity review 170.

The author 14 may expand or reduce the scope of her search by adding, to the Knowledge Object Contents field 507, other records 361 with which the record 661z is associated in the potential knowledge object 660. Before selecting the search button 19, the author may select the AND checkbox 701 or the OR checkbox 702. The AND checkbox 701 will select a conjunctive search for the records 361 displayed in the Knowledge Object Contents field 507. The OR checkbox 702 will widen the search by selecting a disjunctive search of the records 361. If neither checkbox 701, 702 are selected, the knowledge engine 30 conducts a conjunctive search on all of the search criteria defined by the records displayed in the Knowledge Object Contents field 507.

Record Status

Once the list of affected records 761 is developed, in step 162 of the review 160, the author 14 identifies the record status 662 of the potential new record 661 because of the affected records 761. As before, if no affected records 162 were found, the potential new record 661 is assigned a No Existing Records status 663, and the review 160 proceeds to step 165 so that the author 14 may enter the needed record 661 into the knowledge base memory 35 using the Adding Records process 36 described below.

When the potential new record is not assigned a No Existing Record status 663, the process, as before, proceeds to the step 163 to conduct the granularity review 170.

Granularity Review 170

As in the seed case development process 140, the granularity review 170 involves reviewing the potential new record 661 against each of the affected records 761 in turn to test for the appropriate granularity for the records 661, 671. The review 170 conducted in the process 80 is more extensive than the review 170 conducted in the process 140 in that the apparent redundancies are now tested by reviewing not only the record names, but also the content (synonyms, hypertext, facets) of the potential new record 661 and the affected records 761.

Figure 24:
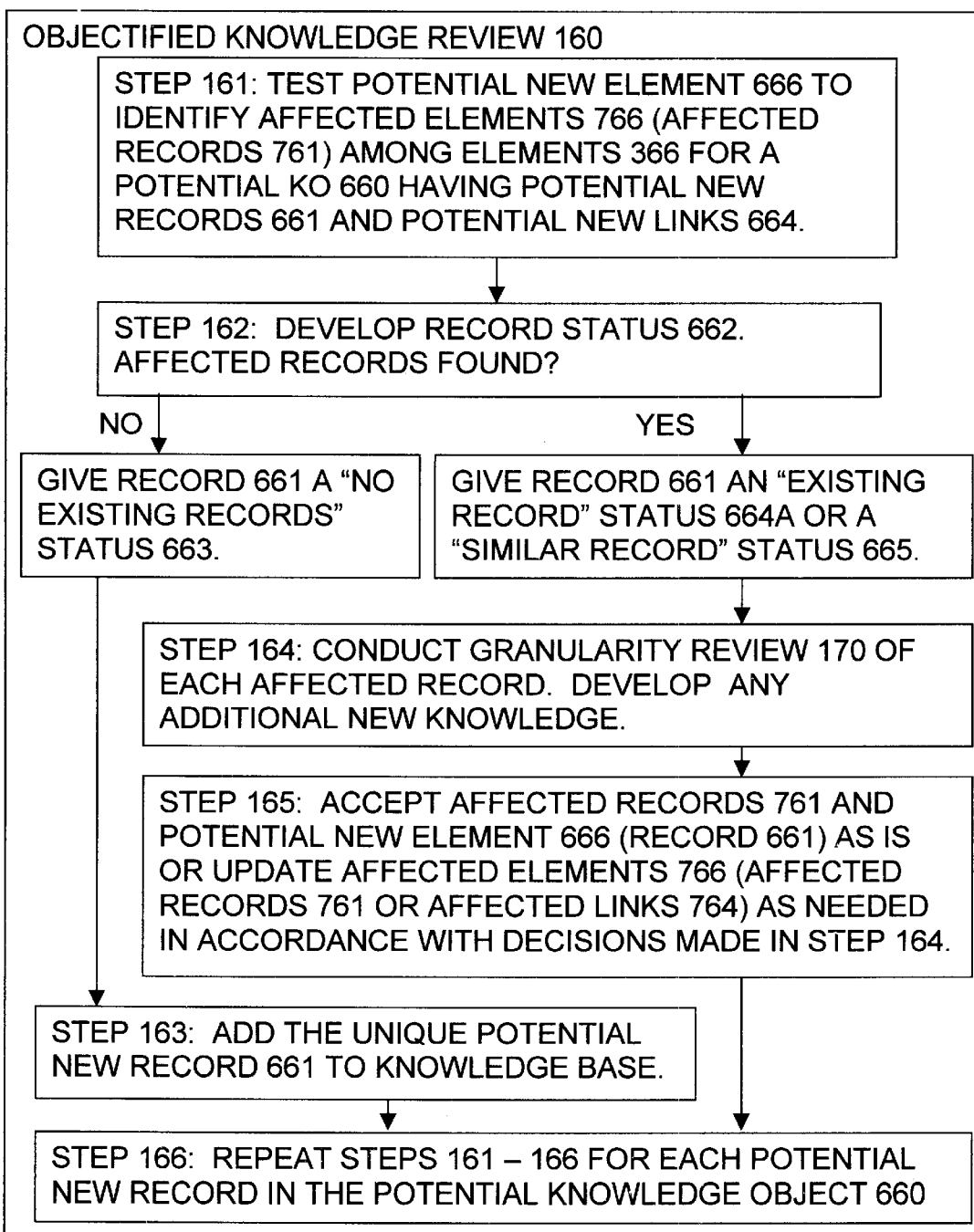
FIG. 24 is a block diagram of the objectified knowledge review 160 shown in FIG. 23.

As in the process 140, the author 14 starts the first step 171 of the granularity review 170 shown in FIG. 24 by determining the record status 662 of the potential new record 661 due to the affected record currently being reviewed. If the potential record 661 is assigned an Existing Record status 664, meaning the record names of potential record 661 and at least one affected record 761 are identical, the author 14 proceeds to step 172 to identify whether the records 661, 761 are actually identical. The determination is done by reviewing the content of the records 661, 761. The synonyms, hypertext, and facets of the record 761 are reviewed to determine whether they fit with the intended purpose of the potential record 661, as it is intended to be used in defining the potential knowledge object 660 with which it is associated. Similarly, the intended synonyms, hypertext, and facets of the potential new record 661 are reviewed to determine whether they fit with the intended purpose of the affected record 761.

If the record names of records 661, 761 are identical and any synonyms, hypertext, or facets identified for record 661, 761 fit with the intended purpose of both records, the records are identical and the review 170 proceeds to step 176 to abandon record 661 and substitute the affected record 761 in the potential knowledge object 660 on the spreadsheet. If the record names of records 661, 761 are identical but synonyms, hypertext, or facets identified for record 661, 761 do not completely fit with the intended purpose of both records, the records 661, 761 are not actually identical, potential record 661 is assigned a Similar Record status 665 and the process 170 proceeds to step 171 to determine which redundancy the records 661, 761 represent.

In step 171, authors determine whether the potential record 661 under review and with a Similar Record status 665 represents a dual subset redundancy, a subset/superset redundancy, or a synonymic redundancy with the affected record 761 under review. If they represent a dual subset redundancy, the author 14 conducts the dual subset redundancy review 73 found in step 173. If they are found to represent a subset/superset redundancy, the author 14 conducts the subset/superset redundancy review 74 found in step 174. If they are found to represent a synonymic redundancy, the author 14 conducts the synonymic redundancy review 75 found in step 175.

In reviews 73, 74, and 75, the author 14 tests the equivalence between the potential knowledge object 660 and affected knowledge object 760 by reviewing the affected knowledge object 760s through the knowledge object editor 25. The author 14 identifies the affected knowledge objects 760 by using the record editor search screen 520 and the knowledge object editor open knowledge object screen 560. The author 14 uses the tool selection tab in the knowledge base main screen, not shown, to select the knowledge editor 25. The knowledge editor record search screen 540, shown in FIG. 10a, is automatically displayed. The author 14 uses the search capability in the following manner to identify the affected knowledge objects 760. The author 14 enters the record name of the record 761 into the Records field 528, enters the record type 362a of the record 761 into the Record Type field 526, and then selects the Search button 19.

The knowledge engine 30 will return the record 761 in the Record Name field 549. The author 14 clicks the picklist check box 703 of the record 761. The record 761 is automatically displayed in the Knowledge Object Contents field 507, placed under its associated record type 362a. She then clicks the Search button 19, and the knowledge object editor open knowledge object screen 560, shown in FIG. 10a, opens with the list of knowledge objects having the records displayed in the Knowledge Objects Contents field 507, which in this case is the list of affected knowledge objects 760.

The author 14 proceeds to review the affected knowledge objects 760 one by one. She highlights the first knowledge object 760 and selects the Open button 567. The knowledge object editor edit screen 550, shown in FIG. 11, opens, with the records of the knowledge object 760 displayed in the Knowledge Object Contents field 557. The author 14 tests equivalence between the knowledge objects 660, 760 by reviewing each of the records in the object 760 against the records of the potential object 660 as it is recorded on the spreadsheet. The author may review all of the contents of a record in the affected knowledge object 760 by double clicking on the target record in the Knowledge Object Contents field 557. The record editor record edit screen 530 is displayed, filled in with the particulars of the target record. When the author 13 selects the Close button 54, the display returns to her knowledge object editor edit screen 550.

The author 14 makes the substitutions that are appropriate in the reviews 73, 74, and 75 to test the equivalence of records 661, 761 or any additional new knowledge records 381. The author 14 makes no changes to the knowledge base memory 35 during the substitution steps. The author 14 selects the Close button 550 to return to the knowledge object editor open knowledge object screen 560 to select another affected record. The author 14 may select the next affected object because the knowledge object editor open knowledge object screen 560 continues to display the results of the author's search until the author 14 selects the New Search button 569.

The author 14 proceeds with using the screens 540, 550, 560 to review all of the affected records 761 and their associated records 761 for a potential knowledge object 660. When she makes her editing decisions in step 176, she records them in the spreadsheet.

Amending Knowledge Base Processes 28

Adding Records Process 36

The author 14 creates a new record 361 using the Adding Records process 36. The author 14 opens the record editor 23 through the record editor user interface 24. From the knowledge base main screen, the author 14 selects the record editor 23 from the tools selection tab. The record editor search screen 520, shown in FIG. 8, is automatically displayed. She then selects "Add New Record" from the tool selection tab of the record editor bar, which is displayed above the screen 520. A blank record editor edit screen 530, shown in FIG. 9, is then displayed.

The author 14 enters a record name in the Record Name field 531. She follows the rules in the authoring guides and conventions in developing the new record name. The author 14 uses the record definitions and guidelines for format and development of the records. In general, the name should fit the record definition. It must not be redundant or overlapping (having subset redundancy) with another record of the same type. It must have appropriate granularity for the use to which it will be put. Its granularity must be similar to the granularity for similar records. The author 14 enters the record type 362a into the Record Type field 532 either manually or from a drop-down list.

The author 14 then selects the Synonyms tab 51 to select the synonyms section of the screen 530. She adds synonyms (if applicable) for the new record 361 in the New Synonym field 535, selecting the Add Synonym button 536 when the synonym is ready to be entered. The added synonym is displayed in the Assigned Synonyms field 534. The author 14 follows the guidelines for use of synonyms to capture alternative statements of the records 361, which are found in the authoring conventions and guides. If the author 14 is not sure which synonyms to add, she selects the Make Suggestions button 538, and the knowledge engine retrieves potentially applicable synonyms and displays them in the Suggestions field 57. The author 14 may select a suggested synonym from the field 57 by selecting its associated picklist checkbox 56. The synonym is then automatically displayed in the Assigned Synonyms field 534.

If the new record 361 is a concept defined in accordance with the KnowledgeBridge™ architecture that the preferred embodiment adopts, the author 14 may also add hypertext or facets for the concept through the record editor. The author 14 selects the Hypertext tab 52 or the Facet tab 53 to display the hypertext or facet sections of the edit screen 530. Finally, the author 14 selects the "Active" state in the Knowledge State field 533. When the new record 361 is entered to the author's satisfaction, the author 14 selects the Save button 55 to submit the new record to the knowledge base memory 35. In storing it, the knowledge engine 30 provides the record 361 with an ID number, and appends to it the author's name and the date of creation.

Modifying Records Process 33

The author 14 modifies an existing record using the Modifying Records process 33. She opens the record editor through the record editor user interface 24. From the record editor main screen, she retrieves the target record by selecting "Search Records" from the tool selection tab on the record editor bar. A blank record editor search screen 520, shown in FIG. 8, is displayed. The author 14 obtains the target record by entering a few letters of the target record's name (enough to be unique) into the Records field 528 and selecting the Search button 9, or she searches in one of the other manners described above in connection with identifying affected records 761 for the knowledge base populating process 80. When she retrieves the target record 361, it is displayed in the Record Name field 529. She highlights the target record 361 and, by clicking on it, she enters edit mode.

The record editor edit screen 530, shown in FIG. 9, is displayed, filled in with the particulars of the target record 361. The author 14 then modifies the record name in the Name field 531, using the word processing features that are available to the record editor 23. The record name might be changed for more precision or clarity, to make it more or less granular, or to eliminate subset or synonymic redundancies. The author 14 edits the record name, following the rules in the authoring guides and conventions to add uniformity to the records. The author 14 uses the record definitions, guidelines for format and development of the records, and guidelines for use of synonyms to capture alternative statements of the records, all of which are found in the authoring conventions and guides.

The author 14 then modifies synonyms (if applicable) by selecting the Synonyms tab 51. The current synonyms are displayed in the Assigned Synonyms field 534. They can be deleted by highlighting them and pressing the delete button on the keyboard. New synonyms can be added one at a time, by typing them into the New Synonym field 535 and selecting the Add Synonyms button 536 or using the Make Suggestions button 538 as described above.

If the record 361 was a concept defined in accordance with the KnowledgeBridge™ architecture that the preferred embodiment adopts, the author 14 may also modify hypertext or facets by selecting the Hypertext or Facet tabs 52, 53 to display the hypertext or facet sections of the edit screen 530. When the record 361 is modified to the author's satisfaction, the author 14 selects the Save button 55 to submit the record modifications to the knowledge base memory 35. In storing the modified record 361, the knowledge engine 30 appends to the record 361 particulars about the modification, including but not limited to the author's name and the date of modification.

Deleting Records Process 34

Records are deleted in the knowledge base memory 35 by placing them into an obsolete state. The knowledge engine 30 will not allow a record 361 to be labeled obsolete while it is still associated with a knowledge object 360. Therefore, in order to delete a record 361, the author 14 must first replace the record 361 in each knowledge objects with which it is associated, or obsolete all of the knowledge objects that contain the records 361.

The author 14 deletes an existing record using the Deleting Records process 34, which starts with the author 14 identifying each of the knowledge objects with which the record is associated. She creates the list of them in the knowledge object editor open knowledge object screen 560, shown in FIG. 10a, using the same process described above in step 81 for identifying affected knowledge objects 760 during the knowledge base populating process 81. She opens the knowledge objects 360 one by one and displays them in the knowledge object editor screen 550, shown in FIG. 11. If she chooses to obsolete the knowledge object 360, she follows the Deleting Knowledge Objects process 29 described below. If she chooses to replace records, she reviews the displayed knowledge object 360, and then selects a new record 361 to replace the record 361 targeted for deletion. The author 14 may enter the record editor search screen 520 to search for a substitute using the searching methods described above.

She then returns to the knowledge object editor open knowledge object screen 560 to select another knowledge object 360 using the record targeted for deletion, and makes the appropriate substitution. When the author 14 has selected a substitute record 361, she replaces the targeted record 361 using the Modifying Knowledge Objects process 29 described below, substituting the substitute record for the targeted record.

Once all of the knowledge objects with which the targeted record is associated have been obsoleted or modified to eliminate the targeted record, the author 14 reopens the record editor, retrieves the target record through the record editor search screen 520 in the manner described above for searching affected records 761, and selects the "Obsolete" state in the Knowledge State field 533. She then selects the Save button 55 to delete the record 361. In storing the modification to an obsolete state, the knowledge engine 30 appends to the record 361 the author's name and the date of deletion. The author 14 selects the Close button 54 to close the record editor edit screen 530 and to return to the knowledge base main screen.

Adding Knowledge Objects Process 31

A knowledge object 360 is incorporated into the knowledge base memory 35 by inputting any new records 361 used in the knowledge object 360 using the Adding Records process 31 and then associating all of the records 361 of the knowledge object 360. The records of an knowledge object 360 are associated through the knowledge object editor 25 using the knowledge object editor edit screen 550.

The Adding Knowledge Objects process 31 starts by the author 14 opening the knowledge editor 25, selecting "Add Knowledge Objects" from the tool selection tab on the knowledge object editor bar. A blank knowledge object editor edit screen 550, shown in FIG. 11, is displayed. The author 14 selects the records tab 554 in order to display and enter records 361 for each of the knowledge object's record types 362 into the knowledge object 360. She fills in the records under in their appropriate record type 362 knowledge object in the Knowledge Object Contents field 557 fields by entering the record name of each record from the spreadsheet into the Record Name field 555. Similar record names will appear in the Record Name picklist field 556. The author 14 clicks the picklist checkbox 704, and the selected record 361 in the picklist field 556 automatically is displayed under its record type 362 category in the Knowledge Object Contents field 557.

When all of the records from the row of the spreadsheet are filled in, the author 14 selects from the picklist of the Knowledge State field 553 either an "Active" or Pending" state. The potential knowledge object is ready to be submitted to the knowledge base memory 35. The author 14 selects the Save button 61, which causes the knowledge engine 30 to develop links between the records 361, thus defining the new knowledge object 360. If "Active" is displayed in the Knowledge State field 553, the knowledge engine 30 saves the knowledge object 360 in an active state. If "Pending" is displayed in the Knowledge State field 533, the knowledge engine 30 saves the knowledge object 360 in a pending state. In storing it, the knowledge engine 30 also provides the knowledge object 360 with an ID number, and appends to it the author's name and the date of creation.

Alternatively, the author 14 may add knowledge objects 360 to the memory 35 by entering a query containing all of the records 361 of the knowledge object 360. The author 14 would enter the query by accessing the query users screen 510 and using the Knowledge Base Use process 410 as described below. When queries are saved by an author 14 or analyst 15, the knowledge engine 30 recognizes that fact and automatically stores the knowledge object 360 in the 35 in an active state.

Modifying Knowledge Objects Process 29

The knowledge objects 360 already existing in the knowledge base are modified -by editing the records and links, and then associating them again to form a modified knowledge object 360. The Modifying Knowledge Objects process 29 starts by the author 14 opening the knowledge editor 25 and selecting "Edit Knowledge Objects" from the tool selection tab on the knowledge object editor bar. The knowledge object editor search screen 540, shown in FIG. 10a, is automatically displayed. The author 14 retrieves the target knowledge object 360 by entering its ID number in the Knowledge Object ID field 541, or by searching for the target knowledge object 360 in the manner described above in step 81 for identifying affected knowledge objects 760 during the knowledge base populating process 81.

When the target knowledge object is displayed on the knowledge object editor edit screen 550, shown in FIG. 11, all of the records 361 associated with the knowledge object 360 are displayed in the Knowledge Object Contents field 557 under the appropriate category of their record type 362. The author 14 edits a record 361 in the knowledge object 360 by selecting the targeted record in its record type field 362 in the Knowledge Object Contents field 557 and pressing the delete button on the keyboard. The author 14 then substitutes another record in its place in the record type field, in the manner described above in the Adding Knowledge Objects process 31. If desired, the author 14 may also modify the state of the knowledge object 360 in the Knowledge State field 553. When all of the edits are made to the author's satisfaction, the author 14 selects the Save button 61, which causes the knowledge engine 30 to save the knowledge object 360 in its modified form and in the state displayed in the Knowledge State field 553. In storing the knowledge object 360, the knowledge engine 30 appends to it particulars about the modification, including but not limited to the author's name and the date of modification.

Deleting Knowledge Objects Process 32

Deleting a knowledge object 360 occurs by modifying the knowledge state of a knowledge object to "Obsolete." The Deleting Knowledge Objects process 29 starts by the author 14 retrieving the target knowledge object 360 in the manner described in the Modifying Knowledge Objects process 29. When the target knowledge object is displayed on the knowledge object editor edit screen 550, the author 14 modifies the state in the Knowledge State field 553, changing it to "Obsolete." The author 14 then selects the Save button 61, which causes the knowledge engine 30 to save the knowledge object 360 in its obsolete state. In storing the knowledge object 360, the knowledge engine 30 appends to it the author's name and the date of this modification.

Workflow System 470

General

In the deployment phase 700, the knowledge base system 10 goes live and the workflow system 470 is deployed to operate the knowledge base system 10. The knowledge base use process 410 is used to answer end-user queries, and the knowledge maintenance process 450 is used to review and develop new knowledge and incorporate it into the knowledge base.

Knowledge Base Use Process 410

Figure 38:
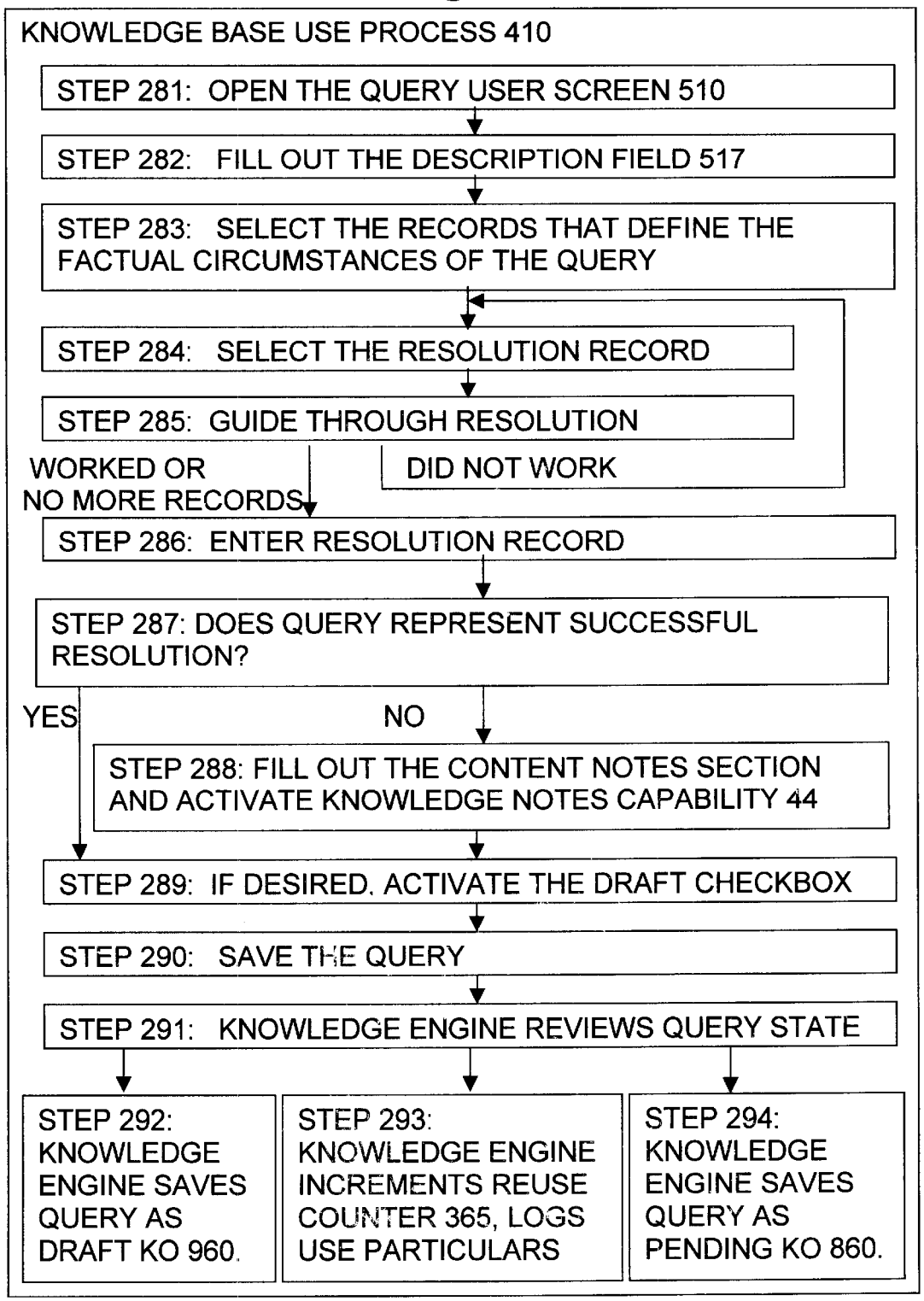

The knowledge base use process 410 for agent use of the knowledge base system 10 is shown in FIG. 38. It starts in step 281 with an agent 13 opening the query user screen 510 in the knowledge base front end 20 through the front end's user interface 480. From the knowledge base main screen, not shown, the agent 13 enters her user ID into the user ID field and her password into the password field, and then uses the tool selection tab to select the query user screen 510. A blank screen 510 as shown in FIG. 7, with the Problem tab 2 showing the Issue/Symptom field 514, Cause field 515, and Resolution field 516 and the Transcript tab 37 showing the Transcript field 43.

In a step 282, the agent 13 enters the facts as she knows them into the query user screen 510, filling out the Description field 517 with words that describe the problem. She then presses the Enter key, not shown, on her keyboard. The knowledge engine 30 will return possible issues, causes, and resolution records 361 in the picklist fields 514, 515, 516 and possible hardware, software, and environment records 361 in the picklist fields 511, 512, 513. In each picklist field 514, the records 361 that match any text of the Description field 517 will be at the top of the picklist and colored yellow. Records 361 that have synonyms that match any text of the Description field follow and will be colored green.

In a step 283, the agent 13 selects the records that define the factual circumstances of the query. She selects the appropriate issue, cause, hardware, software, and environment records 361 from the fields 514, 515, 511, 512, 513, selecting the records 361 by selecting their associated picklist checkbox 711, which causes the records to be displayed under the category of their associated record type 362 in the Transcript field 43. The agent 13 is aided in making her selection by the knowledge engine 30, which displays in green any record 361 in the fields 514, 515, 511, 512, 513 that form an activated knowledge object 360 with records already selected and displayed in the Transcript field 43.

The agent makes her selections in the order that she considers appropriate for the support interaction that she is addressing and for her searching style. One way of doing it is to first select a probable issue, then select the product records (hardware, software, and environment), and then select a probable cause. A more detailed description of step 283, using that order of selection, follows.

The agent selects a probable issue record 361 from the Issue field 514. If she does not see the Issue record 361 that fits the problem, she enters more text in the Description field 517, and presses the Enter key, not shown, on her keyboard to search the memory 35 again. If too many records were retrieved, she may delete more text in the Description field 517, and search again. If she wants to see additional information about an issue record, she highlights the record 361 and clicks on it. A hypertext window, not shown, containing any hypertext associated with the highlighted record 361, is displayed. When the agent is through reviewing the record's hypertext, she selects a Close button, not shown, and is returned to her query user screen 510.

If an issue record 361 in the Issue field 514 fits the problem, the agent 13 selects the record's associated picklist checkbox 711, and the record 361 is displayed under the Issue record type 362a in the Transcript field 43. The agent then selects the records for the product particulars of the problem being presented in the query. The agent 13 selects the Product tab 1 and does the same record selection for the Hardware field 511, Software field 512, and Environment field 513. Once the problem particulars have been selected, the agent 13 selects the Problem tab 2 and selects the cause record 361. The agent 13 performs any appropriate test or review to confirm or deny a selected cause. She only selects the cause record 361 once she has verified the selected cause is consistent with all of the known facts.

Once the Cause record 361 has been entered into the Transcript field 43, in a step 284, the agent 13 selects a resolution record 361. In step 284, the agent 13 reviews the set of resolution records 361 that were returned in the Resolution field 516 in response to the query and selects a resolution record 361 having a likely resolution. In a step 285, she guides the support requester through the indicated resolution steps, and if the resolution did not work, returns to step 284 to select another resolution record 361 to try again. As with the other records 361, any resolution in a resolution record that, in combination with the other records displayed in the Transcript field 43, form an activated knowledge object is displayed in green. When the agent 13 sees a green resolution record, she knows that the resolution in the resolution record has worked in the past to solve the problem defined by the other records in the field 43. The agent 13 may perform any appropriate test or review to confirm or deny the resolution displayed in green or any other resolution displayed in the resolution field 516.

When the agent 13 selects a resolution, in a step 286 she then enters the resolution record 361 containing the resolution into the Transcript field 43 in the same way she entered the other records in the transcript. If the agent ever wants to start her query over, she selects the Clear button 7. If the agent has eliminated all possible resolution records 361 as providing a successful resolution, in step 286, she enters the resolution record 361 that came closest to solving the problem presented by the support requester.

When she has reached the end of her query, either by providing a successful resolution or by deciding with the support requester not to go any further, the agent 13 is then ready to determine in a step 287 whether her query represents a successful resolution. The agent checks the fields on the screen 510 to ensure that all of the records that were necessary to make the appropriate query were available, and that the knowledge engine 30 returned the correct cause, issue and resolution in response to the query.

When the agent's query represents a failed resolution or contains missing, incorrect, or incomplete knowledge in the knowledge base memory 35, before saving the interaction, in a step 288 she selects the User Data tab 38 to fill out the Content Notes section 41 shown in FIG. 6. She checks the Content Needed? checkbox 4 to activate the Knowledge Notes capability 44 of the knowledge maintenance system 450.

The knowledge notes capability 44 is a special save mode that allows the agent 13 to provide a report of her search and the knowledge base's related need for new content to a knowledge author 14, who can review the need for new content and, if it is indicated, update the knowledge base with new knowledge. The Knowledge Notes capability 44 is activated by a selection of the Content Needed? checkbox 4. The agent 13 enters what she wants to communicate in the Content Notes field 518. She could communicate that information was missing from the knowledge base memory 35, or that the information was in the memory 35, but it was difficult to find because of the wording or because of lack of synonyms. She could communicate that records were incorrectly linked, or that the hypertext was incorrect or difficult to understand. The agent enters her communication by filling out the suggested issue section 518*a*, cause section 518*b*, and resolution section 518*c* in the field 518.

If the agent wants to save her query for later completion, in a step 289 she checks the Draft checkbox 5. The draft memo capability is implemented by the Draft checkbox 5 so that the agent 13 may delay completion of the query until a more convenient time, until more facts are obtained, or until a client reports back on the success of the resolution. The Draft checkbox 5 may be activated whether or not the Content Needed? checkbox 4 is activated.

The agent 13 then saves the query in a step 290 by selecting the Save button 6, and in a step 291, the knowledge engine 30 reviews the query to determine how to save it in the knowledge base memory 35. If the Draft checkbox 5 has been activated, in a step 292 the knowledge engine 30 saves the query as a draft knowledge object 960, which is a knowledge object 360 in the draft state. The knowledge engine 30 provides the knowledge object 960 with an ID number and appends to it the agent ID and the date of creation.

If the Draft checkbox 5 is not activated, the knowledge engine 30 determines whether the combination of records and links is a combination that has already been entered into the knowledge base. If so, the query represents an activated knowledge object 360 that already exists in the knowledge base. In a step 293 the knowledge engine 30 increments the reuse counter 365 of the activated knowledge object 360. If the query's Content Needed? checkbox has been activated, the knowledge engine 30 stores the query as the an activated knowledge object 360 with content needed. The engine 30 also logs the use of the activated knowledge object by the agent 13, the date of the use, and, if applicable, the date of the addition of the content needed matter.

If the Draft checkbox 5 is not activated and the knowledge engine 30 determines that the combination of records and links does not represent an activated knowledge object 360, in a step 294 the knowledge engine 30 stores the query as a pending knowledge object 860, which is a knowledge object 360 in the pending state. The knowledge engine 30 will append to the pending knowledge object 860 the ID of the agent 13, and the date of creation. The knowledge engine will also note if the Content Needed? checkbox is activated. The knowledge base use process 410 ends and the knowledge maintenance system 450 described below, may begin.

Draft queries may be edited in the following manner. The agent 13 retrieves a draft knowledge object 960 by opening the query user screen 510 in the manner described above and selecting the "Open Draft Query" tab on the query screen bar, not shown, to open a draft query. A request box, not shown, is displayed. A list of the draft queries, which are the draft knowledge objects 960 stored in the memory 35, is displayed in the request box. The agent may double click on a listed knowledge object 960 to display it in the screen 510. When the agent is finished with the query, she selects the Draft checkbox 5 to remove the check, and selects the Save button 6 to save the query. The knowledge engine 30 modifies the state from Draft and date of creation of the knowledge object 960 and, depending on the set of records and links represented in the query, stores the query as described above, as a pending knowledge object 860 or an activated knowledge object 360.

Knowledge Maintenance System 450

General

The maintenance methodology of the present invention has a closed loop feedback system in which an agents record their support interactions in using the knowledge base. In the maintenance methodology of the preferred embodiment, a knowledge analyst 15 has overall responsibility for the knowledge base and knowledge authors 14 keep it updated using the authoring methodology involving objectifying the knowledge described above. A knowledge author 14 review the reports for the need for content. The knowledge author 14 reports the need for new content to a knowledge analyst 15 by recording a use interaction in the manner described below. The author 14 receive a report of the use interactions, reviews the reports for need for new content and, if it is indicated, incorporates the new content into new knowledge in the knowledge base. The knowledge analyst 15 monitors the author's backlog and provides quality review of the authoring output. If the new knowledge requires additional input before it can be incorporated into the knowledge base, the knowledge analyst 15 arranges to obtain the additional input (from, for example, the customer whose product is the subject matter of the new knowledge). Once the additional input is obtained, the knowledge analyst 15 feeds it back to the author 14, who updates the new knowledge, and passes it back to the analyst 15 for another quality review.

Figure 39:
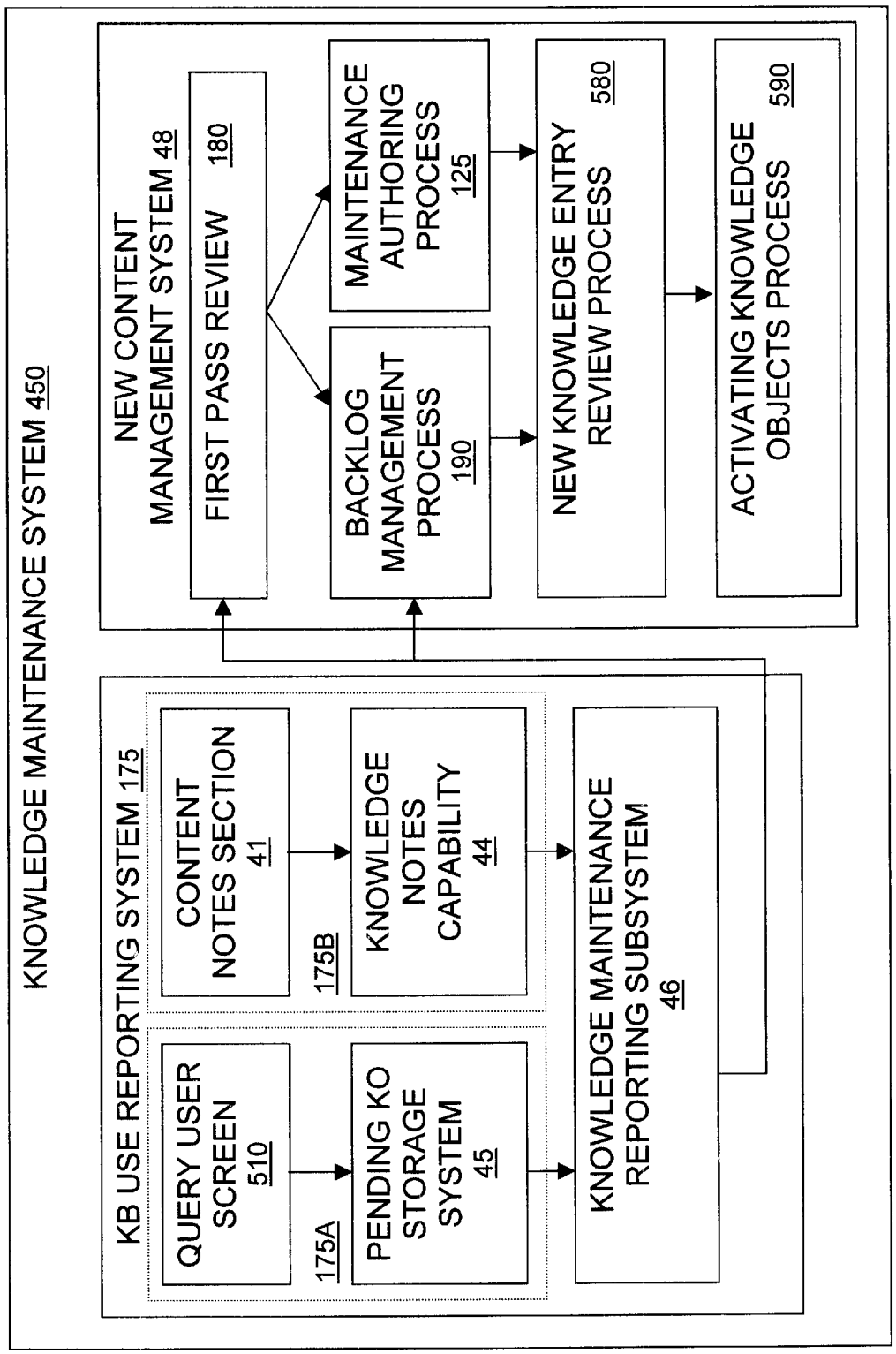
FIG. 39 is a block diagram of the knowledge maintenance system 450 shown in FIGS. 1a and 13.

As shown in FIG. 39, the knowledge maintenance system 450 for a knowledge base system 10 in which knowledge is stored in knowledge objects having a plurality of records and links between the records involves a knowledge base use reporting system 175 to report potential need for new content in the knowledge base, and a new content management system 48 to review the reports and, if incorporation of the new content into the knowledge base is indicated, to incorporate the new content into new knowledge in the knowledge base.

Knowledge Base Use Reporting System 175

In the knowledge base use reporting system 175 of the present Invention, potential need for new content in the knowledge base is documented in reports of agents' interactions 106. The interactions 106 are either pending knowledge objects 860 or knowledge objects, whether pending of active, with filled-in Content Notes sections 41. The knowledge base use reporting system 175 provides reports of the interactions 106 to the new content management system 48 through the pending knowledge object channel 175a and the knowledge notes channel 175b.

The pending knowledge object channel 175a involves providing the query user screen 510, so that an agent 13 can record unique instances of knowledge base use, and the pending knowledge objects storage system 45 for storing the unique instances in the form of pending knowledge objects 860. The knowledge notes channel 175b involves providing the Content Notes section 41 of the query user screen 510, so that an agent 13 can write a report of the need for new content, and the Knowledge Notes capability 44, described above, for storing the reports of potential need for content in the knowledge base memory 35 as knowledge objects, whether pending of active, with filled-in Content Notes sections 41.

The system 175 also involves the knowledge maintenance reporting subsystem 42 for compiling reports of the interactions 106 from channels 175a, 175b, and forwarding them to the knowledge author 14. In the preferred embodiment, the reports are provided daily. The knowledge maintenance reporting subsystem 46 is shown in FIG. 21. Reports that document need for new content are two instantiation reports 404. The Pending Knowledge Objects report 101, described above, lists the particulars of the interactions 106 from the channel 175a, which are all of the knowledge objects 360 in a pending state, and the Content Needed report 102, also described above, lists the particulars of the interactions 106 from the channel 175b, which are all of the knowledge objects, whether active or pending, that have the "Content Needed" checkbox 64 activated.

As shown in FIG. 21, the knowledge maintenance reporting subsystem 46 also creates the metrics used by the analyst 15 in the backlog management system 190 and provides reports of the metrics in instantiation reports 404 such as the Knowledge Objects Created By Week report 491 and Content Needed report 102 and in aggregation reports 405 such as the Pending Knowledge Objects Balance Sheet By Week report 461.

New Content Management System 48

General

Periodically, the knowledge maintenance reporting subsystem 42 of the knowledge base creates reports of all such interactions, and a knowledge author 14 reviews the reports for the interactions of the users to whom she is assigned to identify potential need for new content in the knowledge base.

The new content management system 48 of the knowledge maintenance system 450 involves a first pass review 180 of the interactions reported in reports 101, 102 to identify need for new content, a backlog management system 190 to manage a backlog of the new content awaiting entry into the knowledge base, an authoring system 125 for authoring the new content into the new knowledge, and a new knowledge entry review process 580 for reviewing the new knowledge, and an activating knowledge objects process 590.

First Pass Review 180

Figure 40:
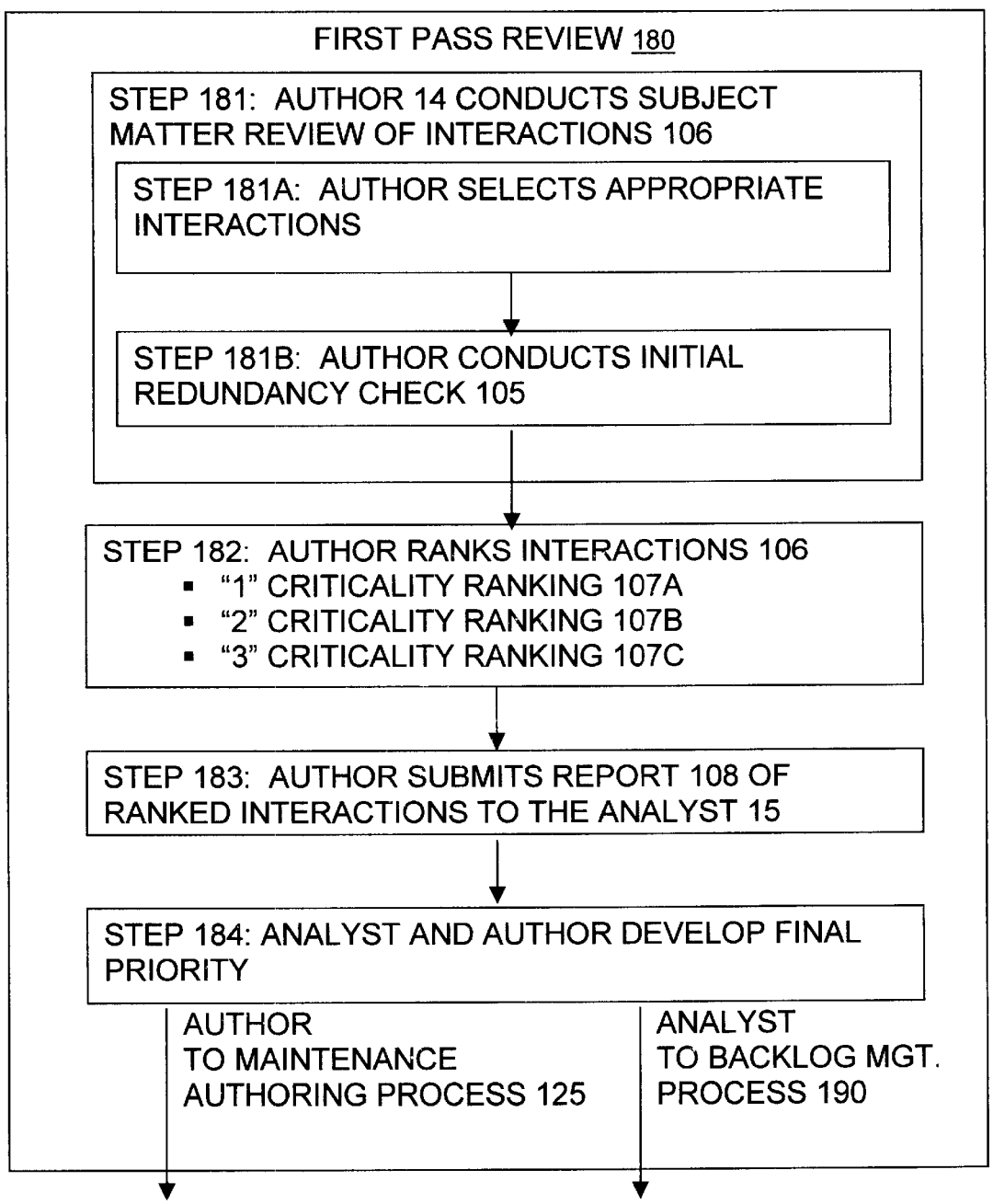
FIG. 40 is a block diagram of the first pass review 180 shown in FIG. 39.

The first pass review 180 shown in FIG. 40 involves a step 181 in which knowledge author 14 conduct a subject matter review of the interactions 106 contained in the reports of the knowledge maintenance reporting subsystem 46 to select the interactions 106 that describe appropriate candidates for the new content. As noted above, interactions 106 so reported are either pending knowledge objects 860 or active knowledge objects 360 with filled-in Content Notes sections 41.

In a step 181a the knowledge author 14 deletes any inappropriate or incomplete interactions 106 and selects those interactions 106 that contain issues that are appropriate candidates for new knowledge. In a step 181b, the knowledge author 14 then compares the interactions 106 against existing content in the knowledge base, doing an initial redundancy check 105 for each of the interactions 106 to determine whether the new knowledge suggested thereby is already stored in the knowledge base memory 35. The author 14 conducts the initial redundancy check 105 by using the record editor 23 and knowledge object editor 25 using the record editor and knowledge object editor searching procedures described above.

In a step 182, the Knowledge Author 14 then ranks the interactions 106 remaining after step 181 to provide each of them with a criticality ranking 107 indicative of the importance of incorporating the new content suggested thereby into the knowledge base memory 35. For each interaction 106 that has not been eliminated for inappropriateness or duplication, the knowledge author 14 ranks the issues raised on a scale of 1–3, with those ranked "3" being able to be eliminated or set aside for later consideration, and those ranked "1" and "2" being more urgent in nature.

In the preferred embodiment, the knowledge author 14 provides a "1" ranking 107a to common or well-known issues having resolutions that are not yet incorporated into the knowledge base, to difficult issues having resolutions that are not disclosed in existing documentation, and to issues having resolutions that are erroneously disclosed in existing documentation. A "1" ranking 107a is also provided to hot-fix issues, which are issues that for a variety of reasons have become a high priority and require quick dissemination to support agents. A "1" ranking 107a is also provided to issues involving a new release of a product for which support is provided, when the new release is substantially different from previous releases.

The knowledge author 14 provides a "2" ranking 107b to somewhat common issues that pertain to older versions of a product, to difficult issues having a not easily understood resolution, and to difficult issues having resolutions that are inadequately disclosed in existing documentation. A "2" ranking 107b is also provided to less common but more advanced topics that have a simple resolution, such as a programming or minor hardware modification.

The knowledge author 14 provides a "3" ranking 107c to duplicate records found in the knowledge base, to rare or rarely requested issues, and to rare causes and/or resolutions for common issues. A "3" ranking 107c is also provided to a complex solution that may exceed defined support boundaries.

In a step 183, the author 14 submits a report 108 of all of the ranked interactions 106 to the knowledge analyst 15, who manages content in the knowledge base system 10. In a step 184, the knowledge analyst 15 reviews the criticality rankings 107, provides feedback on the rankings 107, and works with the knowledge author 14 to determine a final priority for addressing each of the issues addressed in the interactions 106.

The first pass review 180 is completed and the author 14 begins the maintenance authoring process 125 to author the new content into the new knowledge, while the knowledge analyst 15 begins the backlog management system 190 to manage the backlog of interactions 106 to be addressed.

Backlog Management System 190

The extent of the backlog management system 190 will depend on the given circumstances of each knowledge base management program. In the preferred embodiment, the analyst 15 focuses on the overall progress of the author 14 in addressing all of the interactions.

The analyst reviews reports from the knowledge maintenance reporting subsystem 42 to track the volume of interactions 106 that an author 14 has addressed. Turning to FIG. 21, one instantiation report 404 that the analyst 15 uses to manage backlog is the Knowledge Objects Created by Week report 491, described above in connection with the knowledge monitoring reporting subsystem 42 and shown in FIG. 20, which identifies the particulars for all the knowledge objects created in the selected week. Other instantiation reports 404 on which the analyst 15 relies are the Pending Knowledge Objects report 101 and the Content Needed report 102 in order to determine the number of outstanding issues that the authors 14 need to address.

In addition, an aggregation report 405 that an analyst uses to show the extent of progress in a selected week toward eliminating authoring backlog is the Pending Knowledge Objects Balance Sheet by Week report 461, described above and shown in FIG. 19. In particular, the analyst 15 will be interested in tracking trends in the team's Turnaround Time metric 437', which is displayed in the Average Days to Active column 467, and the Absolute Knowledge Growth metric 435, which is displayed in the Promoted to Active column 465.

Maintenance Authoring Process 125

Figure 41:
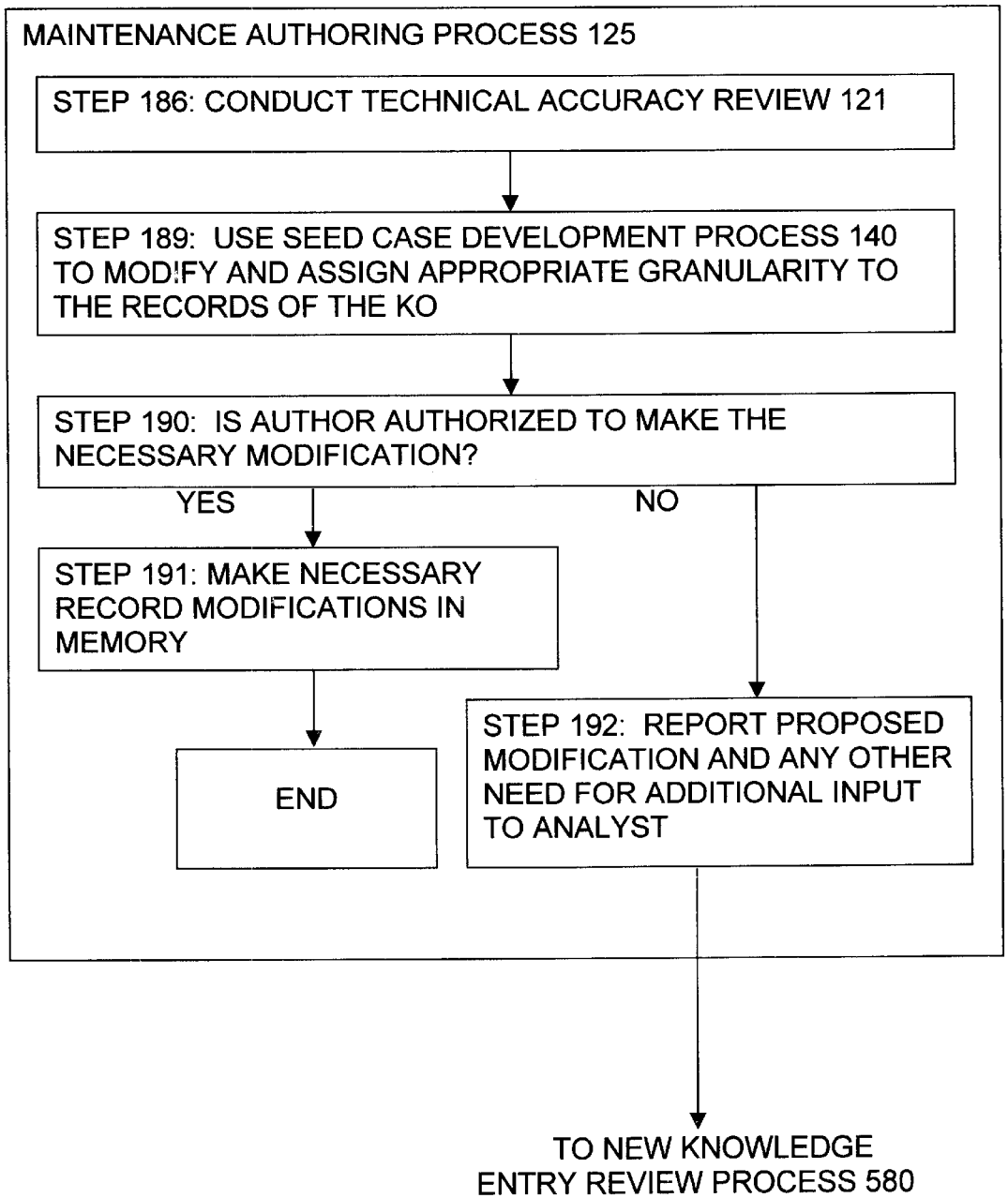
FIG. 41 is a block diagram of the maintenance authoring process 125 shown in FIG. 39.
Figure 42:
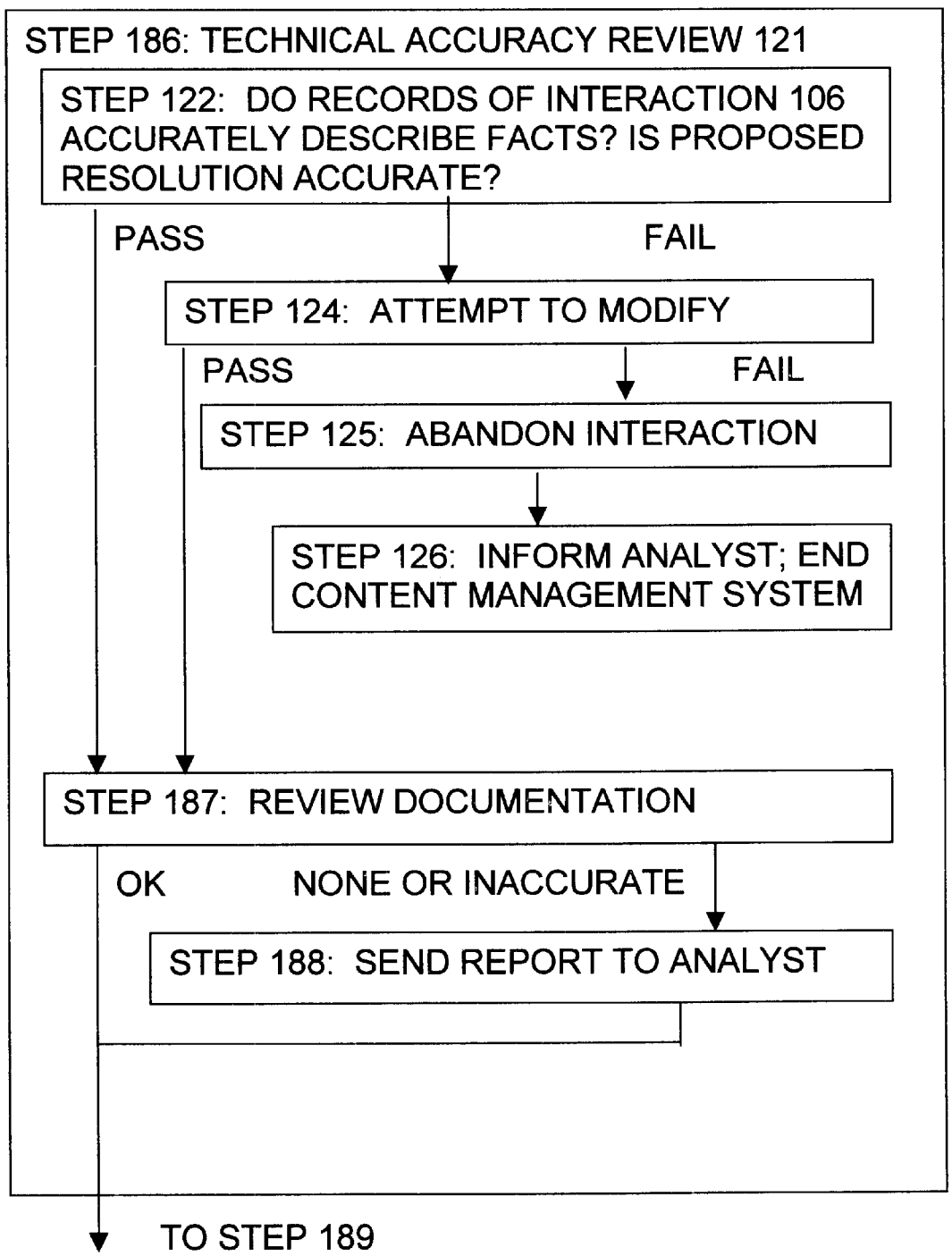
FIG. 42 is a block diagram of the technical accuracy review 121 for the maintenance authoring process 125 shown in FIG. 41.

The author 14 uses the maintenance authoring process 125 shown in FIG. 41 to address each user interaction 106 in her backlog in the order determined by the priority she and the analyst 15 assigned in step 184 of the first pass review 180. As the author 14 addresses each interaction 106, in a first step 186 she conducts a technical accuracy review 121 of the interaction 106. The technical accuracy review 121, shown in FIG. 42, involves a step 122 of determining whether the factual circumstances are accurately described by the existing records 361 used in the interaction and by the potential new records 661 that are necessary for the factual circumstances of the interaction 106, and whether the proposed resolution of the interaction 106 accurately provides a successful resolution to the support problem described by the interaction 660. The step 122 may involve the author 14 calling on subject matter experts, interviewing the agent who documented the interaction 106, or even testing the resolution on test equipment, not shown.

If the potential knowledge object is not technically accurate, in a step 124 the author attempts to modify the interaction to be technically accurate. If she is unable to do so, in a step 125 she abandons the interaction, deleting the knowledge object 360, 660 upon which the interaction 106 is based using the Deleting Knowledge Objects process 32 described above. In step 126 she informs the analyst of the deletion and ends the new content management system 48 for the interaction 106.

When the author 14 determines that the potential knowledge objects is technically accurate, in a step 187 she reviews the documentation that she has on the subject matter of the interaction 106 to determine whether the subject matter already exists in documentation, and, if so, whether the documentation is correct. If there is no documentation on the subject matter or if the documentation is incorrect, in a step 188 she reports the matter to the analyst 15 in a memo. The analyst 15 will later use the memo to classify the interaction 106 as an additional input issue 109 in the new knowledge entry review process 580 described below.

The process 125 then proceeds to step 189, where the author 14 uses the seed case development process 140 to modify and assign the appropriate granularity to the records of the potential knowledge objects 360 or 660 upon which the interaction 106 is based. Referring to FIG. 23, the author starts at step 142. She follows the knowledge objectification process 150 to make any necessary modifications to the knowledge objects 360, 660. The author 14 makes whatever edits are necessary to the records of the knowledge object 660, 360 to appropriately describe the interaction 106 as she now understands it. At this point, the modifications that the author 14 makes are hard copy. The author 14 does not yet modify, add or delete and records or knowledge objects 360, 660 in the memory 35.

In creating and modifying records and knowledge objects, the author 14 edits for technical accuracy and in adherence to the authoring conventions and guides to add uniformity to records and knowledge objects. The author 14 uses the definitions of records and knowledge objects, guidelines for format and development of records and knowledge objects, and guidelines for use of synonyms to capture alternative statements of the records and knowledge objects, all of which are found in the authoring conventions and guides. The author 14 develops modifications only as needed to add new knowledge or delete unnecessary, incorrect or misleading knowledge.

The author then proceeds to step 143 to conduct the objectified knowledge review 160 of the process 140 in the manner described by the knowledge base populating process 80 in order to assign appropriate granularity to each potential new record 661 of the knowledge objects 360, 660 and to eliminate synonymic and subset redundancies.

If the objectified knowledge review 160 indicates that modifications to records 361, deletions of records 361, or the addition of new records 661 are indicated, in a step 190 the author 14 decides whether she is authorized to make immediate changes to the knowledge base memory 35. In the preferred embodiment, if the modifications to the knowledge base involve a minor change, such as correcting grammar in hypertext or modifying the synonyms of a record, the author 14 is authorized to immediately make the modifications. If the modifications are more extensive, they need to be reviewed by the knowledge analyst 15 before they are entered in the knowledge base memory If the author 14 is authorized to make a modification, in a step 191 she uses the record editor 23 to make the necessary record modification to the knowledge base memory 35, following the Amending Knowledge Base processes 28 described above. Once all of the necessary record 361 changes are made, in a step 192 the knowledge author 14 informs the knowledge analyst assigned to the author 14 of her proposed modifications to the knowledge base memory 35. She may inform the analyst in any appropriate manner, such as drafting an e-mail or making a phone call to the knowledge analyst 15, or presenting the proposed modifications in a content review capability, not shown, of the knowledge base system 10. In the preferred embodiment, the author 14 creates a memo outlining the interaction 106 in the memory 35 as the interaction 106 presently exists and her proposed modifications to the memory 35 based on the interaction 106. The memo contains a detailed description of the involved product (hardware, software, environment), the underlying issue, and the probable cause and resolution. The author also creates a test report, not shown, containing detailed descriptions of all tests that she conducted, including all steps performed in testing, all troubleshooting steps and solutions, the sources of information upon which she relied, and a filled-in testing checklist. The testing checklist contains all of the possible hardware and software with which she could conduct her tests, and all of the environments in which she could conduct her tests. She then forwards the memo and test report to the analyst 15. If the author 14 uncovers a problem during the authoring process, such as unverifiable resolutions or unclear or incorrect documentation, or any problem that requires additional input before the knowledge is incorporated in the knowledge base, in the step 192 she also notes the problem and requests additional input. The author then ends the maintenance authoring process 125, and the new content management system 48 proceeds to the new knowledge entry review process 580.

New Knowledge Entry Review Process 580

General

Figure 43:
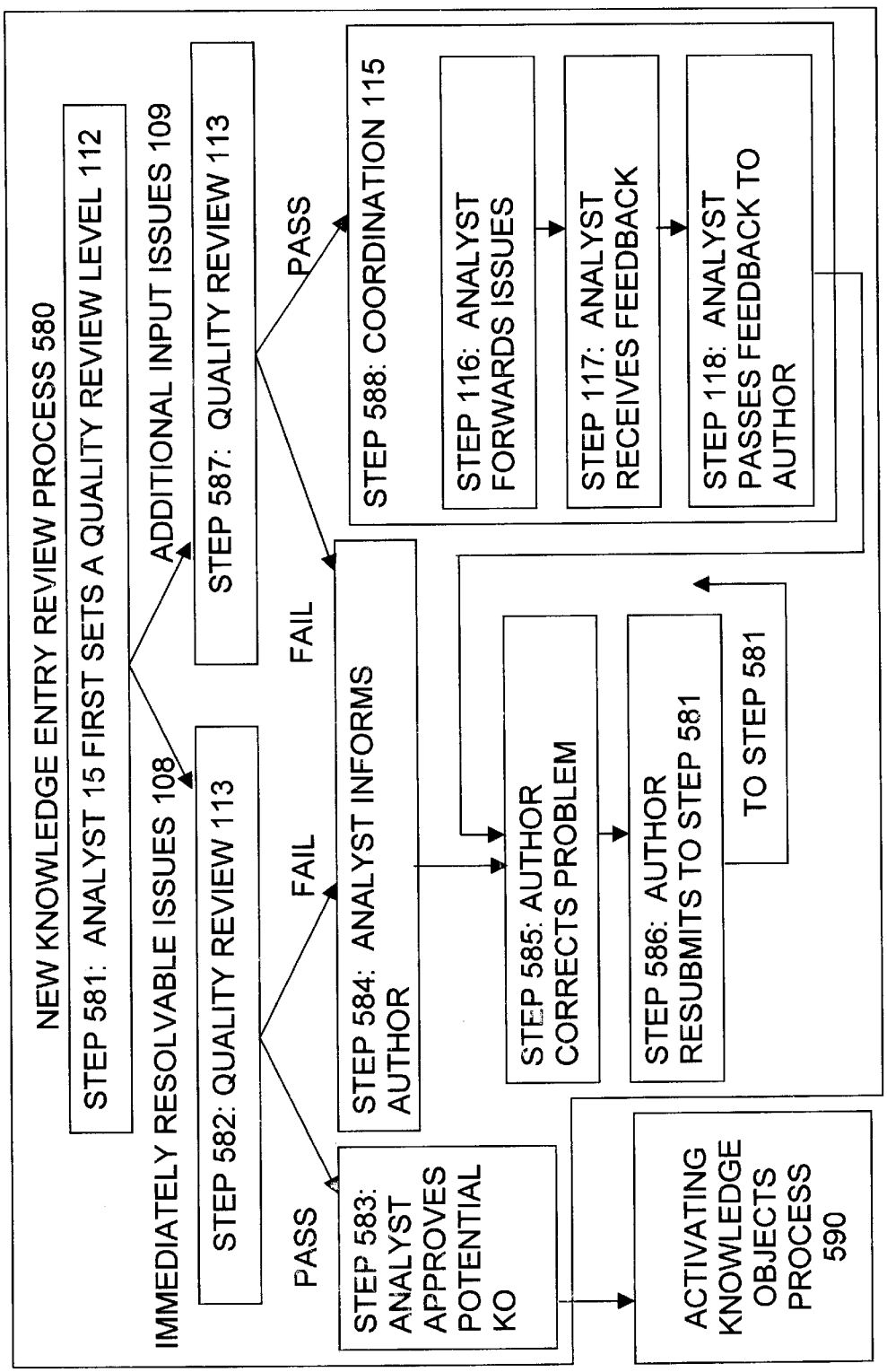
FIG. 43 is a block diagram of the new knowledge entry review process 580 shown in FIG. 13.

When the author 14 completes the authoring process as far as possible for an interaction 106, she submits the authored new knowledge to the knowledge analyst 15. In the preferred embodiment, the submission is a bulk daily submission of knowledge objects 360, 660. The analyst 15 reviews the material using the new knowledge entry review process 580, shown in FIG. 43 and described with reference to FIGS. 13 and 43. By following the new knowledge entry review process 580 of the preferred embodiment, the knowledge analyst 15 ensures that the knowledge base memory 35 remains current, accurate and appropriately structured.

In the first step 581, the knowledge analyst 15 first sets a quality review level 112 for each knowledge object 360, 660 by determining what level of review is necessary for each knowledge object 360, 660 before approval of its entry into the knowledge base memory 35. Setting the quality review level 112 involves segregating the new knowledge into immediately resolvable issues 108 and additional input issues 109. Immediately resolvable issues 108 involve knowledge objects 360, 660 that, if they pass the quality reviews 113 described below, can be entered immediately into the knowledge base memory 35. Additional input issues 109 involve knowledge objects 360, 660 that not only need to pass the quality reviews 113, but they require additional input before they are approved for entry into the memory 35.

Immediately Resolvable Issues 108

In the preferred embodiment, immediately resolvable issues 108 include simple modifications to an existing knowledge object, such as the addition of a synonym, or inclusion of subject matter that already exists in documentation and has been verified as correct by the knowledge author 14. Immediately resolvable issues 108 also include additional input issues 109 that have now been resolved. The knowledge analyst 15 addresses the immediately resolvable issues by conducting in step 582 the quality review 113 described below. When the immediately resolvable issue 108 passes the quality review 113, in a step 583 the analyst 15 approves it as written for entry into the memory 35, and the new knowledge entry review process 580 proceeds to the Activating Knowledge Objects Process 590, described below.

If quality problems are found with a knowledge object 360, 660, in a step 584 the knowledge analyst 15 informs the knowledge author 14, who in a step 585 corrects the problem by making any necessary modifications to the knowledge object 360, 660 and/or its associated records using the Amending Knowledge Base processes 28 described above. In a step 586, the author 14 resubmits the modified knowledge object 360, 660 to step 581 of the new knowledge entry review process 580.

Additional Input Issues 109

In the preferred embodiment, additional input issues 109 include additions to the memory 35 of totally new knowledge that does not already exist in documentation or additions of knowledge that is contained in documentation, but has not been easily verified by the knowledge author 14. Additional input issues 109 also include additions of knowledge that may be subject to specific requirements of the customer who is the beneficiary of the knowledge base, such as confidentiality or use restrictions.

The knowledge analyst 15 addresses the additional input issues by in step 587 conducting the quality review 133, which is described below. If quality problems are found with a new knowledge object 360, 660 having an additional input issue 109, the process proceeds through steps 584–586 in which the knowledge author 14 corrects the problem and resubmits the modified knowledge object 360, 660 to step 581.

When the knowledge object 360, 660 with the additional input issue 109 passes the quality review 113, in a step 588 the analyst follows the escalation coordination process 115 for escalating and obtaining feedback from the issue requiring additional input to an entity that can resolve the problem. In the preferred embodiment, the entity is the customer who is the beneficiary of the knowledge base. The escalation coordination process 115 for coordinating the escalation involves a step 116 of forwarding the issues by the knowledge analyst 15 to the customer, a step 117 of receiving feedback by the knowledge analyst 15 from the customer, and a step 118 of the knowledge analyst 15 passing the feedback to the author 14.

Forwarding of issues to the customer can occur on a case by case basis or, as in the preferred embodiment, in bulk on a periodic basis. As the customer provides the additional input in the form of approvals of new content, direction on how to treat outstanding issues, or resolution of technical issues, the process proceeds through steps 585–586 in which the knowledge author 14 corrects the problem by incorporating the feedback into the appropriate knowledge object 360, 660, and resubmits it into the new knowledge entry review process 580.

Quality Review 113

Figure 44:
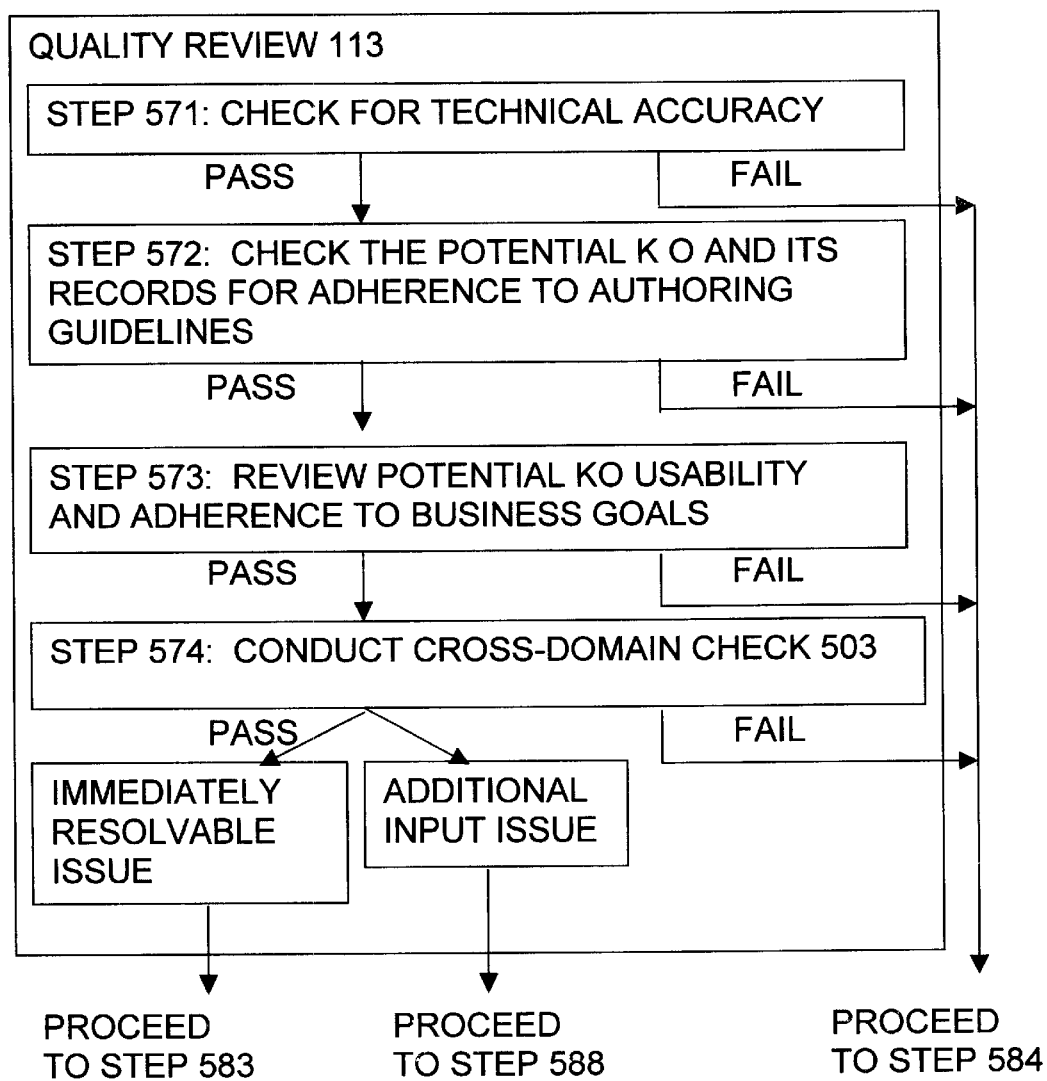
FIG. 44 is a block diagram of the quality review 113 of the new knowledge entry review process 580 shown in FIG. 43.

The first step of the quality review 133, shown in FIG. 44, is a step 571, in which the analyst 15 checks the new knowledge represented in the knowledge object 360, 660 for technical accuracy. The review for technical accuracy can be at any appropriate level, ranging from an in-depth technical review of the author's tests and conclusions (which is appropriate if the analyst 15 is a subject matter expert), to a cursory review of the author's test report to ensure that all appropriate testing was conducted and all appropriate testing procedures were followed.

In a step 572, the analyst 15 checks the knowledge object 360, 660 and each of its records 361, 661 for adherence with the guidelines articulated in the authoring conventions and guides. In a step 573, the knowledge analyst 15 also reviews the knowledge object 360, 660 and records 361, 661 for usability and to ensure that user and business feedback is being processed effectively by the knowledge author 14. If quality problems are found at any step, the knowledge analyst 15 fails the potential knowledge object 360, 660, and the review process 112 proceeds to step 584, where she informs the knowledge author 14, who corrects the problem and resubmits the new knowledge into the new knowledge entry review process 580.

In a step 574, the knowledge analyst 15 also conducts a cross-domain check 503 of the knowledge base memory 35. In the cross-domain check 503, the analyst conducts the objectified knowledge review 160 described above in order to determine whether the new knowledge affects any knowledge objects in other domains. When the analyst 15 finds cross-domain affected records 761, she fails the knowledge object 360, 660, and the review process 112 proceeds to step 584, where the analyst identifies the affected records 761 to the author 14, who corrects the problem with the knowledge object 360, 660 by resubmitting it to the maintenance authoring process 125 again. In the process 125, the author 14 develops modifications to the knowledge object 360, 660 and the affected records in the other domains in the manner described above in order to incorporate the new knowledge and any cross-domain additional new knowledge into the knowledge base.

When the quality review 113 identifies no affected knowledge objects in the other domains, the knowledge object 360, 660 has passed its cross-domain check 503. When the potential knowledge object passes the quality review conducted by the analyst 15, if it involves an immediately resolvable issue 108, the analyst 15 proceeds to step 583 to approve it for entry into the knowledge base, as written. If it involves an additional input issue 109, the analyst 15 proceeds to step 588 to the escalation coordination process 115.

Activating Knowledge Objects Process 590

Depending on how author 14 and analyst 15 responsibilities are allocated, either the author 14 or analyst 15 may implement the approved changes in the Activating Knowledge Objects process 590 by using the Amending Knowledge Base processes 28 described above. If potential objects 660 need to be activated, the analyst 15 or author 14 activate the potential knowledge object 660 using the Modifying Knowledge Objects process 29. Activating involved removing the knowledge object 660 from its pending state and placing it in its active state. Knowledge objects may be activated individually or in bulk.

When knowledge objects are activated in bulk, they are activated in the order indicated by a three priority level system. Knowledge objects with current incorrect information or with new records get highest priority. Knowledge objects with records that were modified get second priority because the modifications may offer new structure to reworked records. Knowledge objects with no record addition or modification get lowest priority, but they still need to be activated regularly in order to activate new resolution paths.

CONCLUSION

Having described preferred embodiments of the invention, it will now become apparent to those of skill in the art that other embodiments incorporating its concepts may be provided. It is felt therefore that this invention should not be limited to the disclosed embodiments but rather should be limited only by the spirit and scope of the appended claims.

What is claimed is:

1. A method of managing knowledge in a knowledge base, said method comprising:

representing instantiations of said knowledge in a plurality of knowledge objects, said knowledge base having a number of said knowledge objects;

with each of said knowledge objects comprising a plurality of elements of information, and with said elements used in more than one of said knowledge objects comprising multiple use elements and with said elements used in only one of said knowledge objects comprising unique elements; and managing said knowledge objects to minimize said number of said knowledge objects while ensuring that said knowledge base comprises knowledge objects representing all known instantiations, said managing said knowledge objects comprising managing said elements of each of said knowledge objects to ensure that each of said knowledge objects represents a unique instantiation of knowledge, wherein each of said knowledge objects has one of the following:

at least one of said unique elements, or a unique combination of said multiple use elements;

generalizing said instantiations to develop generalized instantiations;

testing said generalized instantiations against said all known instantiations to identify redundancies among said knowledge objects and to identify additional knowledge, and modifying said knowledge base to minimize said redundancies and to add to said knowledge base only to facilitate retrieval of said knowledge in said knowledge base or to add said additional knowledge.

2. The method of claim 1, wherein said knowledge base has knowledge object types and element types, each of said knowledge objects having one of said knowledge object types and each of said elements having one of said element types, and wherein said managing said elements of each of said knowledge objects further comprises providing each of said knowledge objects of a first knowledge object type with a first element and a second element, with said first element having a first element type to represent a first item of information in a first of said instantiations, and with said second element having a second element type to represent a second item of information in said first of said instantiations, said second item of information developed from abstracting said first item of information, with said second element capable of being used in a second of said knowledge objects having said first knowledge object type but representing a second of said instantiations, with said second of said knowledge objects not having said first item of information.

3. The method of claim 1, wherein minimizing said redundancy among said knowledge objects further comprises developing a knowledge object candidate to store a first instantiation; and amending said knowledge base to store said first instantiation by doing one of the following:

amending an existing knowledge object in said knowledge base to store said first instantiation, or adding an additional knowledge object to said knowledge base.

4. The method of claim 3, wherein adding said additional knowledge object to said knowledge base comprises adding said knowledge object candidate.

5. The method of claim 3, wherein amending said existing knowledge object further comprises incorporating said knowledge object candidate into said existing knowledge object.

6. The method of claim 3, wherein amending said existing knowledge object further comprises incorporating said existing knowledge object into said knowledge object candidate.

7. The method of claim 3, further comprising:

combining said knowledge object candidate with said one of said existing knowledge objects to identify said additional knowledge; and if said additional knowledge is identified, rejecting said knowledge object candidate and amending said knowledge base to store said additional knowledge.

8. The method of claim 1, wherein minimizing said redundancies among said knowledge objects further comprises minimizing redundancies among said elements in said knowledge objects.

9. The method of claim 8, wherein said minimizing redundancies among said elements further comprises:

identifying a knowledge object candidate embodying knowledge to be incorporated into said knowledge base, said knowledge object candidate having at least one candidate element;

for each said candidate element, generalizing said candidate element to create a generalized candidate element;

determining identified existing elements, said identified existing elements comprising said existing elements that are candidates for change in said knowledge base due to said knowledge object candidate; and conducting an interchangeability analysis of said generalized candidate element and said identified existing elements to identify said redundancies among said elements.

10. The method of claim 9, wherein conducting said interchangeability analysis of said generalized candidate element and said identified existing elements further comprises:

identifying whether any of said identified existing elements and said generalized candidate element comprise identical elements; and developing any additional knowledge.

11. The method of claim 9, wherein said knowledge base has knowledge object types and element types, each of said knowledge objects having one of said knowledge object types and each of said elements having one of said element types, further comprising determining said identified existing elements by identifying a first element type for said candidate element, and identifying said existing elements having said first element type, said existing elements having said first element type comprising identified existing elements.

12. The method of claim 9, wherein said conducting said interchangeability analysis of said generalized candidate element and said identified existing elements further comprises substituting said identified existing elements into said knowledge object candidate, and substituting said generalized candidate element into any identified existing knowledge objects, said identified existing knowledge objects comprising knowledge objects existing in said knowledge base and having any of said of said identified existing elements.

13. The method of claim 12, further comprising identifying said identified existing elements for which said candidate element operates as a synonym, said identified existing elements for which said candidate element operates as said synonym comprising synonymic existing elements, and identifying identified synonymic knowledge objects comprising existing knowledge objects associated with said synonymic existing elements;

wherein said conducting said interchangeability analysis of said generalized candidate element and said identified existing elements further comprises substituting said generalized candidate element into any identified synonymic knowledge objects.

14. The method of claim 9, further comprising identifying said identified existing elements that comprise an apparent subset redundancy with said candidate element, said identified existing elements that comprise said subset redundancy comprising existing apparent subset redundancy elements, and identifying identified apparent subset redundancy knowledge objects comprising existing knowledge objects associated with said existing subset redundancy elements;

wherein said conducting said interchangeability analysis of said generalized candidate element and said identified existing elements further comprises substituting said generalized candidate element into any identified apparent subset redundancy knowledge objects.

15. The method of claim 14, wherein said subset redundancy comprises a superset/subset redundancy.

16. The method of claim 14, wherein said subset redundancy comprises a dual subset redundancy, in which said any said additional knowledge comprises a superset for said knowledge to be added into said knowledge base represented in said candidate element and said existing knowledge represented in said existing apparent subset redundancy elements.

17. The method of claim 1, wherein said modifying said knowledge base further comprises updating said elements to include said additional knowledge, said updating said elements further comprising at least one of the following:

editing a first element to form an edited element;

deleting a second element, or adding an additional element of information.

18. The method of claim 17, wherein said elements comprise records; wherein editing said first element to form an edited element comprises editing a first record to form an edited record, wherein deleting said second element comprises deleting a second record, and wherein adding said additional element of information comprises adding an additional record.

19. The method of claim 17,
wherein said elements comprise records and links, with a first record and a second record having a first link comprising an association between said first record and said second record, and with a third record and a fourth record having a second link comprising an association between said third record and said fourth record, and
wherein editing said first element to form an edited element comprises editing said first link to form an edited link, wherein deleting said second element comprises deleting said second link, and wherein adding said additional element of information comprises adding an additional link between said first record and a fifth record in said knowledge base.

20. The method of claim 19, wherein said additional knowledge is represented by said first record and said additional link; wherein said fifth record is already stored in said knowledge base; and wherein updating said elements to include said additional knowledge further comprises
adding said first record to said knowledge base, and
forming said additional link between said first record and said fifth record in said knowledge base.

21. The method of claim 19, wherein said additional knowledge is represented by said first record, said fifth record, and said additional link; and wherein updating said elements to include said additional knowledge further comprises
adding said first record and said fifth record to said knowledge base, and
forming said additional link between said first record and said fifth record in said knowledge base.

22. The method of claim 19, wherein said additional knowledge is represented by said additional link; wherein said first record and said fifth record are already stored but have no association therebetween in said knowledge base; and wherein updating said elements to include said additional knowledge further comprises forming said first link between said first record and said fifth record in said knowledge base.

23. The method of claim 17, wherein said amending said knowledge base further comprises storing a first synonym as a descriptor of said knowledge, said first synonym stored with said knowledge to facilitate said retrieval of said knowledge in searches of said knowledge base.

24. The method of claim 23, wherein said first synonym comprises a most recognized synonym, further comprising storing said most recognized synonym as a main synonym descriptor of said knowledge; and storing alternative synonyms as alternative synonym descriptors of said knowledge.

25. The method of claim 23, wherein said element further has a knowledge object name, further comprising repeating said knowledge object name in said first synonym.

26. The method of claim 23, wherein said first synonym has a first grammatical form, further comprising storing a second grammatical form of said first synonym as an alternative synonym descriptor of said knowledge.

27. The method of claim 9,
wherein said knowledge comprises knowledge about a first domain;
wherein said knowledge object candidate comprises knowledge about a second domain;
wherein said identified existing elements comprise said existing elements associated with said knowledge objects in said first domain and said second domain; and
wherein said additional knowledge is developed by combining said knowledge object candidate with said identified existing knowledge objects and comprises at least one of the following: additional knowledge about said first domain, additional knowledge about said second domain, and cross-domain knowledge.

28. A system for managing knowledge in a knowledge base, said system comprising:
an architecture for representing instantiations of said knowledge in a plurality of knowledge objects, said architecture providing said knowledge base with a number of said knowledge objects;
with each of said knowledge objects comprising a plurality of elements of information, and
with said elements used in more than one of said knowledge objects comprising multiple use elements and with said elements used in only one of said knowledge objects comprising unique elements; and
a knowledge object manager for minimizing said number of said knowledge objects while ensuring that said knowledge base comprises knowledge objects representing all known instantiations, said knowledge object manager comprising
an element manager for ensuring that each of said knowledge objects represents a unique instantiation of knowledge, wherein each of said knowledge objects has one of the following: at least one of said unique elements, or a unique combination of said multiple use elements;
an instantiation generalizing system for developing generalized instantiations;
a generalized instantiation tester for testing said generalized instantiations against said all known instantiations to identify redundancies among said knowledge objects and to identify additional knowledge, and
a knowledge base modifying system for modifying said knowledge base to minimize said redundancies and to add to said knowledge base only to facilitate retrieval of said knowledge in said knowledge base or to add said additional knowledge.

* * * * *

UNITED STATES PATENT AND TRADEMARK OFFICE
CERTIFICATE OF CORRECTION

PATENT NO. : 6,591,258 B1
DATED : July 8, 2003
INVENTOR(S) : Sharon Stier and Debra Ann Haughton It is certified that error appears in the above-identified patent and that said Letters Patent is hereby corrected as shown below:

Column 4,
Lines 16-20, delete "Fig. 1c is a block diagram of the knowledge objects 360 shown in Fig. 1a, showing in general different knowledge object types; Fig. 1d is a block diagram of the records 361 shown in Fig. 1b, showing in general different record types;"
Lines 21, 41, 44, 47 and 50, delete "1e" and replace with -- 1c --
Line 53, delete "Records" and replace with -- Custom Data --; and delete "1e" and replace with -- 1c --
Line 67, delete "." and replace with -- ; --

Column 5,
Line 58, delete "shown in Fig. 13"

Column 7,
Line 61, delete "1c, 1d,"

Column 8,
Line 2, delete "R4 and R5" and replace with -- R4, R5, and R3 --
Line 3, after "L5", add -- , records R4 and R3 are linked by link L4, and records R5 and R3 are linked by link L6 --
Lines 7-12, delete "Referring to Figs. 1c and 1d, knowledge objects 360 are defined by knowledge object types 363, and records 361 are defined by record types 362. As an example, Fig. 1c shows knowledge object types 363a, 363b, and 363c for knowledge objects 360, and Fig. 1d shows record types 362a, 362b, 362c for records 361."
Line 39, delete "1a" and replace with -- 1b --

Column 12,
Line 12, delete "agents" and replace with -- analysts --

Column 13,
Line 19, delete "1e" and replace with -- 1c --

Column 14,
Line 7, delete "559c" and replace with -- 518c --
Line 27, delete "1e" and replace with -- 1c --

Column 15,
Line 36, delete "1e" and replace with -- 1c --
Line 59, delete "Knowledge Object" and replace with -- Record --

Column 16,
Line 24, delete "10a" and replace with -- 10b --

UNITED STATES PATENT AND TRADEMARK OFFICE
CERTIFICATE OF CORRECTION

PATENT NO. : 6,591,258 B1
DATED : July 8, 2003
INVENTOR(S) : Sharon Stier and Debra Ann Haughton It is certified that error appears in the above-identified patent and that said Letters Patent is hereby corrected as shown below:

Column 17,
Line 10, delete "363" and replace with -- 362 --
Line 14, delete "361" and replace with -- 362 --

Column 18,
Line 43, delete "479" and replace with -- 479' --

Column 19,
Line 14, delete "metrics" and replace with -- metric --
Lines 45 and 48, delete "agents" and replace with -- analysts --

Column 20,
Line 20, delete "365r" and replace with -- 365a --
Lines 21 and 23, delete "360r" and replace with -- 360a --

Column 21,
Lines 7 and 22, after "reports", add -- 404 --
Line 33, delete "365* and reuse counters 365'r" and replace with -- 365*a, 365*b, 365*c, through 365*z and monitoring reuse counters 365'a, 365'b, 365'c, through 365'z, all shown in Fig. 18 --

Column 22,
Line 1, delete "409" and replace with -- , not shown --
Line 55, delete "33a" and replace with -- 22 --
Line 63, delete "ID and" and replace with -- and ID --

Column 26,
Lines 13 and 17, delete "664" and replace with -- 664a --
Lines 14 and 18, delete "163" and replace with -- 164 --

Column 27,
Line 8, delete "364a/b" and replace with -- 364u/b --; and delete "364a/c" and replace with -- 364u/c --
Line 9, delete "361a" and replace with -- 361u --;
Line 23, delete "26" and replace with -- 27 --
Line 35, delete "27" and replace with -- 26 --
Line 48, delete "660V" and replace with -- 660T --

Column 28,
Lines 8, 17 and 22, delete "664" and replace with -- 664a --
Lines 23 and 59, delete "671" and replace with -- 761 --
Line 36, delete "171a" and replace with -- 171 --

UNITED STATES PATENT AND TRADEMARK OFFICE
CERTIFICATE OF CORRECTION

PATENT NO. : 6,591,258 B1
DATED : July 8, 2003
INVENTOR(S) : Sharon Stier and Debra Ann Haughton It is certified that error appears in the above-identified patent and that said Letters Patent is hereby corrected as shown below:

Column 29,
Line 4, delete "163" and replace with -- 164 --
Line 6, delete "164" and replace with -- 165 --
Lines 16 and 20, delete "664" and replace with -- 664a --
Line 28, delete "171a" and replace with -- 171 --

Column 32,
Line 27, delete "62a" and replace with -- 62 --

Column 33,
Line 3, delete "671Q" and replace with -- 761Q --

Column 34,
Line 14, delete "760S" and replace with -- 761S --
Lines 51 and 63, before "64", add -- 74a in step --
Line 64, before "65", add -- 74b in step --

Column 35,
Line 38, delete "first step 65a" and replace with -- second step 65b --

Column 36,
Line 19, delete "64b and 65b" and replace with -- 65a and 65c --
Line 52, delete "superset/subset" and replace with -- synonymic --
Line 61, delete "74a" and replace with -- 75a --

Column 37,
Line 29, before "67", add -- 75b of step --
Line 60, delete "661A" and replace with -- 660A --
Line 62, delete "760B" and replace with -- 761B --

Column 38,
Line 29, delete "66b and 67b" and replace with -- 67a and 67c --

Column 40,
Line 62, delete "528" and replace with -- 548 --
Line 64, delete "526" and replace with -- 546 --

UNITED STATES PATENT AND TRADEMARK OFFICE
CERTIFICATE OF CORRECTION

PATENT NO. : 6,591,258 B1
DATED : July 8, 2003
INVENTOR(S) : Sharon Stier and Debra Ann Haughton It is certified that error appears in the above-identified patent and that said Letters Patent is hereby corrected as shown below:

Column 41,
Line 1, before "a", add -- record 361u might be --; and delete "661z" and replace with -- 661 --
Line 2, delete "might have" and replace with -- with --
Line 4, delete "761z" and replace with -- 761 --; and delete "661z" and replace with -- 661 --
Line 6, delete "661z" and replace with -- 661 --
Line 7, delete "361y" and replace with -- 361b --
Line 9, delete "661y" and replace with -- 361b --
Line 16, delete "361y" and replace with -- 361b -- (twice)
Line 21, delete "526" and replace with -- 546 --
Line 27, delete "661z" and replace with -- 361u --
Line 28, delete "761z" and replace with -- 761 --
Line 49, delete "162" and replace with -- 761 --
Line 52, delete "165" and replace with -- 163 --
Line 57, delete "163" and replace with -- 164 --
Line 65, delete "671" and replace with -- 761 --

Column 42,
Line 9, delete "664" and replace with -- 664a --
Line 61, delete "528" and replace with -- 548 --
Line 63, delete "526" and replace with -- 546 --

Column 43,
Line 27, delete "381"
Line 29, before "550", add -- 62 on the screen --

Column 45,
Line 34, delete "81" and replace with -- 80 --
Line 39, delete "29" and replace with -- 32 --

Column 46,
Line 5, delete "31" and replace with -- 36 --
Line 17, delete the second "in"
Lines 17-18, delete "knowledge object"
Line 19, delete "fields"

Column 50,
Line 7, before "an", delete -- the --
Line 45, delete "an"
Line 51, delete "A knowledge author" and replace with -- Knowledge authors --

UNITED STATES PATENT AND TRADEMARK OFFICE
CERTIFICATE OF CORRECTION

PATENT NO. : 6,591,258 B1
DATED : July 8, 2003
INVENTOR(S) : Sharon Stier and Debra Ann Haughton It is certified that error appears in the above-identified patent and that said Letters Patent is hereby corrected as shown below:

Column 51,
Line 37, delete "42" and replace with -- 46 --
Line 53, after "190", add -- (shown as the backlog management process 190 in Fig. 39) --

Column 52,
Line 6, delete "an" and replace with -- a maintenance --; and after "125", add
-- (shown as the maintenance authoring system 125 in Fig. 39) --

Column 53,
Line 43, before "Turnaround", add -- Average --
Line 64, delete "660" and replace with -- 106 --

Column 56,
Line 38, delete "133" and replace with -- 113 --

Column 57,
Line 2, delete "133" and replace with -- 113 --
Lines 21 and 32, delete "review process 112" and replace with -- quality review 113 --
Line 52, after "115", add -- (shown in Fig. 43 as coordination 115) --

Signed and Sealed this

Second Day of March, 2004

JON W. DUDAS
*Acting Director of the United States Patent and Trademark Office*